US009183777B2

(12) United States Patent
Yamashita et al.

(10) Patent No.: US 9,183,777 B2
(45) Date of Patent: Nov. 10, 2015

(54) ORGANIC ELECTROLUMINESCENT LIGHT EMITTING UNIT DRIVING METHOD FOR CONTROLLING BRIGHTNESS UNIFORMITY

(75) Inventors: Junichi Yamashita, Tokyo (JP); Masakazu Kato, Kanagawa (JP); Katsuhide Uchino, Kanagawa (JP)

(73) Assignee: JOLED INC., Tokyo (JP)

( * ) Notice: Subject to any disclaimer, the term of this patent is extended or adjusted under 35 U.S.C. 154(b) by 695 days.

(21) Appl. No.: 12/613,126

(22) Filed: Nov. 5, 2009

(65) Prior Publication Data

US 2010/0118017 A1 May 13, 2010

(30) Foreign Application Priority Data

Nov. 7, 2008 (JP) ................................. 2008-286233

(51) Int. Cl.
G09G 5/00 (2006.01)
G09G 3/32 (2006.01)
H05B 33/08 (2006.01)

(52) U.S. Cl.
CPC .......... *G09G 3/3233* (2013.01); *H05B 33/0896* (2013.01); *G09G 2300/0861* (2013.01); *G09G 2310/0251* (2013.01); *G09G 2320/046* (2013.01)

(58) Field of Classification Search
CPC ................. G09G 2320/043; G09G 2320/046; G09G 2300/0819; G09G 2300/0861; G09G 2310/0256; G09G 3/3208; G09G 2320/045; G09G 2320/0257
USPC ................. 345/76–83, 87, 92, 211–215, 690; 313/498, 504, 500, 505; 315/160–176
See application file for complete search history.

(56) References Cited

U.S. PATENT DOCUMENTS

2004/0179005 A1* 9/2004 Jo .................................. 345/211
(Continued)

FOREIGN PATENT DOCUMENTS

| JP | 2004-252104 A | 9/2004 |
| JP | 2004-325885 A | 11/2004 |
| JP | 2005-017485 A | 1/2005 |

(Continued)

OTHER PUBLICATIONS

Japanese Patent Office, Office Action issued in Patent Application JP 2008-286233, on Nov. 24, 2010.

*Primary Examiner* — Charles V Hicks
*Assistant Examiner* — Charles Zheng
(74) *Attorney, Agent, or Firm* — Dentons US LLP

(57) ABSTRACT

An organic electroluminescent light emitting unit driving method includes a process (a) to execute preprocessing, a process (b) to execute threshold voltage cancellation processing, a process (c) to execute writing processing, a process (d) to set a first node to a floating state, and a process (e) to execute a series of processes at least once wherein after driving an organic electroluminescent light emitting unit, a reverse voltage is applied between the anode and cathode electrodes of the organic electroluminescent light emitting unit, with a series of processes (a) through (e) being repeated, with an auxiliary driving process being provided wherein a forward voltage is applied between the anode and cathode electrodes of the organic electroluminescent light emitting unit over a certain period, and with a period between the termination of the auxiliary driving process and the termination of the next process (b) being suppressed to 1 millisecond or less.

10 Claims, 33 Drawing Sheets

(56) References Cited

U.S. PATENT DOCUMENTS

| | | | |
|---|---|---|---|
| 2007/0109232 A1* | 5/2007 | Yamamoto et al. | 345/77 |
| 2007/0115244 A1* | 5/2007 | Shin et al. | 345/100 |
| 2007/0126665 A1* | 6/2007 | Kimura | 345/76 |
| 2007/0164962 A1* | 7/2007 | Uchino et al. | 345/92 |
| 2008/0238830 A1* | 10/2008 | Iida et al. | 345/76 |

FOREIGN PATENT DOCUMENTS

| | | |
|---|---|---|
| JP | 2007-310311 | 11/2007 |
| JP | 2008-032863 A | 2/2008 |
| JP | 2009-168968 A | 7/2009 |
| JP | 2009-271336 A | 11/2009 |
| JP | 2009-271337 A | 11/2009 |

* cited by examiner

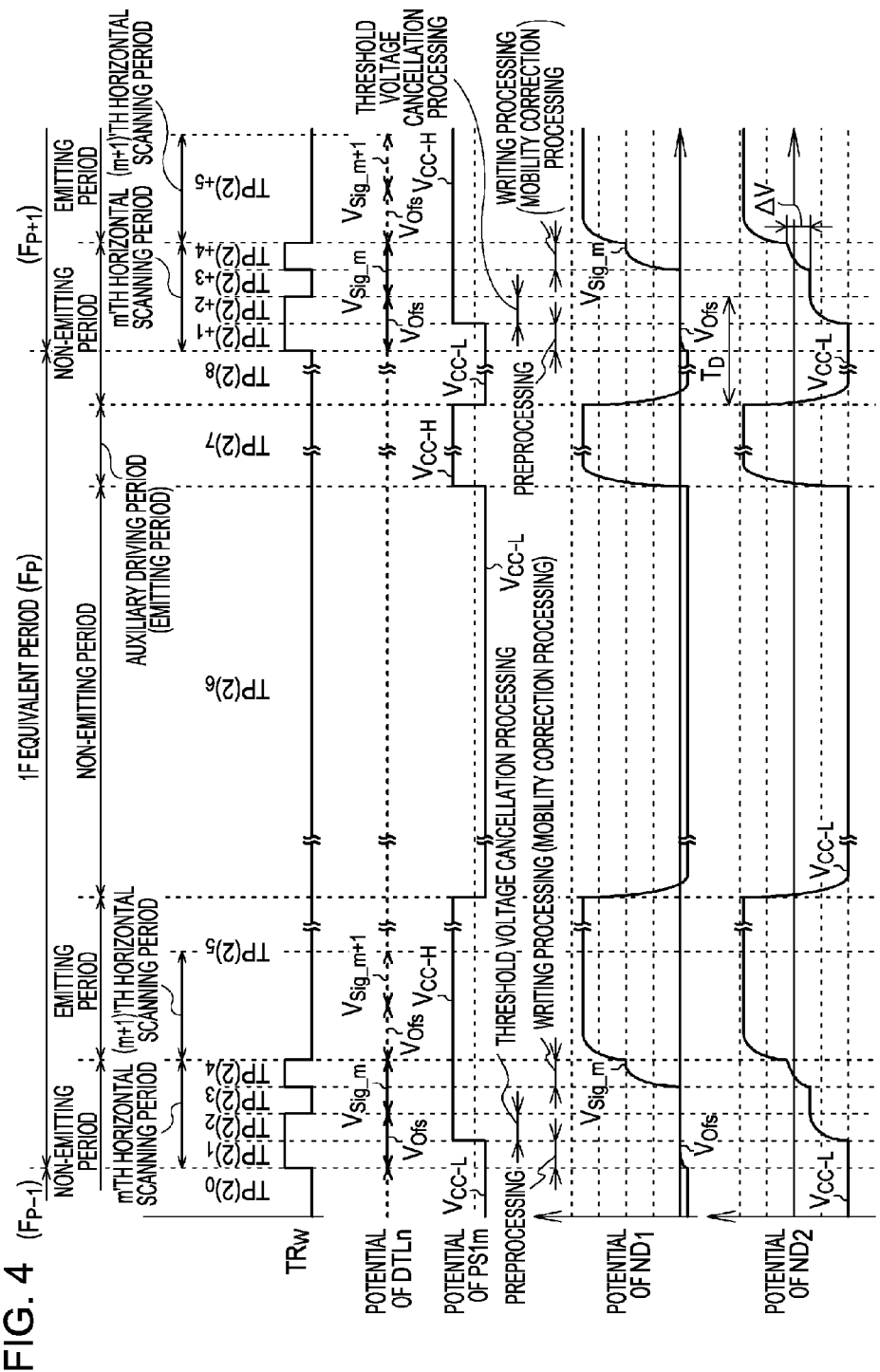

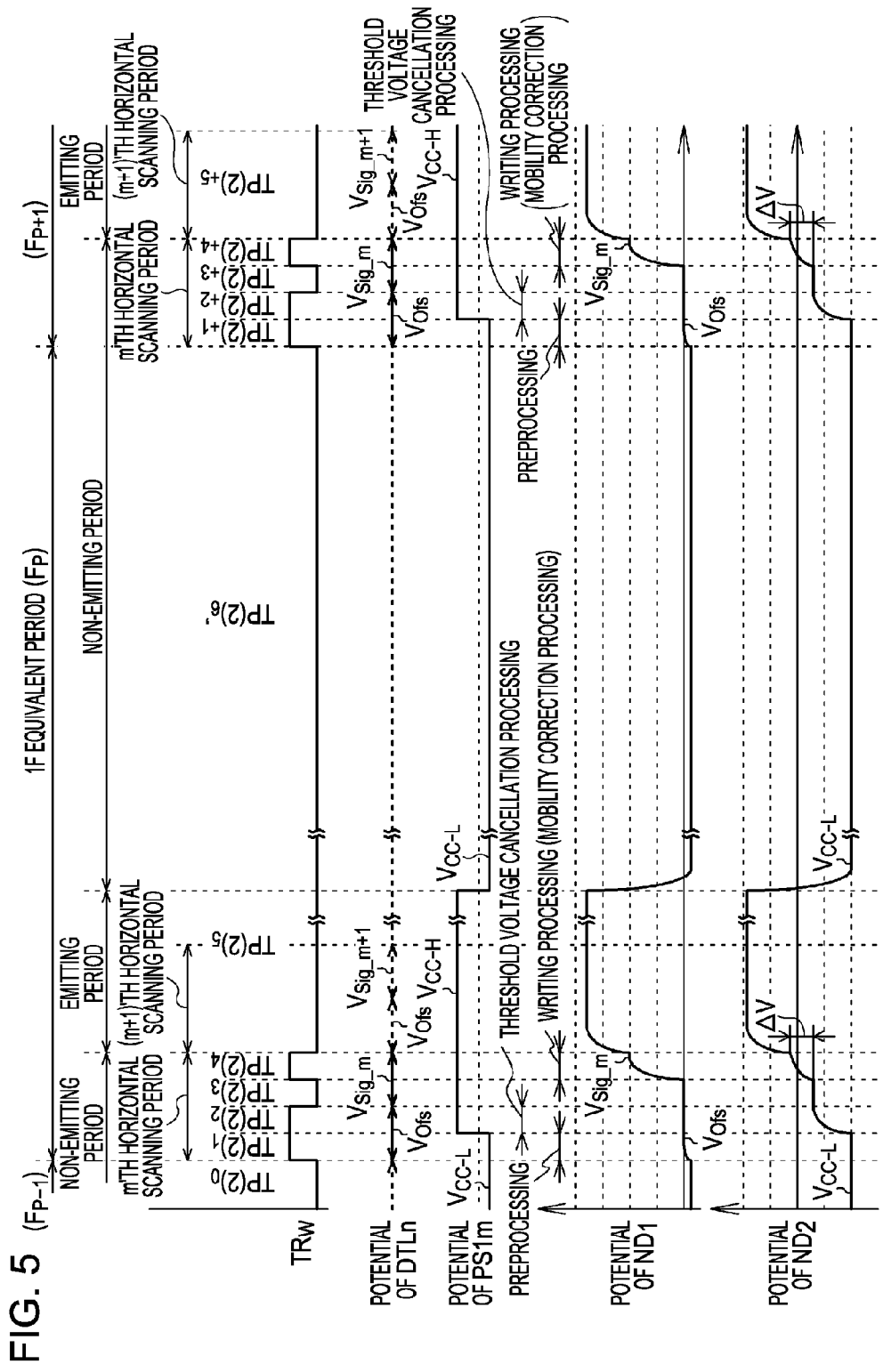
FIG. 5 Reference Example

FIG. 6A [TP(2)₀]
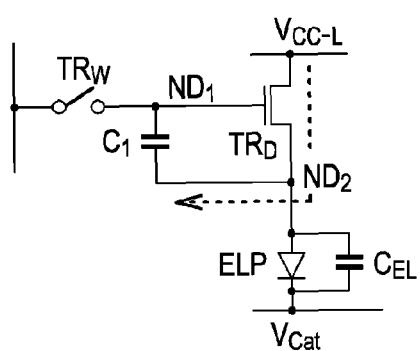
FIG. 6B [TP(2)₁]
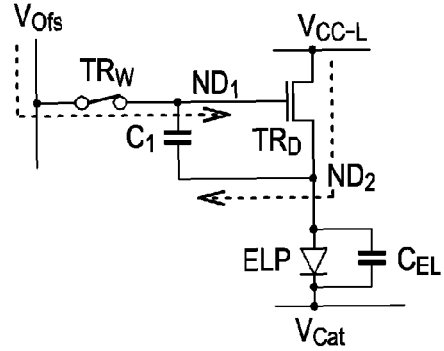
FIG. 6C [TP(2)₂]
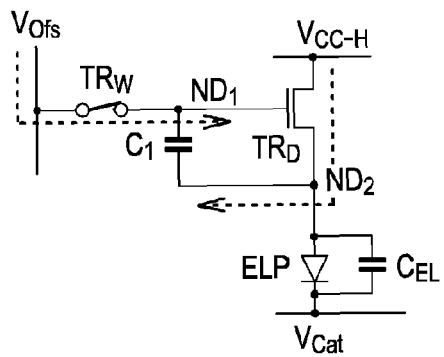
FIG. 6D [TP(2)₃]
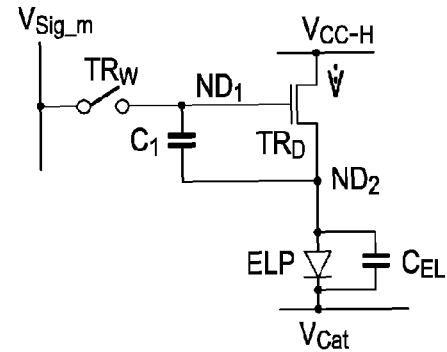
FIG. 6E [TP(2)₄]
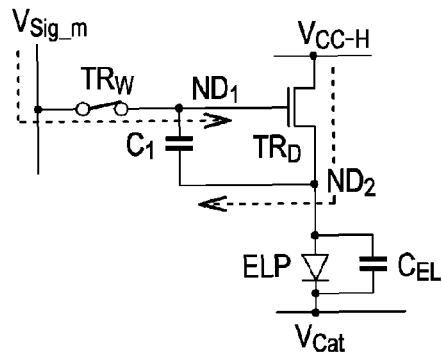
FIG. 6F [TP(2)₅]
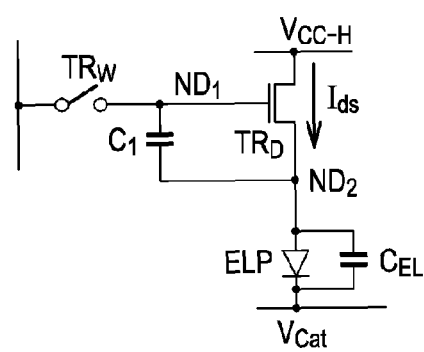

FIG. 7A  [TP(2)₆']
FIG. 7B  [TP(2)₊₁]
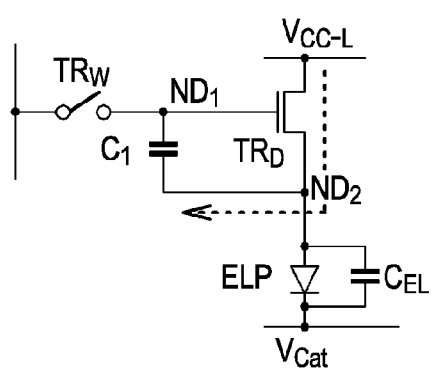
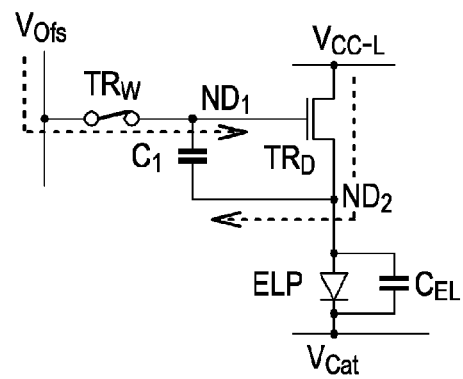

FIG. 8A
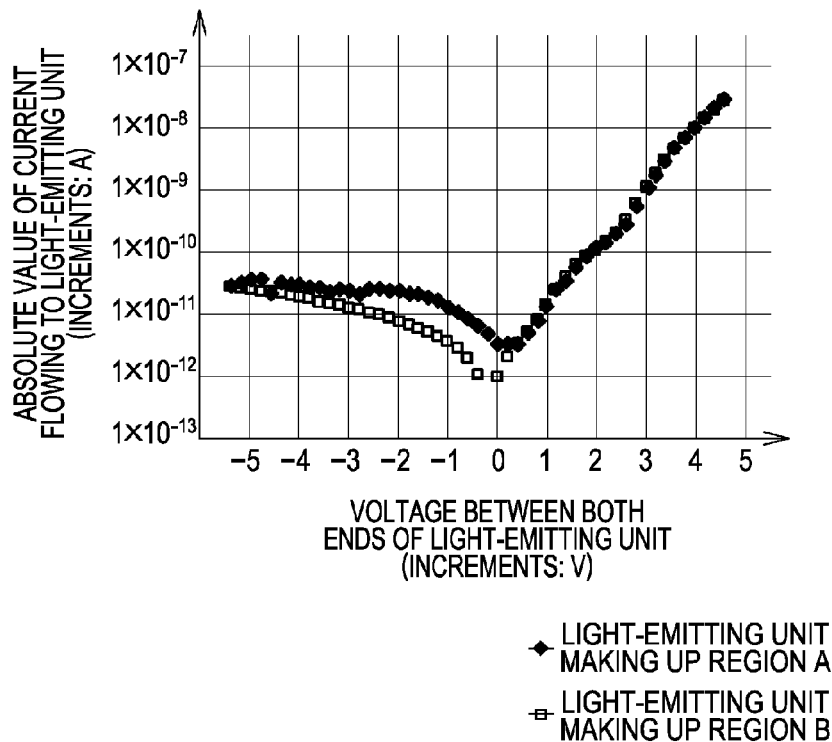
FIG. 8B [TP(2)₂]
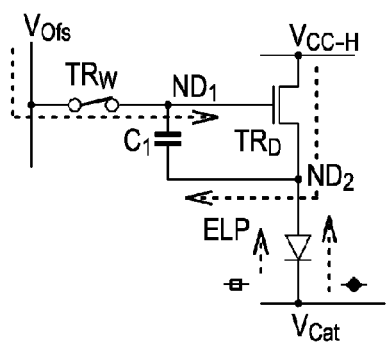
FIG. 8C [TP(2)₃]
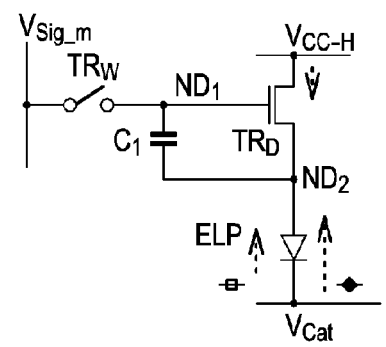

FIG. 10A [TP(2)₇]
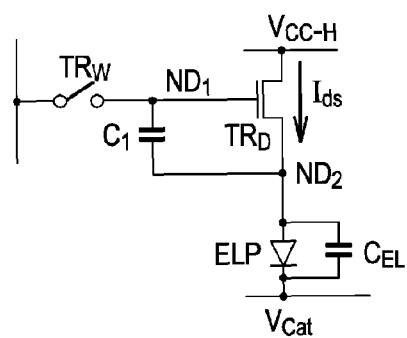
FIG. 10B [TP(2)₈]
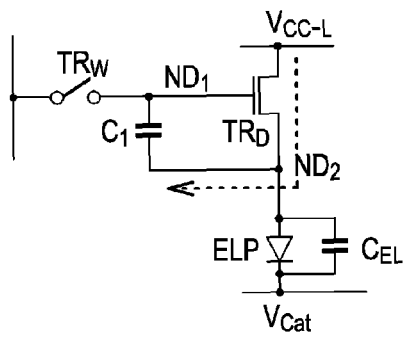
FIG. 10C [TP(2)₊₁]
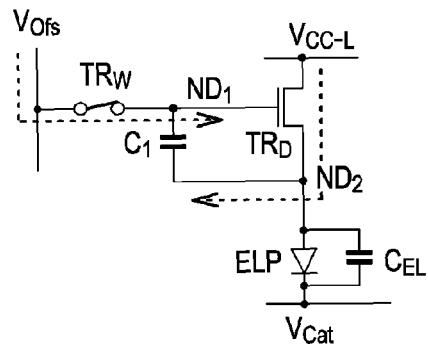
FIG. 10D [TP(2)₊₂]
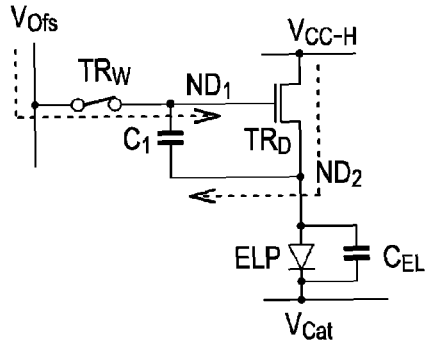

FIG. 18

FIG. 19A [TP(3)₀]
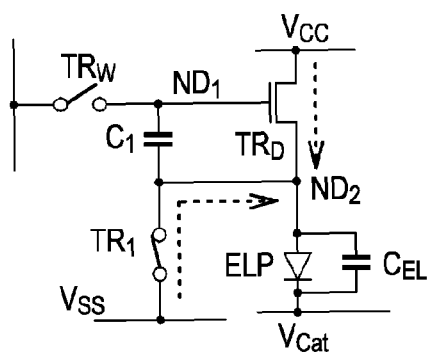
FIG. 19B [TP(3)₁]
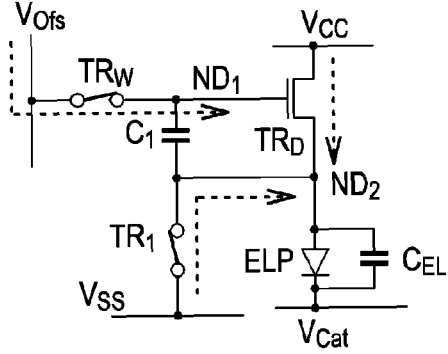
FIG. 19C [TP(3)₂]
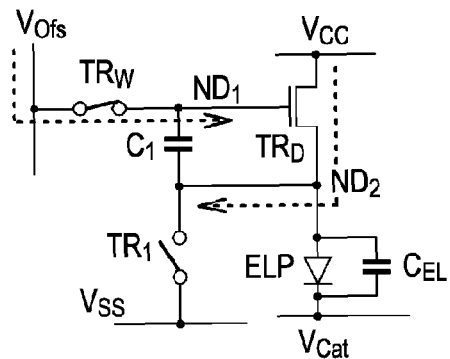
FIG. 19D [TP(3)₃]
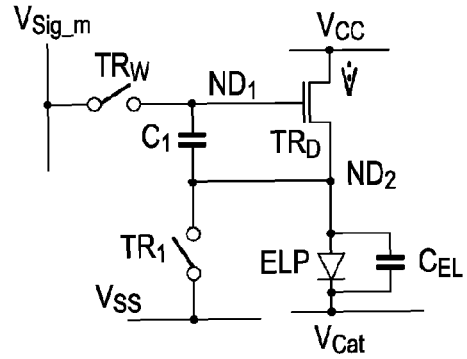
FIG. 19E [TP(3)₄]
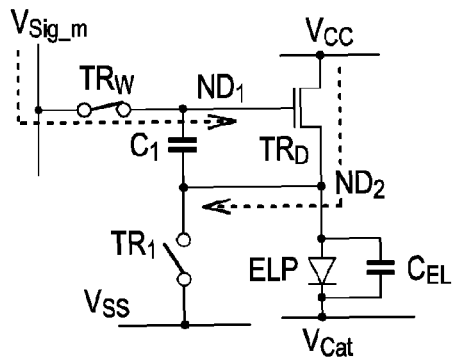
FIG. 19F [TP(3)₅]
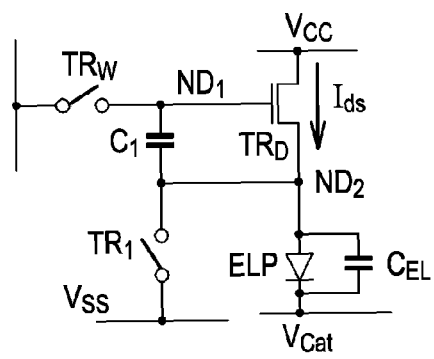

FIG. 20A [TP(3)₆]
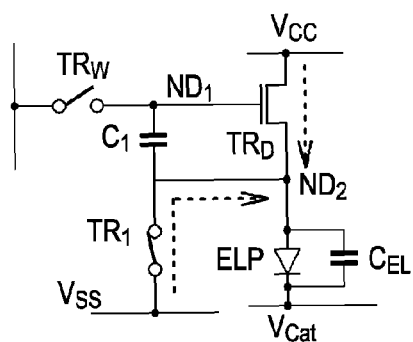
FIG. 20B [TP(3)₇]
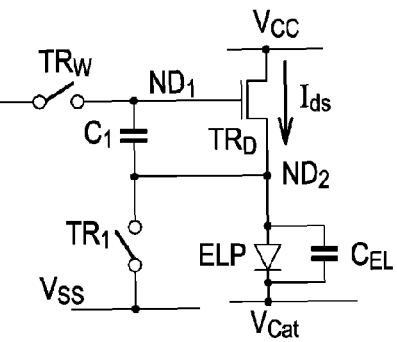
FIG. 20C [TP(3)₈]
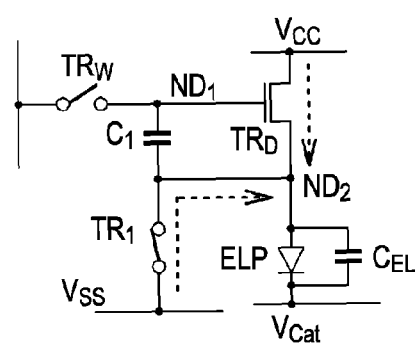
FIG. 20D [TP(3)₊₁]
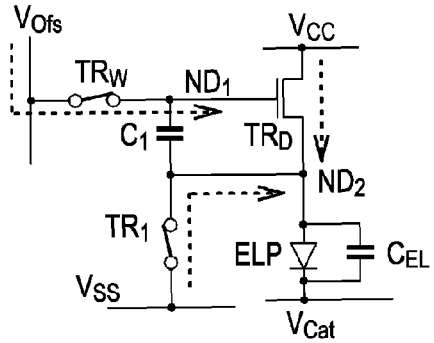
FIG. 20E [TP(3)₊₂]
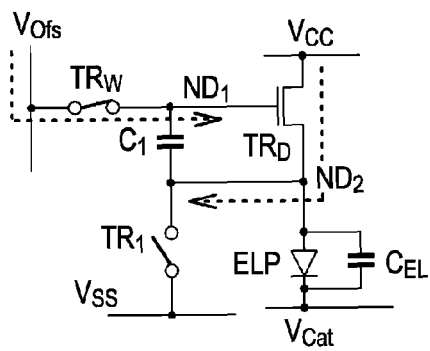

FIG. 24A [TP(3B)₀]
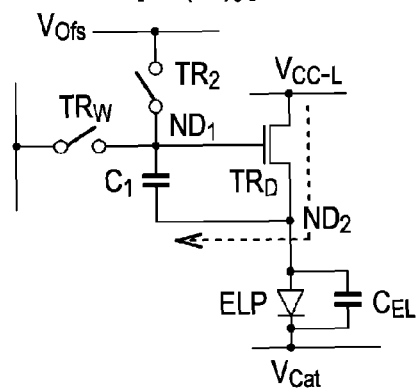
FIG. 24B [TP(3B)₁]
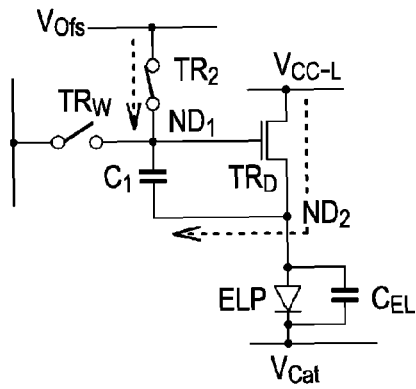
FIG. 24C [TP(3B)₂]
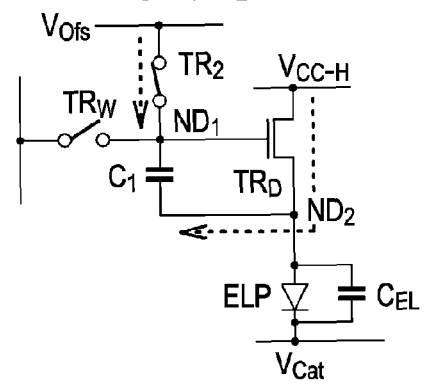
FIG. 24D [TP(3B)₃]
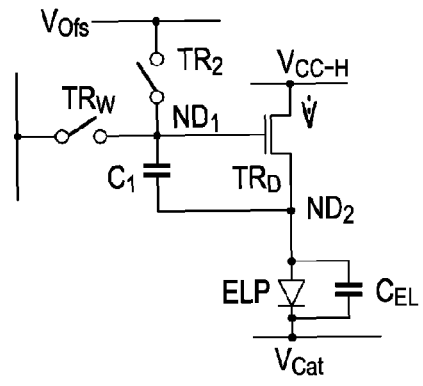
FIG. 24E [TP(3B)₄]
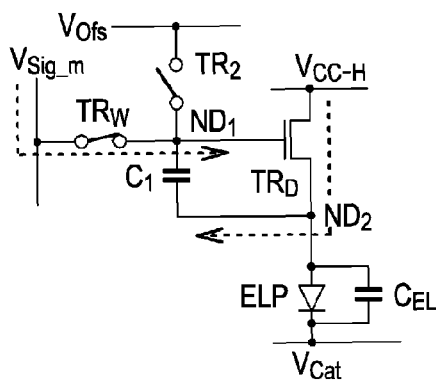
FIG. 24F [TP(3B)₅]
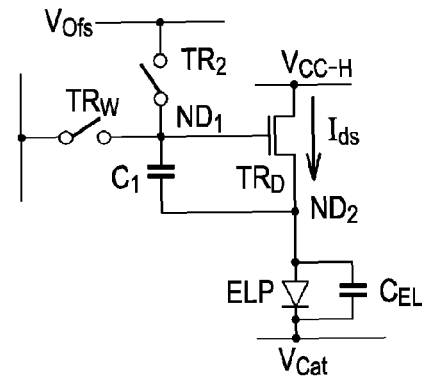

FIG. 25A [TP(3B)₆]
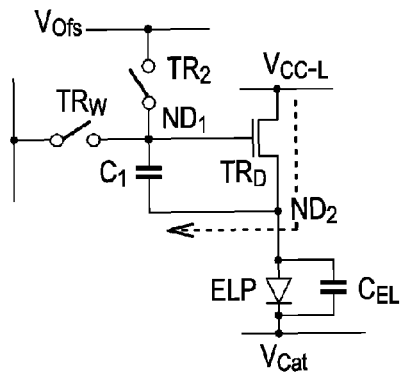
FIG. 25B [TP(3B)₇]
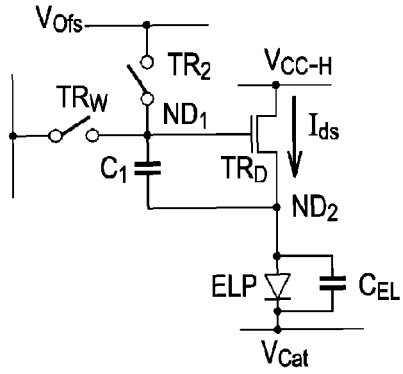
FIG. 25C [TP(3B)₈]
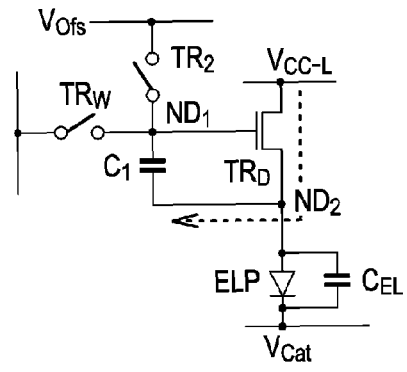
FIG. 25D [TP(3B)₊₁]
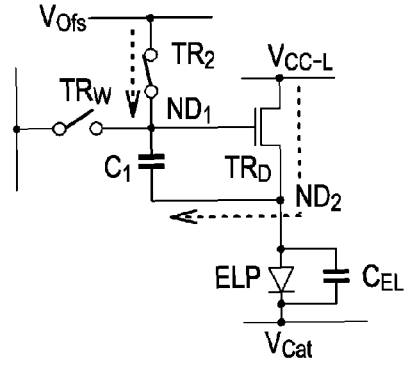
FIG. 25E [TP(3B)₊₂]
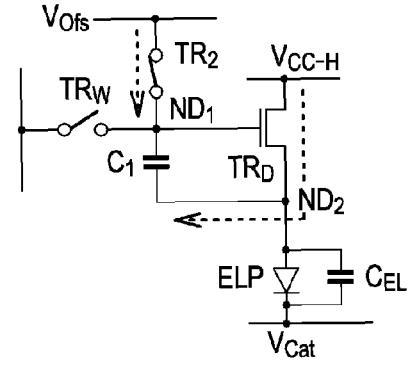

FIG. 29A [TP(4)₀] 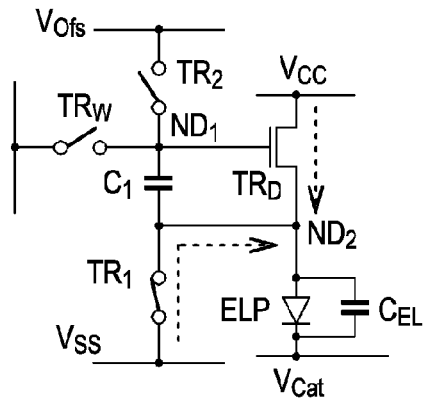
FIG. 29B [TP(4)₁] 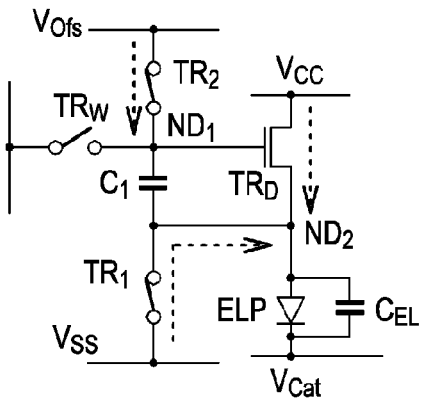
FIG. 29C [TP(4)₂] 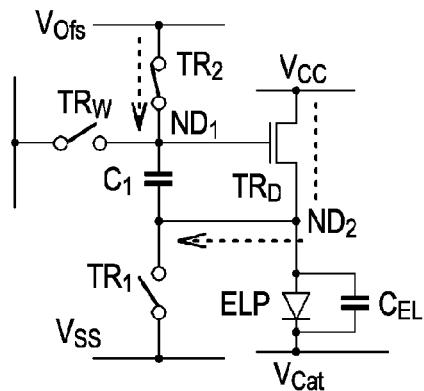
FIG. 29D [TP(4)₃] 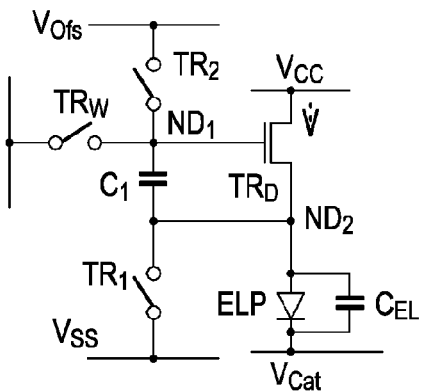
FIG. 29E [TP(4)₄] 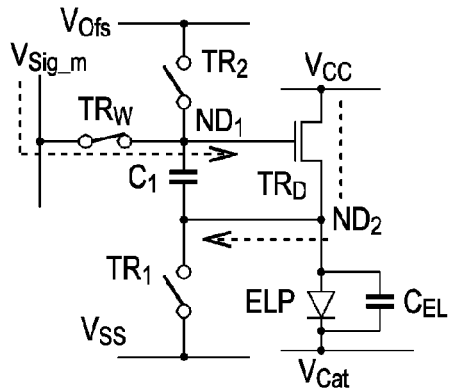
FIG. 29F [TP(4)₅] 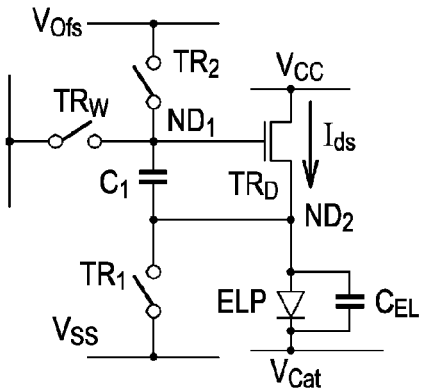

FIG. 30A [TP(4)₆] 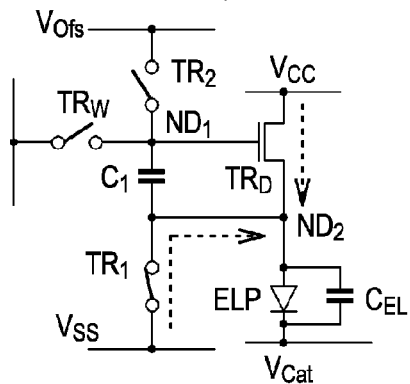
FIG. 30B [TP(4)₇] 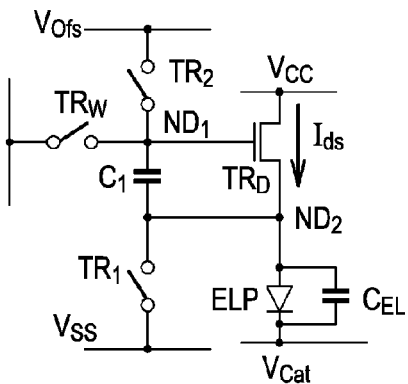
FIG. 30C [TP(4)₈] 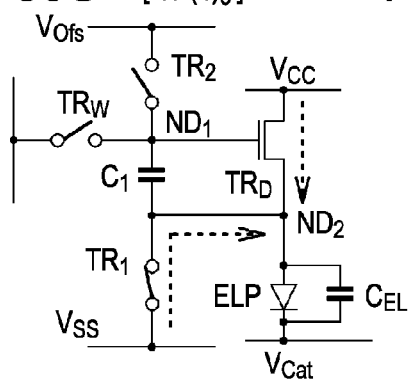
FIG. 30D [TP(4)₊₁] 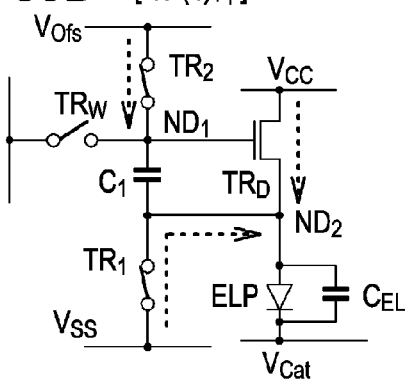
FIG. 30E [TP(4)₊₂] 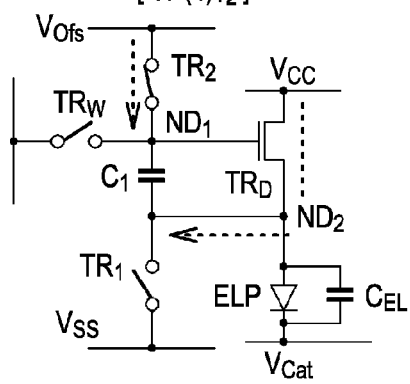

ORGANIC ELECTROLUMINESCENT LIGHT EMITTING UNIT DRIVING METHOD FOR CONTROLLING BRIGHTNESS UNIFORMITY

BACKGROUND OF THE INVENTION

1. Field of the Invention

The present invention relates to an organic electroluminescent light emitting unit driving method.

2. Description of the Related Art

Heretofore, there have been display elements including a light emitting unit, and display apparatuses including such a display element. For example, display elements including an organic electroluminescent light emitting unit which takes advantage of the electroluminescence of an organic material (hereafter, simply abbreviated to "organic EL display element" in some cases) have attracted attention as display elements capable of bright luminescence according to low-voltage DC driving.

In the same way as liquid crystal display apparatuses, for example, with display apparatuses including an organic EL display element (hereafter, simply abbreviated to "organic EL display apparatus" in some cases) as well, the simple matrix method and the active matrix method have been widely applied. The active matrix method has a shortcoming in that the configuration becomes complicated, but has an advantage in that the brightness of an image can be improved, or the like. The organic EL display elements driven by the active matrix method include not only a light emitting unit configured of an organic layer or the like including a light emitting layer but also a driving circuit used for driving the light emitting unit.

Driving circuits configured of two transistors and one capacitor unit (referred to as "2Tr/1C driving circuit") have been widely used as a circuit used for driving an organic electroluminescent light emitting unit (hereafter, simply abbreviated to "light emitting unit" in some cases), for example, according to Japanese Unexamined Patent Application Publication No. 2007-310311. This 2Tr/1C driving circuit is, as shown in FIG. 2, configured of two transistors of a writing transistor $TR_W$, and a driving transistor $TR_D$, and further, configured of a single capacitor unit $C_1$. Here, the other source/drain region of the driving transistor $TR_D$ makes up a second node $ND_2$, and the gate electrode of the driving transistor $TR_D$ makes up a first node $ND_1$.

As shown in the timing chart in FIG. 5, preprocessing used for threshold voltage cancellation processing is executed at period $TP(2)_1$. That is to say, a first node initializing voltage $V_{Ofs}$ (e.g., 0 volt) is applied to the first node $ND_1$ from a data line DTL via the writing transistor $TR_W$ which has been set to an on state by a signal from a scanning line SCL. Thus, the potential of the first node $ND_1$ becomes $V_{Ofs}$. Also, a second node initializing voltage $V_{CC-L}$ (e.g., −10 volts) is applied to the second node $ND_2$ from a power supply unit 100 via the driving transistor $TR_D$. Thus, the potential of the second node $ND_2$ becomes $V_{CC-L}$. The threshold voltage of the driving transistor $TR_D$ is represented with $V_{th}$ (e.g., 3 volts). The potential difference between the gate electrode and the other source/drain region (hereafter, referred to as "source region" in some cases) of the driving transistor $TR_D$ becomes $V_{th}$ or more, and the driving transistor $TR_D$ goes to an on state.

Next, the threshold voltage cancellation processing is executed at period $TP(2)_2$. Specifically, while the on state of the writing transistor $TR_W$ is maintained, the voltage of the power supply unit 100 is switched from the second node initializing voltage $V_{CC-L}$ to a driving voltage $V_{CC-H}$ (e.g., 20 volts). As a result thereof, the potential of the second node $ND_2$ is changed toward a potential obtained by subtracting the threshold voltage $V_{th}$ of the driving transistor $TR_D$ from the potential of the first node $ND_1$. That is to say, the potential of the second node $ND_2$ in a floating state increases. Subsequently, upon the potential difference between the gate electrode and the source region of the driving transistor $TR_D$ reaching $V_{th}$, the driving transistor $TR_D$ goes to an off state. In this state, the potential of the second node $ND_2$ becomes approximately ($V_{Ofs} - V_{th}$).

Subsequently, the writing transistor $TR_W$ is set to an off state at period $TP(2)_3$. Subsequently, the voltage of a data line DTL is set to a voltage equivalent to a video signal [video signal (driving signal, brightness signal) $V_{Sig\_m}$ used for controlling brightness at a light emitting unit ELP].

Next, writing processing is executed at period $TP(2)_4$. Specifically, a scanning line SCL is set to a high level, thereby setting the writing transistor $TR_W$ to an on state. As a result thereof, the potential of the first node $ND_1$ increases to the video signal $V_{Sig\_m}$.

Now, let us say that the value of the capacitor unit $C_1$ is set to a value $c_1$, the value of the capacitance $C_{EL}$ of the light emitting unit ELP is set to a value $C_{EL}$, and the value of parasitic capacitance between the gate electrode and the other source/drain region of the driving transistor $TR_D$ is set to $c_{gs}$. When the potential of the gate electrode of the driving transistor $TR_D$ is changed from $V_{Ofs}$ to $V_{Sig\_m}$ ($> V_{Ofs}$), the potentials of both ends of the capacitor unit $C_1$ (in other words, the potentials of the first node $ND_1$ and second node $ND_2$) are changed as a general rule. Specifically, charge based on the amount of change ($V_{Sig\_m} - V_{Ofs}$) in the potential of the gate electrode of the driving transistor $TR_D$ (i.e., the potential of the first node $ND_1$) is distributed to the capacitor unit $C_1$, the capacitance $C_{EL}$ of the light emitting unit ELP, and the parasitic capacitance between the gate electrode and the other source/drain region of the driving transistor $TR_D$. Therefore, in the case that the value $c_{EL}$ is a sufficiently great value as compared to the values $c_1$ and $c_{gs}$, the change in the potential of the other source/drain region (second node $ND_2$) of the driving transistor $TR_D$ based on the amount of change ($V_{Sig\_m} - V_{Ofs}$) in the potential of the gate electrode of the driving transistor $TR_D$ is small. In general, the value $c_{EL}$ of the capacitance $C_{EL}$ of the light emitting unit ELP is greater than the value $c_1$ of the capacitor unit $C_1$, and the value $c_{gs}$ of the parasitic capacitance of the driving transistor $TR_D$. Therefore, description will be made without considering the change in the potential of the second node $ND_2$ caused due to change in the potential of the first node $ND_1$ for the sake of explanatory convenience. Note that the driving timing chart shown in FIG. 5 is illustrated without considering the change in the potential of the second node $ND_2$ caused due to change in the potential of the first node $ND_1$.

With the above operation, the video signal $V_{Sig\_m}$ is applied to the gate electrode of the driving transistor $TR_D$ in a state in which the voltage $V_{CC-H}$ is applied to one of the source/drain regions of the driving transistor $TR_D$ from the power supply unit 100. Therefore, as shown in FIG. 5, the potential of the second node $ND_2$ increases at period $TP(2)_4$. The increase amount $\Delta V$ (potential corrected value) of this potential will be described later. When assuming that the potential of the gate electrode (first node $ND_1$) of the driving transistor $TR_D$ is $V_g$, and the potential of the other source/drain region (second node $ND_2$) is $V_s$, in the case that the increase amount $\Delta V$ of the potential of the second node $ND_2$ is not taken into consideration, the value of the $V_g$ and the value of the $V_s$ are as follows. The potential difference between the first node $ND_1$ and second node $ND_2$, i.e., difference value $V_{gs}$ between the gate electrode and the other source/drain region serving as a source region of the driving transistor TR$_D$, can be represented with the following Expression (A).

$$V_g = V_{Sig\_m}$$
$$V_s = V_{Ofs} - V_{th}$$
$$V_{gs} \cong V_{Sig\_m} - (V_{Ofs} - V_{th}) \quad (A)$$

That is to say, the $V_{gs}$ obtained at the writing processing as to the driving transistor TR$_D$ depends on only the video signal $V_{Sig\_m}$ used for controlling the brightness of the light emitting unit ELP, the threshold voltage $V_{th}$ of the driving transistor TR$_D$, and the voltage $V_{Ofs}$ used for initializing the potential of the gate electrode of the driving transistor TR$_D$, but is not linked to the threshold voltage $V_{th\text{-}EL}$ of the light emitting unit ELP.

Next, mobility correction processing will be described briefly. With the above operation, mobility correction processing is executed along with the writing processing, wherein the potential of the other source/drain region of the driving transistor TR$_D$ (i.e., the size of mobility or the like) is changed according to the property of the driving transistor TR$_D$ (e.g., the potential of the second node ND$_2$).

As described above, the video signal $V_{Sig\_m}$ is applied to the gate electrode of the driving transistor TR$_D$ in a state in which the voltage $V_{CC\text{-}H}$ is applied to one of the source/drain regions of the driving transistor TR$_D$ from the power supply unit 100. Here, as shown in FIG. 5, the potential of second node ND$_2$ increases at period TP($\mathbf{2}$)$_4$. As a result thereof, in the case that the value of the mobility μ of the driving transistor TR$_D$ is great, the increase amount ΔV (potential corrected value) of the potential at the source region of the driving transistor TR$_D$ increases, and in the case that the value of the mobility μ of the driving transistor TR$_D$ is small, the increase amount ΔV (potential corrected value) of the potential at the source region of the driving transistor TR$_D$ decreases. The potential difference $V_{gs}$ between the gate electrode and the source region of the driving transistor TR$_D$ is obtained by Expression (A) being changed to the following Expression (B). Note that the entire time (t$_0$) of period TP($\mathbf{2}$)$_4$ should be determined as a design value beforehand at the time of design of an organic EL display apparatus.

$$V_{gs} \cong V_{Sig\_m} - (V_{Ofs} - V_{th}) - \Delta V \quad (B)$$

The threshold voltage cancellation processing, writing processing, and mobility correction processing are completed according to the above operations. Subsequently, at the commencement of the subsequent period TP($\mathbf{2}$)$_5$, the writing transistor TR$_W$ is set to an off state by a signal from a scanning line SCL, thereby setting the first node ND$_1$ to a floating state. One of the source/drain regions (hereafter, referred to as "drain region" as appropriate) of the driving transistor TR$_D$ is in a state in which the voltage $V_{CC\text{-}H}$ is applied thereto from the power supply unit 100. Therefore, as a result of the above-described, the potential of the second node ND$_2$ increases, and the same phenomenon as with a so-called bootstrap circuit is generated at the gate electrode of the driving transistor TR$_D$, and accordingly, the potential of the first node ND$_1$ also increases. The potential difference $V_{gs}$ between the gate electrode and the source region of the driving transistor TR$_D$ holds the value of Expression (B). Also, a current flowing into the light emitting unit ELP is a drain current I$_{ds}$ that flows from the source region to the drain region, of the driving transistor TR$_D$. If we say that the driving transistor TR$_D$ operates ideally at a saturation region, the drain current I$_{ds}$ can be represented with the following Expression (C). The light emitting unit ELP emits light with the brightness corresponding to the value of the drain current I$_{ds}$. Note that a coefficient k will be described later.

$$Ids = k \cdot \mu \cdot (V_{gs} - V_{th})^2 \quad (C)$$
$$= k \cdot \mu \cdot (V_{Sig\_m} - V_{Ofs} - \Delta V)^2$$

Next, let us say that the period TP($\mathbf{2}$)$_5$ shown in FIG. 5 is set as an emitting period, and between the commencement of the period TP($\mathbf{2}$)$_6$' and the next emitting period is set as a non-emitting period. Such a non-emitting period is provided, whereby afterimage blurring due to active matrix driving is reduced, and moving image quality can further be improved.

The operation of the 2Tr/1C driving circuit of which the overview has been described above will also be described later in detail.

SUMMARY OF THE INVENTION

With an organic EL display apparatus which drives a light emitting unit by the above driving method, for example, upon a certain pattern being displayed for a long time, so-called burn-in may occur, in which change in brightness according to the pattern thereof remains. For example, as shown in FIG. 33A, with a display region EA of the organic EL display apparatus, long-time display is executed with a region A as white display, and a window-style region B as black display. Subsequently, for example, if the entire display region EA is set to white display, as shown in FIG. 33B, a phenomenon is recognized wherein the brightness of the portion corresponding to the region A becomes relatively low as to the brightness of the portion corresponding to the region B. As a result thereof, the display quality of the organic EL display apparatus deteriorates.

It has been found to be desirable to provide an organic electroluminescent light emitting unit driving method whereby the level of the above-mentioned relative brightness change can be reduced with an organic electroluminescent display apparatus.

According to an embodiment of the present invention, there is provided an organic electroluminescent light emitting unit driving method using a driving circuit, the driving circuit including a writing transistor, a driving transistor, and a capacitor unit, the driving transistor having a configuration wherein one of the source/drain regions is connected to a power supply unit, the other source/drain region is connected to an anode electrode provided to an organic electroluminescent light emitting unit, and is also connected to one of the electrodes of the capacitor unit, which makes up a second node, and the gate electrode is connected to the other source/drain of the writing transistor, and is also connected to the other electrode of the capacitor unit, which makes up a first node, the writing transistor having a configuration wherein one of the source/drain regions is connected to a data line, and the gate electrode is connected to a scanning line.

The organic electroluminescent light emitting unit driving method includes: a process (a) to execute preprocessing, wherein the potential of the first node, and the potential of the second node are initialized such that the potential difference between the first node and the second node exceeds the threshold voltage of the driving transistor, and also the potential difference between the second node and a cathode electrode provided to the organic electroluminescent light emitting unit does not exceed the threshold voltage of the organic electroluminescent light emitting unit; a process (b) to execute threshold voltage cancellation processing, wherein the potential of the second node is changed toward a potential obtained by subtracting the threshold voltage of the driving transistor from the potential of the first node in a state in which the potential of the first node is maintained; a process (c) to execute writing processing, wherein a video signal is applied to the first node from the data line via the writing transistor which has been set to an on state by a signal from the scanning line; a process (d) to set the first node to a floating state by setting the writing transistor to an off state based on a signal from the scanning line; and a process (e) to execute a series of processes at least once, wherein, after a current according to the value of potential difference between the first node and the second node is applied to the organic electroluminescent light emitting unit from the power supply unit via the driving transistor to drive the organic electroluminescent light emitting unit, a reverse voltage is applied between the anode electrode and the cathode electrode of the organic electroluminescent light emitting unit.

Further, with the organic electroluminescent light emitting unit driving method, a series of processes from the processes (a) through (c) are executed repeatedly, and also there is provided an auxiliary driving process between the processes (e) and (a) to apply a forward voltage between the anode electrode and the cathode electrode of the organic electroluminescent light emitting unit over a certain period, and a period between the termination of the auxiliary driving process and the termination of the next process (b) is suppressed to 1 millisecond or less.

With the above arrangement, a series of processes from the processes (a) through (c) are executed repeatedly, and also there is provided an auxiliary driving process between the processes (e) and (a) to apply a forward voltage between the anode electrode and the cathode electrode of the organic electroluminescent light emitting unit over a certain period, and a period between the termination of the auxiliary driving process and the termination of the next process (b) is suppressed to 1 millisecond or less. Thus, the level of the above relative brightness change can be reduced. With an organic EL display apparatus to which the above embodiment of the present invention has been applied, an image that excels in the uniformity of brightness can be displayed.

BRIEF DESCRIPTION OF THE DRAWINGS

FIG. 4 is a schematic view of a driving timing chart of an organic electroluminescent light emitting unit according to the first embodiment;

FIG. 5 is a schematic view of a driving timing chart of an organic electroluminescent display apparatus according to a reference example;

FIGS. 6A through 6F are diagrams schematically illustrating the on/off state of each of transistors making up the driving circuit of the organic electroluminescent display element;

FIGS. 7A and 7B are diagrams schematically illustrating the on/off state of each of the transistors making up the driving circuit of the organic electroluminescent display element, following FIG. 6F;

FIG. 8A shows a measurement result when a DC current was applied to both ends of the organic electroluminescent light emitting unit making up the pixels of a region A, and both ends of the organic electroluminescent light emitting unit making up the pixels of a region B, and voltage-current property was measured by changing the value of voltage, FIG. 8B is a schematic circuit diagram for describing the potential change of the second node at period $TP(2)_2$ in the case of considering a reverse current that flows to the organic electroluminescent light emitting unit, and FIG. 8C is a schematic circuit diagram for describing the potential change of the second node at period $TP(2)_3$ in the case of considering a reverse current that flows to the organic electroluminescent light emitting unit;

FIGS. 10A through 10D are diagrams schematically illustrating the on/off state of each of the transistors at period $TP(2)_7$ through period $TP(2)_{+2}$ shown in FIG. 4;

FIG. 18 is a schematic view of a driving timing chart of an organic electroluminescent light emitting unit according to the second embodiment;

FIGS. 19A through 19F are diagrams schematically illustrating the on/off state of each of transistors making up the driving circuit of the organic electroluminescent display element;

FIGS. 20A through 20E are diagrams schematically illustrating the on/off state of each of the transistors making up the driving circuit of the organic electroluminescent display element, following FIG. 19F;

FIGS. 24A through 24F are diagrams schematically illustrating the on/off state of each of transistors making up the driving circuit of the organic electroluminescent display element;

FIGS. 25A through 25E are diagrams schematically illustrating the on/off state of each of the transistors making up the driving circuit of the organic electroluminescent display element, following FIG. 24F;

FIGS. 29A through 29F are diagrams schematically illustrating the on/off state of each of transistors making up the driving circuit of the organic electroluminescent display element;

FIGS. 30A through 30E are diagrams schematically illustrating the on/off state of each of the transistors making up the driving circuit of the organic electroluminescent display element, following FIG. 29F;

DESCRIPTION OF THE PREFERRED EMBODIMENTS

Figure 1:
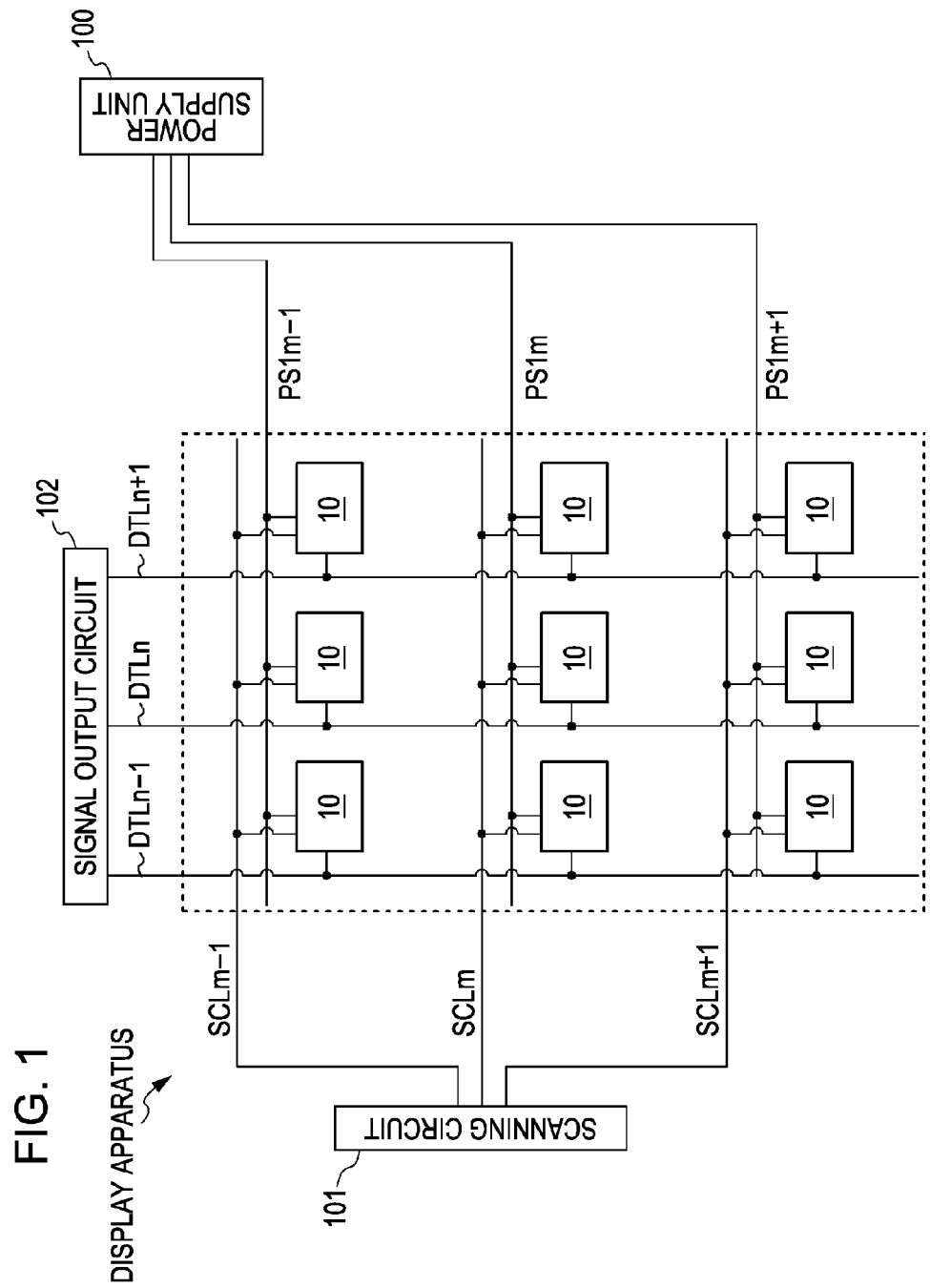
FIG. 1 is a conceptual diagram of an organic electroluminescent display apparatus according to a first embodiment.

Description of the present invention will be made below by way of embodiments with reference to the drawings. Note that description will be made in accordance with the following order.
1. Detailed Description Regarding Organic Electroluminescent Light Emitting Unit Driving Method According to Embodiments of Present Invention
2. Description of Overview of Organic EL Display Apparatus Used for Each Embodiment
3. First Embodiment (Embodiment of 2Tr/1C Driving Circuit)
4. Second Embodiment (Embodiment of First 3Tr/1C Driving Circuit)
5. Third Embodiment (Embodiment of Second 3Tr/1C Driving Circuit)
6. Fourth Embodiment (Embodiment of 4Tr/1C Driving Circuit) Detailed Description Regarding Organic Electroluminescent Light Emitting Unit Driving Method According to Embodiments of Present Invention With the organic electroluminescent light emitting unit driving method according to the embodiments of the present invention (hereafter, simply referred to as "driving method according to embodiments" in some cases), basically, a relationship has been found wherein the shorter the length between the termination of the auxiliary driving process to the termination of the next process (b) is, the more relative brightness change is reduced. Though depending on the specification or the like of the organic electroluminescent light emitting unit, basically an advantage has been confirmed by suppressing the period between the termination of the auxiliary driving process and the termination of the next process (b) to 1 millisecond or less. It is more desirable to suppress the above period to 0.5 milliseconds or less.

With the driving method according to the embodiments of the present invention, in the auxiliary driving process, a forward voltage is applied between the anode electrode and cathode electrode of the organic electroluminescent light emitting unit over a certain period. In this case, it is desirable from the perspective of sharing the processes of the driving method to apply a current according to the value of the potential difference between the first node and the second node to the organic electroluminescent light emitting unit from the power supply unit via the driving transistor in the in the auxiliary driving process, thereby driving the organic electroluminescent light emitting unit. According to the above configuration, the organic electroluminescent light emitting unit is driven at both of the process (e) and the auxiliary driving process. Though depending on the specification or the like of the organic electroluminescent light emitting unit, it is desirable to set the length of the period for executing the auxiliary driving process so as not to be shorter than generally 1 millisecond. The length of the period of the process (e) can be set as a uniformly fixed period length. Alternatively, the length of the period of the process (e) may be set so as to vary, for example, according to the value of a video signal.

With the driving method according to the embodiments of the present invention including various types of preferred configurations described above, an arrangement may be made wherein, with the process (a), the first node initializing voltage is applied to the first node from the data line via the writing transistor which has been set to an on state by a signal from a scanning line.

Note that an arrangement may be made wherein the writing transistor is set to an on state after waiting for the voltage applied to the data line being switched from the video signal to the first node initializing voltage, or an arrangement may be made wherein the writing transistor is set to an on state previously in a range wherein as long as this does not cause any problem with operation. According to the latter arrangement, the potential of the first node is initialized immediately after the first node initializing voltage is applied to the data line. With the former arrangement, time has to be distributed to the preprocessing, which includes time for waiting for switching of the voltage of the data line. With the latter arrangement, time for waiting for switching of the voltage of the data line can be omitted, and accordingly, the preprocessing can be executed in less time. With the latter arrangement, long time can be distributed by the threshold voltage cancellation processing to be executed following the preprocessing.

Also, an arrangement may be made wherein, with the process (a), the second node initializing voltage is applied to the second node from the power source via the driving transistor.

Also, an arrangement may be made wherein, with the process (b), a state is maintained in which the first node initializing voltage is applied to the first node from the data line via the writing transistor which has been set to an on state by a signal from a scanning line, thereby realizing a state in which the potential of the first node is maintained.

Also, an arrangement may be made wherein, with the process (b), a voltage is applied to one of the source/drain regions of the driving transistor from the power supply unit, which is higher than a voltage obtained by subtracting the threshold voltage of the driving transistor from the potential of the first node, thereby changing the potential of the second node toward the potential obtained by subtracting the threshold voltage of the driving transistor from the potential of the first node.

Also, an arrangement may be made wherein, with the process (e), the second node initializing voltage is applied to the second node from the power supply unit via the driving transistor, thereby applying a reverse voltage between the anode electrode and cathode electrode of the organic electroluminescent light emitting unit.

Alternatively, with the driving method according to the embodiments of the present invention, the driving circuit further includes a first transistor, and the first transistor may have a configuration wherein (C-1) the other source/drain region is connected to the second node,
(C-2) the second node initializing voltage is applied to one of the source/drain regions, and
(C-3) the gate electrode is connected to a first transistor control line.

With the driving method according to the embodiments of the present invention including various types of preferred configurations described above, an arrangement may be made wherein, with the process (a), the second node initializing voltage is applied to the second node via the first transistor which has been set to an on state by a signal from the first transistor control line.

With the driving method according to the embodiments of the present invention including various types of preferred configurations described above, an arrangement may be made wherein, with the process (e), the second node initializing voltage is applied to the second node via the first transistor which has been set to an on state by a signal from the first transistor control line, thereby applying a reverse voltage between the anode electrode and cathode electrode of the organic electroluminescent light emitting unit.

Alternatively, with the driving method according to the embodiments of the present invention, the driving circuit further includes a second transistor, and the second transistor may have a configuration wherein (D-1) the other source/drain region is connected to the first node,
(D-2) the first node initializing voltage is applied to one of the source/drain regions, and
(D-3) the gate electrode is connected to a second transistor control line.

With the driving method according to the embodiments of the present invention including various types of preferred configurations described above, an arrangement may be made wherein, with the process (a), the first node initializing voltage is applied to the first node via the second transistor which has been set to an on state by a signal from the second transistor control line.

Also, an arrangement may be made wherein, with the process (b), a state is maintained in which the first node initializing voltage is applied to the first node via the second transistor which has been set to an on state by a signal from the second transistor control line, thereby realizing a state in which the potential of the first node is maintained.

With the process (b) of the driving method according to the embodiments of the present invention including various types of preferred configurations described above, the threshold voltage cancellation processing is executed wherein the potential of the second node is changed toward the potential obtained by subtracting the threshold voltage of the driving transistor from the potential of the first node. Qualitatively, with the threshold voltage cancellation processing, level depends on the time for the threshold voltage cancellation processing, wherein the potential difference between the first node and second node (in other words, the potential difference between the gate electrode and the other source/drain region of the driving transistor) approximates to the threshold voltage of the driving transistor. Therefore, for example, with an arrangement wherein the time for the threshold voltage cancellation processing is sufficiently secured, the potential of the second node reaches the potential obtained by subtracting the threshold voltage of the driving transistor from the potential of the first node. Subsequently, upon the potential difference between the first node and the second node reaching the threshold voltage of the driving transistor, the driving transistor goes to an off state. On the other hand, for example, with an arrangement wherein the time for the threshold voltage cancellation processing has to be set short, the potential difference between the first node and the second node is greater than the threshold voltage of the driving transistor, and accordingly, there is a case where the driving transistor is not set to an off state. With the embodiments of the present invention, the driving transistor does not have to be set to an off state as a result of the threshold voltage cancellation processing.

According to the embodiments of the present invention, with the process (d), the writing transistor is set to an off state by a signal from a scanning line. The temporal order relationship between this period and the period wherein a predetermined driving voltage is applied to one of the source/drain regions of the driving transistor from the power supply unit to supply a current to the organic electroluminescent light emitting unit is not restricted to particular relationship. For example, an arrangement may be made wherein a driving voltage is applied to one of the source/drain regions of the driving transistor immediately or with a predetermined interval after the writing transistor is set to an off state, or an arrangement may be made wherein in a state in which a driving voltage is applied to one of the source/drain region of the driving transistor, the writing transistor is set to an off state. With the latter arrangement, there is a period wherein in a state in which a driving voltage is applied to one of the source/drain region of the driving transistor, a video signal is applied to the first node from the data line. With this period, the operation of the mobility correction processing is executed wherein the potential of the second node is increased according to the property of the driving transistor.

The above driving voltage may have a value different from the voltage to be applied to one of the source/drain regions of the driving transistor at the process (b), but from the perspective of reducing the types of voltage to be applied from the power supply unit, an arrangement is desirable wherein the power supply unit applies a driving voltage to one of the source/drain regions of the driving transistor at the time of driving the organic electroluminescent light emitting unit at the process (e).

Also, with the embodiments of the present invention, an arrangement may be made wherein the process (c) is executed in a state in which a driving voltage is applied to one of the source/drain regions of the driving transistor. With this arrangement, the above mobility correction processing is executed along with the writing processing.

An organic electroluminescent display apparatus to which an embodiment of the present invention is applied may be configured so as to include, for example, (1) a scanning circuit
(2) a signal output circuit
(3) organic electroluminescent display elements arrayed in a two-dimensional manner in total N×M of N elements in the first direction, and M elements in the second direction that is different from the first direction, each of which includes an organic electroluminescent light emitting unit, and a driving circuit used for driving the organic electroluminescent light emitting unit thereof, (4) M scanning lines which are connected to the scanning circuit and extended to the second direction, (5) N data lines which are connected to the signal output circuit and extended to the second direction, and (6) a power supply unit.

Each of the organic electroluminescent display elements (hereafter, simply referred to as "organic EL display elements" in some cases) is configured of a driving transistor, a writing transistor, a driving circuit including a capacitor unit, and an organic electroluminescent light emitting unit.

The organic electroluminescent display apparatus (hereafter, simply referred to as "organic EL display apparatus" in some cases) to which an embodiment of the present invention is applied may have a configuration of so-called monochrome display, or may have a configuration of color display. For example, the organic electroluminescent display apparatus may have a configuration wherein one pixel is made up of multiple sub pixels, and specifically, may have a color display configuration wherein one pixel is made up of three sub pixels of a red light emitting sub pixel, a green light emitting sub pixel, and a blue light emitting sub pixel. Further, one pixel may be configured of one set in which further one type or multiple types of sub pixels are added to the three types of sub pixels (e.g., one set to which a sub pixel which emits white light to improve brightness is added, one set to which a sub pixel which emits a complementary color to expand a color reproducing range is added, one set to which a sub pixel which emits yellow to expand a color reproducing range is added, or one set to which sub pixels which emit yellow and cyan to expand a color reproducing range are added).

With the organic EL display apparatus, the arrangement or configuration regarding the scanning circuits, various types of circuits such as a signal output circuit or the like, various types of wiring such as scanning lines, data lines, and so forth, power supply unit, and organic electroluminescent light emitting units (hereafter, simply referred to as "light emitting units" in some cases) may be a arrangement or configuration according to the related art. Specifically, the light emitting unit may be configured of, for example, an anode electrode, a hole transporting layer, a light emitting layer, an electron transporting layer, a cathode electrode, and so forth.

One example of a transistor making up the driving circuit is a n-channel type thin film transistor (TFT). The transistor making up the driving circuit may be an enhanced type or depression type. With the n-channel type transistor, a LDD (Lightly Doped Drain) structure may be formed. In some cases, the LDD structure may be formed asymmetrically. For example, a great current flows into the driving transistor at the time of emitting an organic EL display element, and accordingly, an arrangement may be made wherein the LDD structure is formed only on one of the source/drain regions serving as the drain region side at the time of emitting light. Note that, for example, a p-channel type thin film transistor may be employed as the writing transistor or the like.

The capacitor unit making up the driving circuit may be configured of one of the electrodes, the other electrode, and a dielectric layer (insulating layer) between these electrodes. The above transistor and capacitor unit making up the driving circuit are formed within a certain plane (e.g., formed on a support member), and the light emitting unit is formed above the transistor and capacitor unit making up the driving circuit, for example, via an interlayer insulating layer. Also, the other source/drain region of the driving transistor is connected to the anode electrode provided to the light emitting unit, for example, via a contact hole. Note that an arrangement may be made wherein the transistor is formed on a semiconductor substrate or the like.

Before the present invention is described based on embodiments with reference to the drawings, an overview of an organic EL display apparatus used for each of the embodiments will be described.

Overview of Organic EL Display Apparatus Used for Each Embodiment

An organic EL display apparatus suitably used for each of the embodiments is an organic EL display apparatus including multiple pixels. One pixel is made up of multiple sub pixels (with each of the embodiments, three sub pixels of a red light emitting sub pixel, a green light emitting sub pixel, and a blue light emitting sub pixel). Each sub pixel is configured of an organic EL display element 10 having a configuration wherein a driving circuit 11, and a light emitting unit (light emitting unit ELP) connected to the driving circuit 11 are layered.

Figure 2:
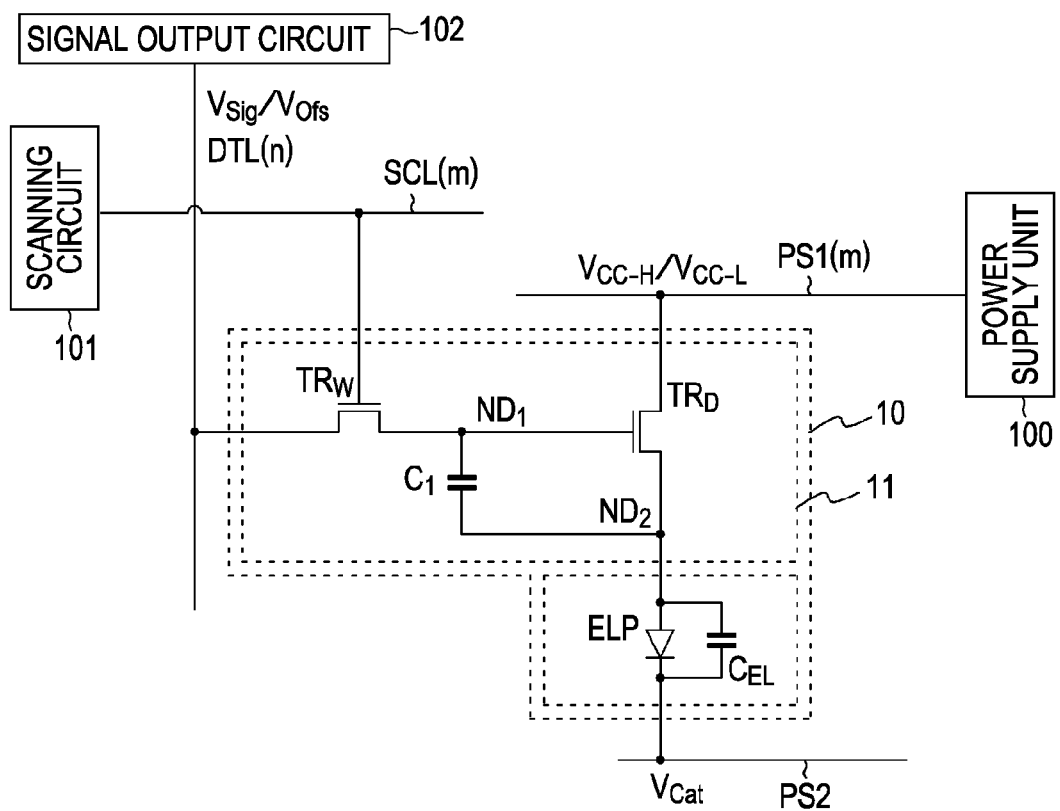
FIG. 2 is an equivalent circuit diagram of an organic electroluminescent display element including a driving circuit.
Figure 16:
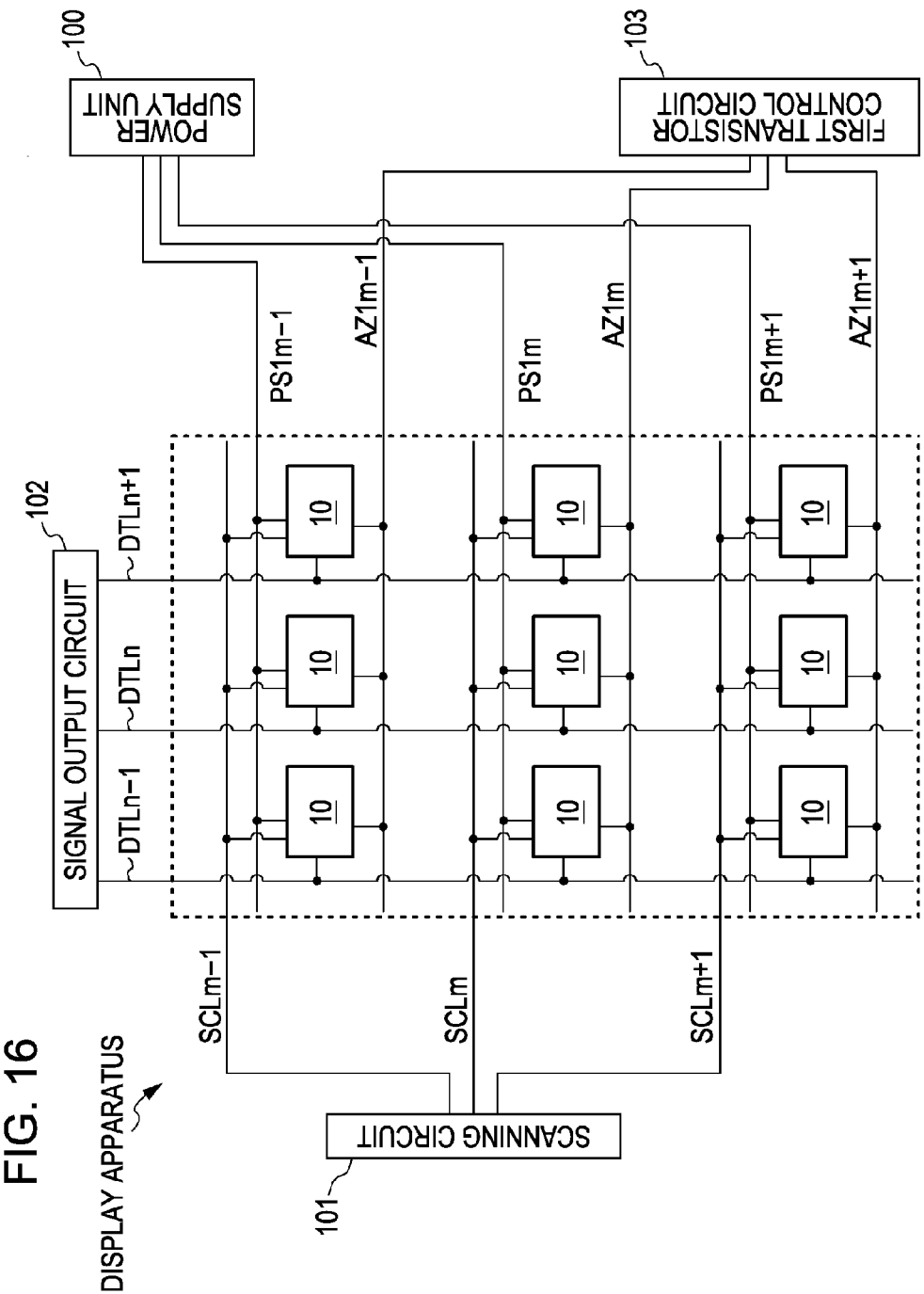
FIG. 16 is a conceptual diagram of an organic electroluminescent display apparatus according to a second embodiment.
Figure 17:
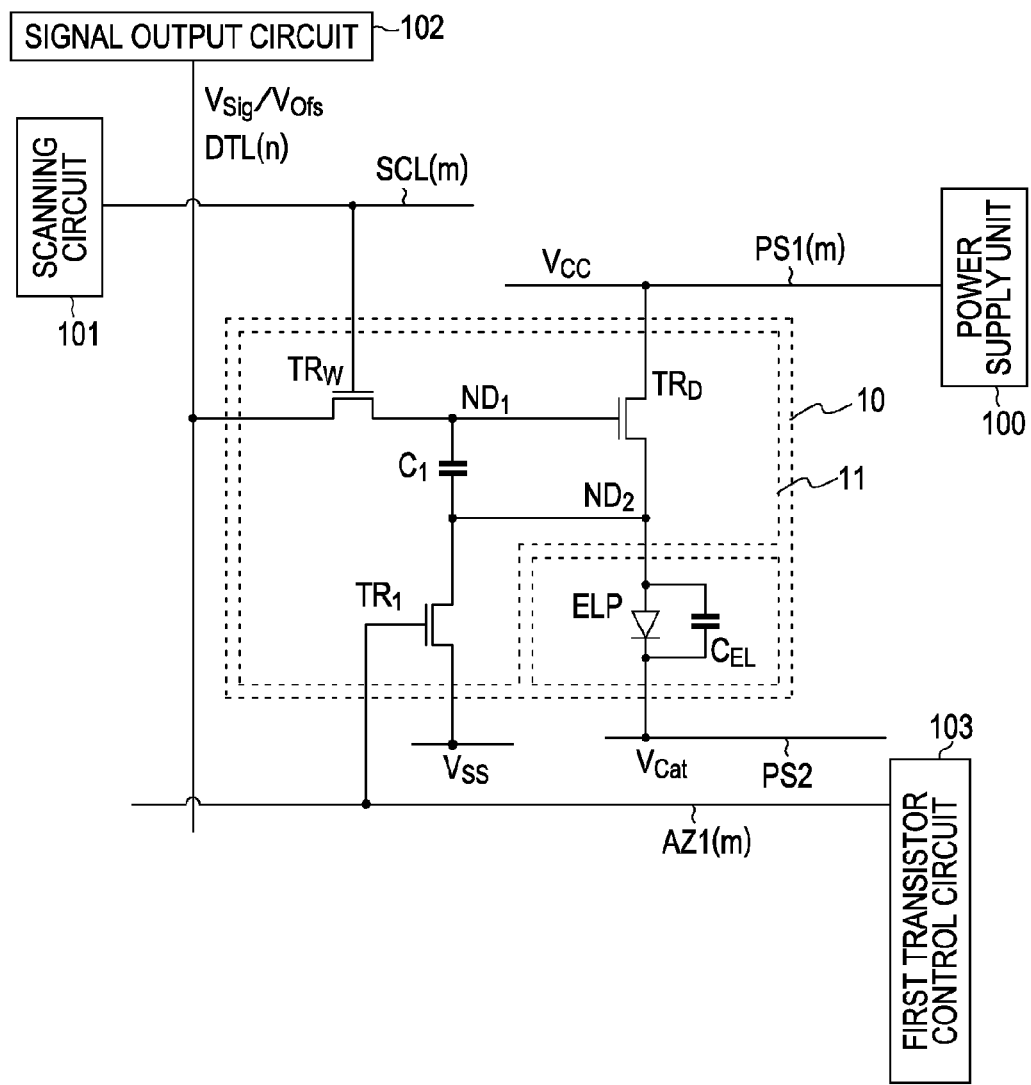
FIG. 17 is an equivalent circuit diagram of an organic electroluminescent display element including a driving circuit.
Figure 21:
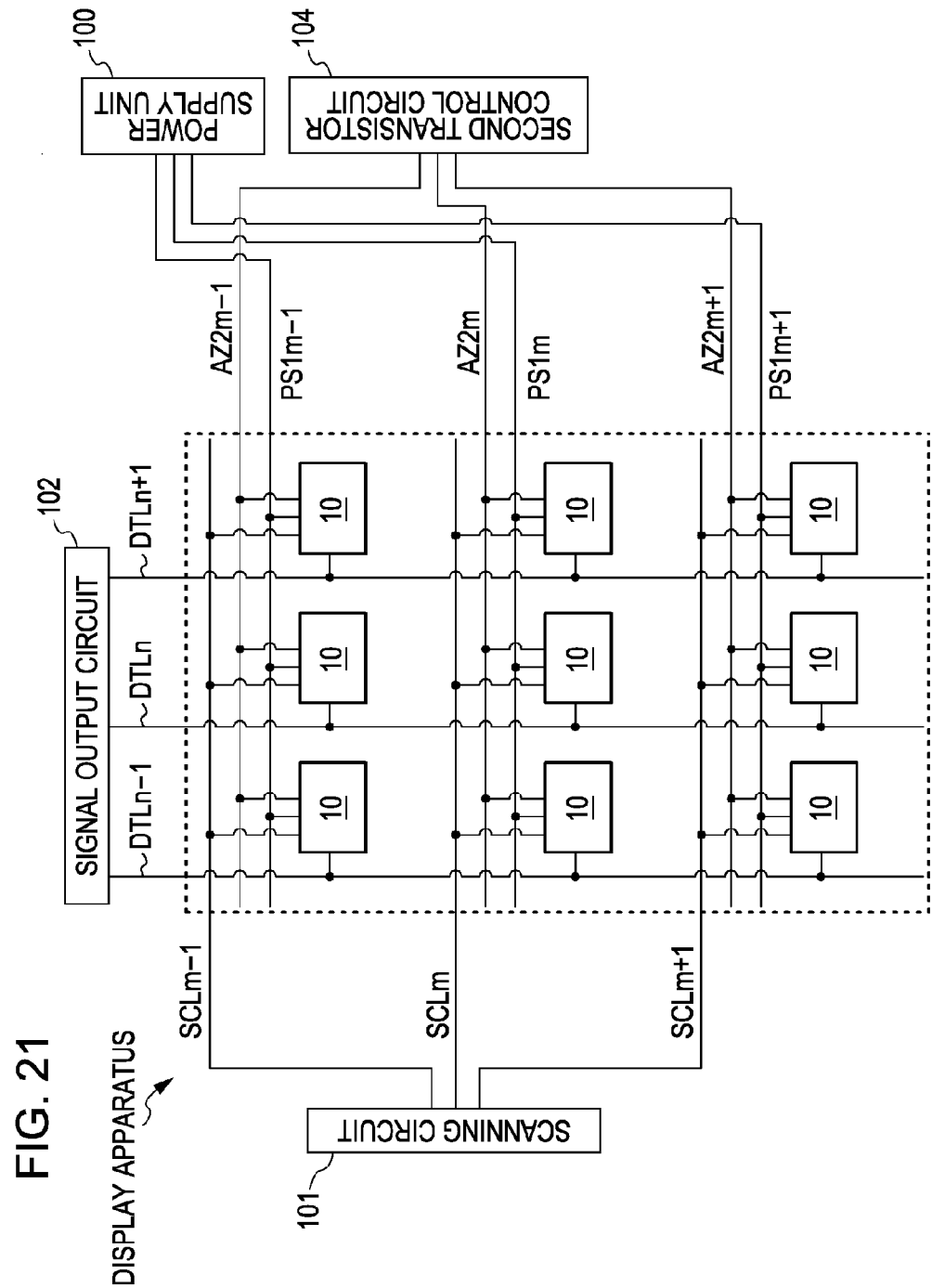
FIG. 21 is a conceptual diagram of an organic electroluminescent display apparatus according to a third embodiment.
Figure 22:
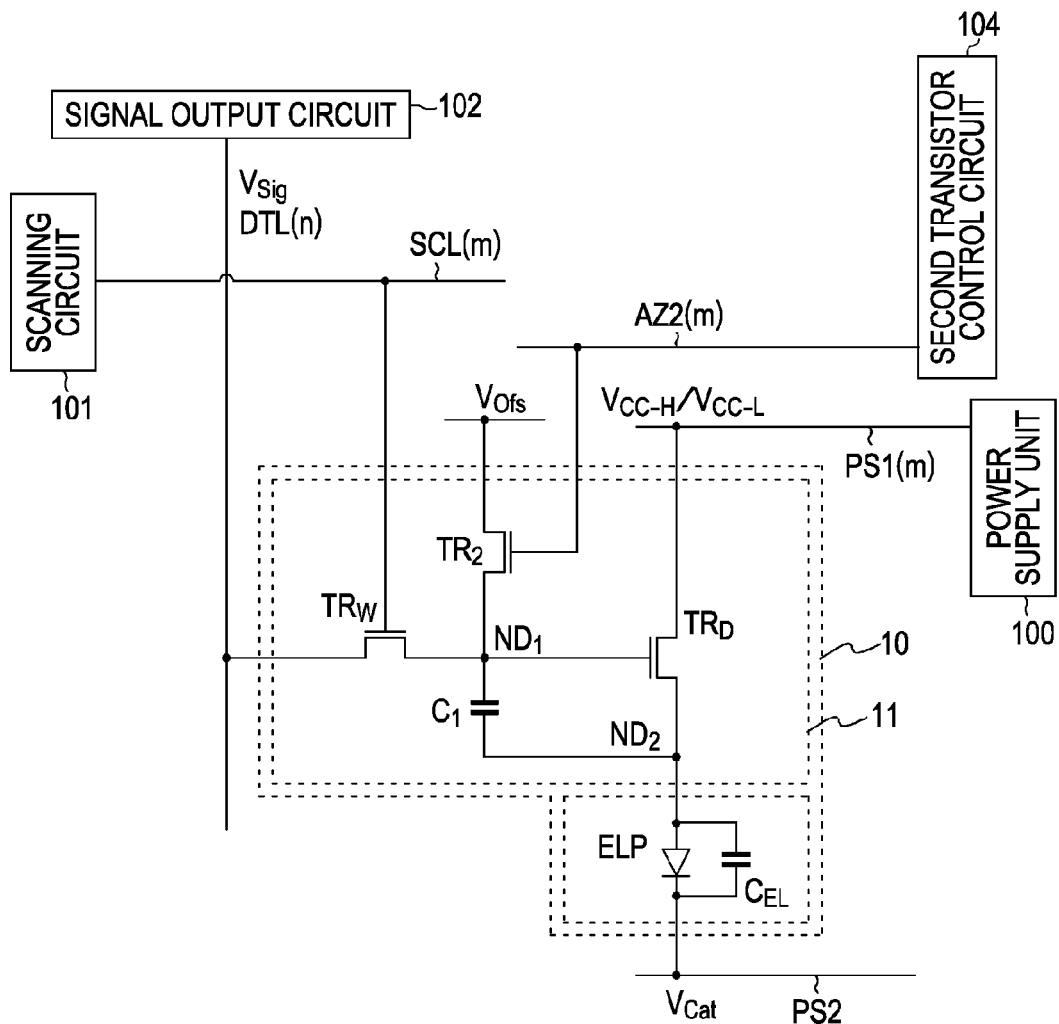
FIG. 22 is an equivalent circuit diagram of an organic electroluminescent display element including a driving circuit.
Figure 26:
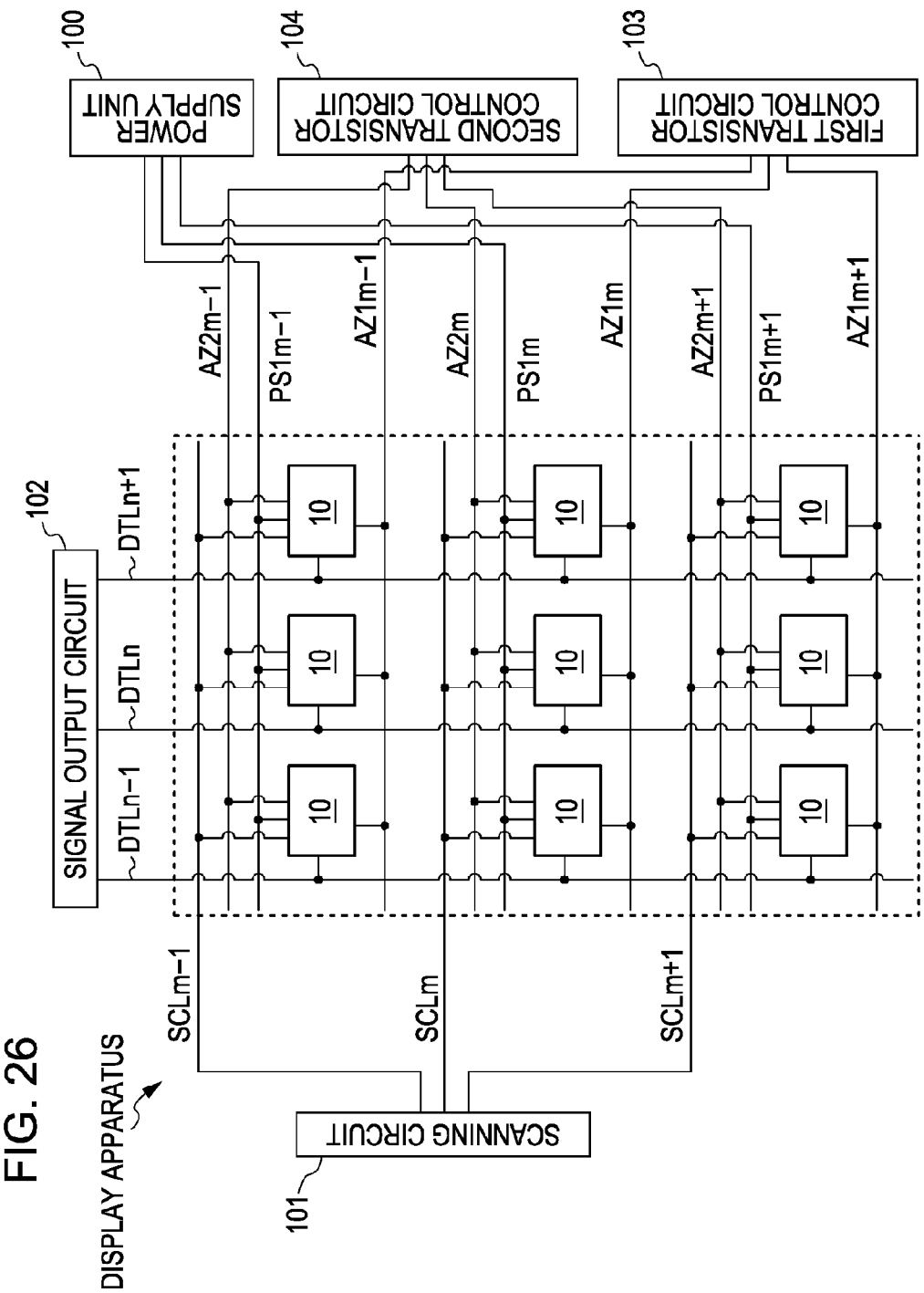
FIG. 26 is a conceptual diagram of an organic electroluminescent display apparatus according to a fourth embodiment.
Figure 27:
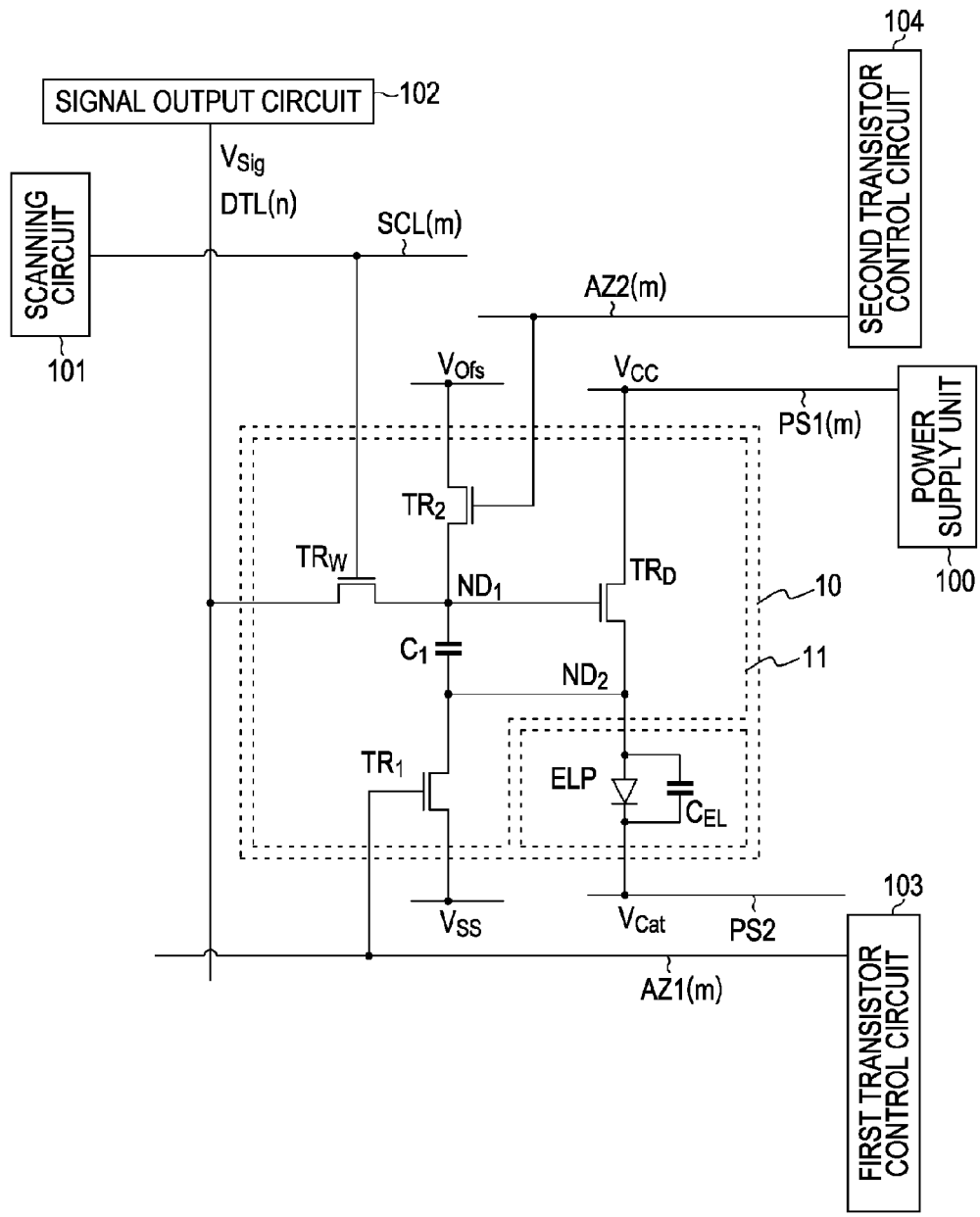
FIG. 27 is an equivalent circuit diagram of an organic electroluminescent display element including a driving circuit.

The conceptual diagrams of organic EL display apparatuses according to first, second, third, and fourth embodiments are illustrated in FIGS. 1, 16, 21, and 26, respectively. The equivalent circuit diagrams of the organic EL display elements making up the organic EL display apparatuses according to the first, second, third, and fourth embodiments are illustrated in FIGS. 2, 17, 22, and 27, respectively. FIG. 2 illustrates a driving circuit basically configured of 2 transistors/1 capacitor unit (referred to as "2Tr/1C driving circuit" in some cases). FIGS. 17 and 22 illustrate a driving circuit basically configured of 3 transistors/1 capacitor unit. Note that the circuit shown in FIG. 17 will be referred to as a "first 3Tr/1C driving circuit", and the circuit shown in FIG. 22 will be referred to as a "second 3Tr/1C driving circuit", in some cases. FIG. 27 illustrates a driving circuit basically configured of 4 transistors/one capacitor unit (referred to as "4Tr/1C driving circuit" in some cases).

Now, the organic electroluminescent display apparatus according to each of the embodiments includes (1) a scanning circuit 101

(2) a signal output circuit 102

(3) organic electroluminescent display elements 10 arrayed in a two-dimensional manner in total N×M of N elements in the first direction, and M elements in the second direction that is different from the first direction, each of which includes an organic electroluminescent light emitting unit ELP, and a driving circuit 11 used for driving the organic electroluminescent light emitting unit ELP thereof, (4) M scanning lines SCL which are connected to the scanning circuit 101 and extended to the first direction, (5) N data lines DTL which are connected to the signal output circuit 102 and extended to the second direction, and (6) a power supply unit 100.

FIGS. 1, 16, 21, and 26 illustrate 3×3 organic EL display elements 10, but these are only examples. Note that the power supply line PS2 shown in FIG. 2 and the like are omitted in FIGS. 1, 16, 21, and 26 for the sake of explanatory convenience.

The light emitting unit ELP has a arrangement or configuration according to the related art, made up of, for example, an anode electrode, a hole transporting layer, a light emitting layer, an electron transporting layer, a cathode electrode, and so forth. The arrangement or configuration of the scanning circuit 101, signal output circuit 102, scanning line SCL, data line DTL, and power supply unit 100 may be an arrangement or configuration according to the related art.

The minimum components of the driving circuit 11 will be described. The driving circuit 11 is configured of at least a driving transistor $TR_D$, a writing transistor $TR_W$, and a capacitor unit $C_1$ including a pair of electrodes. The driving transistor $TR_D$ is configured of an n-channel type TFT including source/drain regions, a channel forming region, and a gate electrode. Also, the writing transistor $TR_W$ is also configured of an n-channel type TFT including source/drain regions, a channel forming region, and a gate electrode. Note that the writing transistor $TR_W$ may be configured of a p-channel type TFT.

Now, with the driving transistor $TR_D$, (A-1) one of the source/drain regions is connected to the power supply unit 100, (A-2) the other source/drain region is connected to the anode electrode included in the light emitting unit ELP, and is connected to one of the electrodes of the capacitor unit $C_1$, which makes up a second node $ND_2$, and (A-3) the gate electrode is connected to the other source/drain region of the writing transistor $TR_W$, and is also connected to the other electrode of the capacitor unit $C_1$, which makes up a first node $ND_1$.

Also, with the writing transistor $TR_W$, (B-1) one of the source/drain regions is connected to a data line DTL, and (B-2) the gate electrode is connected to a scanning line SCL.

Figure 3:
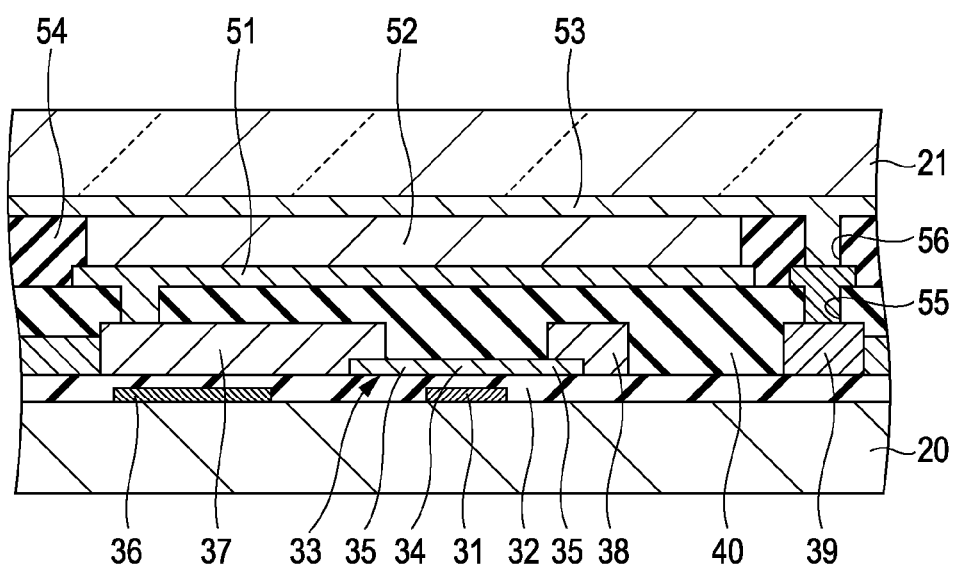
FIG. 3 is a schematic partial cross-sectional view of the organic electroluminescent display apparatus.

FIG. 3 illustrates a schematic partial cross-sectional view of a portion of the organic EL display apparatus. The transistors $TR_D$ and $TR_W$, and the capacitor unit $C_1$ which make up the driving circuit 11 are formed above the support member 20, and the light emitting unit ELP is formed above the transistors $TR_D$ and $TR_W$, and the capacitor unit $C_1$ which make up the driving circuit 11, for example, via an interlayer insulating layer 40. Also, the other source/drain region of the driving transistor $TR_D$ is connected to the anode electrode provided to the light emitting unit ELP via a contact hole. Note that FIG. 3 illustrates only the driving transistor $TR_D$. The other transistors are hidden and not visible.

More specifically, the driving transistor $TR_D$ is configured of a gate electrode 31, a gate insulating layer 32, source/drain regions 35 and 35 provided to a semiconductor layer 33, and a channel forming region 34 which is equivalent to the portion of the semiconductor layer 33 between the source/drain regions 35 and 35. On the other hand, the capacitor unit $C_1$ is made up of the other electrode 36, a dielectric layer configured of an extending portion of the gate insulating layer 32, and one electrode 37 (equivalent to the second node $ND_2$). The gate electrode 31, a portion of the gate insulating layer 32, and the electrode 36 making up the capacitor $C_1$ are formed on the support member 20. One of the source/drain regions 35 of the driving transistor $TR_D$ is connected to a wiring 38, and the other source/drain region 35 is connected to one electrode 37. The driving transistor $TR_D$ and the capacitor unit $C_1$ and the like are covered with the interlayer insulating layer 40, and the light emitting unit ELP made up of an anode electrode 51, a hole transporting layer, a light emitting layer, an electron transporting layer, and a cathode electrode 53 are provided above the interlayer insulating layer 40. Note that the hole transporting layer, light emitting layer, and electron transporting layer are represented with one layer 52 in the drawing. A second interlayer insulating layer 54 is provided above a portion of the interlayer insulating layer 40 where no light emitting unit ELP is provided, a transparent substrate 21 is disposed above the second interlayer insulating layer 54 and cathode electrode 53, and light emitted at the light emitting layer passes through the substrate 21 and emitted externally. Note that the one electrode 37 (second node $ND_2$) and the anode electrode 51 are connected by a contact hole provided to the interlayer insulating layer 40. Also, the cathode electrode 53 is connected to a wiring 39 provided above the extending portion of the gate insulating layer 32 via contact holes 56 and 55 provided to the second interlayer insulating layer 54, and interlayer insulating layer 40.

A manufacturing method for the organic EL display apparatus shown in FIG. 3 and the like will be described. First, various types of wiring such as the scanning line SCL and so forth, the electrodes making up the capacitor unit $C_1$, the transistor made up of the semiconductor layer, the interlayer insulating layer, contact holes, and the like are formed above the support member 20 by a method according to the related art. Next, film formation and patterning are performed by a method according to the related art to form a light emitting unit ELP arrayed in a matrix manner. Subsequently, after the support member 20 and substrate 21 subjected to the above process are made to face each other, and the perimeter thereof is sealed, for example, connection to an external circuit is performed, whereby an organic EL display apparatus can be obtained.

The organic EL display apparatus is configured of pixels arrayed in a two-dimensional matrix manner of (N/3)×M pixels. Let us say that the organic EL display element 10 making up each pixel being driven in line order, and a display frame rate is FR (times/second). Specifically, the organic EL display element 10 making up each of (N/3) pixels (N sub pixels) arrayed at the m'th row (where m=1, 2, 3, and so on through M) is simultaneously driven. In other words, with organic EL display elements making up one row, the emitting/non-emitting timing thereof is controlled in increments of rows to which the organic EL display elements thereof belong. Note that processing wherein a video signal is written to pixels making up one row may be processing wherein a video signal is written to all the pixels simultaneously (hereafter, simply referred to as "simultaneous writing processing" in some cases), or processing wherein a video signal is written sequentially for each pixel (hereafter, simply referred to as "sequential writing processing" in some cases). Whether to determine either writing processing may be selected according to the configuration of the organic EL display apparatus as appropriate.

Now, driving and operation will be described regarding the organic EL display elements 10 positioned at the m'th row, and the n'th column (where n=1, 2, 3, and so on through N), but such organic EL display elements 10 will be referred below to as the (n, m)'th organic EL display elements 10 or the (n, m)'th sub pixels. Various types of processing (later-described threshold voltage cancellation processing, writing processing, and mobility correction processing) is executed until the horizontal scanning period (the m'th horizontal scanning period) of the organic EL display elements 10 arrayed at the m'th row is completed. Note that the writing processing or mobility correction processing is executed within the m'th horizontal scanning period, but is executed over from the (m−m")'th horizontal scanning period to the m'th horizontal scanning period in some cases. On the other hand, the threshold voltage cancellation processing and the preprocessing along therewith may be executed before the m'th horizontal scanning period depending on the type of the driving circuit.

Subsequently, after all the above various types of processing are completed, the light emitting units making up the organic EL display elements 10 arrayed in the m'th row are emitted. Note that after the above various types of processing are all completed, the light emitting units may be emitted immediately or may be emitted after a predetermined period (e.g., the horizontal scanning period for a predetermined number of rows) elapses. This predetermined period may be set according to the specification of the organic EL display apparatus, the configuration of the driving circuit, or the like as appropriate. Let us say that the light emitting unit emits light immediately after various types of processing in the following description, for the sake of explanatory convenience. Subsequently, the emitting state of the light emitting unit making up each of the organic EL display elements 10 arrayed at the m'th row continues until immediately before the start of the horizontal scanning period of each of the organic EL display elements 10 arrayed at the (m+m')'th row. Here, "m" is determined with the design specification of the organic EL display apparatus. That is to say, emitting by the light emitting unit making up each of the organic EL display elements 10 arrayed at the m'th row of a certain display frame continues until the horizontal scanning period of the (m+m'−1)'th. On the other hand, a reverse voltage is applied between the anode electrode and cathode electrode of the light emitting unit EL from the commencement of the (m+m')'th horizontal scanning period, for example, to the commencement of a later-described auxiliary driving process, thereby maintaining the non-emitting state. Providing a non-emitting state (hereafter, simply referred to as "non-emitting" period in some cases), reduces afterimage blurring due to active matrix driving, and moving image quality can further be improved. Also, the time length of the horizontal scanning period is time length less than (1/FR)×(1/M) seconds. In the case that the value of (m+m') exceeds M, the horizontal scanning period for the exceeding part is processed with the next display frame. However, the emitting state/non-emitting state of each sub pixel (organic EL display element 10) is not restricted to the above states. An arrangement may be made wherein the emitting state/non-emitting state is repeated multiple times until the commencement of the auxiliary driving process after the above various types of processing are all completed.

With the two source/drain regions including a single transistor, the term "one of the source/regions" is used to refer to the source/drain regions on the side connected to the power supply unit in some cases. Also, this means a state in which a channel is formed between the source/drain regions that the transistor is in an on state. Whether or not a current flows from one of the source/drain regions of such a transistor to the other source/drain region is irrelevant. On the other hand, when the transistor is in an off state, this means a state in which no channel is formed between the source/drain regions. Also, a situation in which the source/drain regions of a certain transistor are connected to the source/drain regions of another transistor includes a mode wherein the source/drain regions of a certain transistor and the source/drain regions of another transistor occupy the same region. Further, the source/drain regions may be configured of not only an electroconductive material such as polysilicon, amorphous silicon, or the like which includes impurities, but also metal, alloy, electroconductive particle, a layered structure of these, or a layer made up of an organic material (electroconductive polymer). Also, with timing charts employed for the following description, the length (time length) of the lateral axis that indicates each period is schematically illustrated, and does not illustrate a rate of the time length of each period. This is true for the vertical axis. Also, with the timing charts, waveform shapes are also schematically illustrated.

The driving method for the light emitting unit ELP will be described below by way of embodiments.

First Embodiment

A first embodiment relates to the driving method for the organic electroluminescent light emitting unit according to the embodiments of the present invention. With the first embodiment, a driving circuit 11 is configured of a 2 transistors/1 capacitor unit. The equivalent circuit diagram of an organic EL display element 10 including the driving circuit 11 is illustrated in FIG. 2.

First, the details of the driving circuit and light emitting unit will be described. The driving circuit 11 is configured of two transistors of a writing transistor $TR_W$, and a driving transistor $TR_D$, and further one capacitor unit $C_1$ (2Tr/1C driving circuit).

Driving Transistor $TR_D$

One of the source/drain regions of the driving transistor $TR_D$ is connected to the power supply unit 100 via a power supply line PS1. On the other hand, the other source/drain region of the driving transistor $TR_D$ is connected to

[1] the anode electrode of the light emitting unit ELP, and

[2] one of the electrodes of the capacitor unit $C_1$, which makes up a second node $ND_2$. Also, the gate electrode of the driving transistor $TR_D$ is connected to

[1] the other source/drain region of the writing transistor $TR_W$, and

[2] the other electrode of the capacitor unit $C_1$, which makes up a first node $ND_1$. Note that a voltage $V_{CC-H}$ and a voltage $V_{CC-L}$ are supplied from the power supply unit 100, as described later.

Now, in the emitting state of the organic EL display element 10, the driving transistor $TR_D$ is driven so as to supply a drain current $I_{ds}$ in accordance with the following Expression (1). In the emitting state of the organic EL display element 10, one of the source/drain regions of the driving transistor $TR_D$ serves as a drain region, and the other source/drain region serves as a source region. For the sake of explanatory convenience, with the following description, one of the source/drain regions of the driving transistor $TR_D$ is simply referred to as "drain region", and the other source/drain region is simply referred to as "source region" in some cases. Note the following.

μ: effective mobility
L: channel length
W: channel width
$V_{gs}$: potential difference between gate electrode and source region
$V_{th}$: threshold voltage
$C_{ox}$: (relative permittivity of gate insulating layer)×(dielectric constant of vacuum)/(thickness of gate insulating layer)

$$k \approx (1/2) \cdot (W/L) \cdot C_{ox}$$

$$I_{ds} = k \cdot \mu \cdot (V_{gs} - V_{th})^2 \quad (1)$$

This drain current $I_{ds}$ flows into the light emitting unit ELP of the organic EL display element 10, whereby the light emitting unit ELP of the organic EL display element 10 emits light. Further, the emitting state (brightness) at the light emitting unit ELP of the organic EL display element 10 is controlled with the size of the value of the drain current $I_{ds}$.

Writing Transistor $TR_W$

The other source/drain region of the writing transistor $TR_W$ is, as described above, connected to the gate electrode of the driving transistor $TR_D$. On the other hand, one of the source/drain regions of the writing transistor $TR_W$ is connected to the data line DTL. Subsequently, a video signal (driving signal, brightness signal) $V_{Sig}$ used for controlling the brightness at the light emitting unit ELP is supplied to one of the source/drain sources from the signal output circuit 102 via the data line DTL. Note that various types of signal or voltage (signal used for precharge driving, various types of reference voltage, etc.) other than the $V_{Sig}$ may be supplied to one of the source/ drain regions via the data line DTL. Also, the on/off operation of the writing transistor $TR_W$ is controlled by a signal from the scanning line SCL connected to the gate electrode of writing transistor $TR_W$, specifically, by a signal from the scanning circuit 101.

Light Emitting Unit ELP

The anode electrode of the light emitting unit ELP is, as described above, connected to the source region of the driving transistor $TR_D$. On the other hand, the cathode electrode of the light emitting unit ELP is connected to a power supply line PS2 to which a voltage $V_{cat}$ is applied. The parasitic capacitance of the light emitting unit ELP is represented with a symbol $C_{EL}$. Also, let us say that the threshold voltage for emitting of the light emitting unit ELP is $V_{th-EL}$. That is to say, upon a voltage of $V_{th-EL}$ or more being applied between the anode electrode and cathode electrode of the light emitting unit ELP, the light emitting unit ELP emits light.

Next, the driving method for the light emitting unit ELP according to the first embodiment will be described.

With the following description, the values of voltages or potentials are as follows, but these are explanatory values, and accordingly, the values are not restricted to these.

$V_{Sig}$: a video signal used for controlling the brightness of the light emitting unit ELP . . . 0 through 10 volts
$V_{CC-H}$: a driving voltage used for supplying a current to the light emitting unit ELP . . . 20 volts
$V_{CC-L}$: a second node initializing voltage . . . −10 volts
$V_{Ofs}$: a first node initializing voltage used for initializing the potential of the gate electrode of the driving transistor $TR_D$ (the potential of the first node $ND_1$) . . . 0 volt
$V_{th}$: the threshold voltage of the driving transistor $TR_D$ . . . 3 volts
$V_{cat}$: a voltage to be applied to the cathode electrode of the light emitting unit ELP . . . 0 volt
$V_{th-EL}$: the threshold voltage of the light emitting unit ELP . . . 3 volts The driving method for the light emitting unit ELP according to each embodiment includes the following processes using the driving circuit:

a process (a) to execute preprocessing, wherein the potential of the first node $ND_1$, and the potential of the second node $ND_2$ are initialized such that the potential difference between the first node $ND_1$ and the second node $ND_2$ exceeds the threshold voltage $V_{th}$ of the driving transistor $TR_D$, and also the potential difference between the second node $ND_2$ and a cathode electrode provided to the light emitting unit ELP does not exceed the threshold voltage $V_{th-EL}$ of the light emitting unit ELP;

a process (b) to execute threshold voltage cancellation processing, wherein the potential of the second node $ND_2$ is changed toward a potential obtained by subtracting the threshold voltage $V_{th}$ of the driving transistor $TR_D$ from the potential of the first node $ND_1$ in a state in which the potential of the first node $ND_1$ is maintained;

a process (c) to execute writing processing, wherein the video signal $V_{Sig}$ is applied to the first node $ND_1$ from the data line DTL via the writing transistor $TR_W$ which has been set to an on state by a signal from the scanning line SCL;

a process (d) to set the first node $ND_1$ to a floating state by setting the writing transistor $TR_W$ to an off state based on a signal from the scanning line SCL; and a process (e) to execute a series of processes at least once, wherein, after a current according to the value of potential difference between the first node $ND_1$ and the second node $ND_2$ is supplied to the light emitting unit ELP from the power supply unit 100 via the driving transistor $TR_D$ to drive the light emitting unit ELP, a reverse voltage is applied between the anode electrode and the cathode electrode of the light emitting unit ELP.

Further, with the driving method for the light emitting unit ELP according to each embodiment, a series of processes from the processes (a) through (e) are executed repeatedly, and also there is provided an auxiliary driving process between the processes (e) and (a) to apply a forward voltage between the anode electrode and the cathode electrode of the light emitting unit ELP over a certain period, and a period between the termination of the auxiliary driving process and the termination of the next process (b) is suppressed to 1 millisecond or less.

FIG. 4 schematically illustrates the driving timing chart of the light emitting ELP according to the first embodiment. There are provided periods $TP(2)_7$ and $TP(2)_8$, between the termination of the period $TP(2)_6$ and the commencement of the period $TP(2)_{+1}$ shown in FIG. 4, which will be described later. The above auxiliary driving process is executed at the period $TP(2)_7$.

First, in order to assist understanding of the embodiments of the present invention, description will be made regarding, of the processes of the driving method of the light emitting unit ELP according to the first embodiment, operation in the case of omitting the above auxiliary driving process, and a problem in the case thereof. The driving timing chart of the light emitting unit ELP according to a reference example is schematically illustrated in FIG. 5, wherein the operation in the periods $TP(2)_7$ and $TP(2)_8$ shown in FIG. 4 is omitted, and these periods are all included in the previous period $TP(2)_6'$. The on/off state and so forth of each of the transistors are schematically illustrated in FIGS. 6A through 6F, and FIGS. 7A and 7B.

The periods $TP(2)_0$ through $TP(2)_3$ shown in FIG. 5 are operation periods until immediately before the period $TP(2)_4$ where the writing processing is executed. With the periods $TP(2)_0$ through $TP(2)_3$, the (n, m)'th organic EL display element 10 is in a non-emitting state as a general rule. As shown in FIG. 5, in addition to the period $TP(2)_4$, the periods $TP(2)_1$ through $TP(2)_3$ are included in the m'th horizontal scanning period. Note that description will be made assuming that the commencement of the period $TP(2)_1$ and the termination of the $TP(2)_4$ are matched with the commencement and termination of the m'th horizontal scanning period respectively, for the sake of explanatory convenience.

Description will be made below regarding each period of the periods $TP(2)_0$ through $TP(2)_3$. Note that the length of each period of the periods $TP(2)_1$ through $TP(2)_3$ may be set according to the design of the organic EL display apparatus as appropriate.

Period $TP(2)_0$ (See FIGS. 5 and 6A)

This period $TP(2)_0$ is, for example, operation from the previous display frame to the current display frame. That is to say, this period $TP(2)_0$ is a period from the (m+m')'th horizontal scanning period of the previous display frame to the (m−1)'th horizontal scanning period of the current display frame. With this period $TP(2)_0$, the (n, m)'th organic EL display element 10 is in a non-emitting state. The commencement of the period $TP(2)_0$ is not shown, but the voltage supplied from the power supply unit 100 is switched from the driving voltage $V_{CC-H}$ to the second node initializing voltage $V_{CC-L}$. As a result thereof, the potential of the second node $ND_2$ decreases to $V_{CC-L}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with potential decrease of the second node $ND_2$.

As described later, with the organic EL display apparatus according to the first embodiment, at each horizontal scanning period the first node initializing voltage $V_{Ofs}$ is applied from the signal output circuit 102 to the data line DTL, and subsequently, the video signal $V_{Sig}$ is applied thereto instead of the first node initializing voltage $V_{Ofs}$. More specifically, the first node initializing voltage $V_{Ofs}$ is applied to the data line DTL, corresponding to the m'th horizontal scanning period of the current display frame, and subsequently, a video signal (represented by $V_{Sig\_m}$ for the sake of explanatory convenience, also true for the other video signals) corresponding to the (n, m)'th sub pixel is applied thereto instead of the first node initializing voltage $V_{Ofs}$. Similarly, the first node initializing voltage $V_{Ofs}$ is applied to the data line DTL, corresponding to the (m+1)'th horizontal scanning period, and subsequently, a video signal $V_{Sig\_m+1}$ corresponding to the (n, m+1)'th sub pixel is applied thereto instead of the first node initializing voltage $V_{Ofs}$. Though description has been omitted in FIG. 5, the first node initializing voltage $V_{Ofs}$ and the video signal $V_{Sig}$ are applied to the data line DTL even at each horizontal scanning period other than the m'th and (m+1)'th horizontal scanning periods.

Period $TP(2)_1$ (See FIGS. 5 and 6B)

Subsequently, the horizontal scanning period at the m'th row of the current display frame is started. With this period $TP(2)_1$, the above process (a), i.e., the above preprocessing is executed.

With the first embodiment, at the above process (a) the first node initializing voltage $V_{Ofs}$ is applied from the data line DTL to the first node $ND_1$ via the writing transistor $TR_W$ which has been set to an on state by a signal from the scanning line SCL. Also, at the process (a) the second node initializing voltage $V_{CC-L}$ is applied from the power supply unit 100 to the second node $ND_2$ via the driving transistor $TR_D$.

Specifically, at the time of the commencement of the period $TP(2)_1$ the scanning line SCL is set to a high level, thereby setting the writing transistor $TR_W$ to an on state. As a result thereof, the potential of the first node $ND_1$ becomes $V_{Ofs}$ (0 volt). The second node initializing voltage $V_{CC-L}$ is applied from the power supply unit 100 to the second node $ND_2$, and accordingly, the potential of the second node $ND_2$ holds $V_{CC-L}$ (−10 volts).

The potential difference between the first node $ND_1$ and the second node $ND_2$ is 10 volts, and the threshold voltage $V_{th}$ of the driving transistor $TR_D$ is 3 volts, and accordingly, the driving transistor $TR_D$ is in an on state. Note that the potential difference between the second node $ND_2$ and the cathode electrode provided to the light emitting unit ELP is −10 volts, and accordingly, does not exceed the threshold voltage $V_{th-EL}$ of the light emitting unit ELP. Thus, the preprocessing has been completed wherein the potential of the first node $ND_1$ and the potential of the second node $ND_2$ have been initialized.

Period $TP(2)_2$ (See FIGS. 5 and 6C)

With this period $TP(2)_2$, the above process (b), i.e., the above threshold voltage cancellation processing is executed.

With the first embodiment, at the process (b) a state is maintained wherein the first node initializing voltage $V_{Ofs}$ is applied from the data line DTL to the first node $ND_1$ via the writing transistor $TR_W$ which has been set to an on state by a signal from the scanning line SCL, thereby maintaining the potential of the first node $ND_1$. Also, at the process (b) a voltage is applied from the power supply unit 100 to one of the source/drain regions of the driving transistor $TR_D$, which is higher than a voltage obtained by subtracting the threshold voltage $V_{th}$ of the driving transistor $TR_D$ from the potential of the first node $ND_1$, thereby changing the potential of the second node $ND_2$ toward the potential obtained by subtracting the threshold voltage $V_{th}$ of the driving transistor $TR_D$ from the potential of first node $ND_1$.

That is to say, while maintaining the on state of the writing transistor $TR_W$, the voltage supplied from the power supply unit 100 is switched from $V_{CC-L}$ to $V_{CC-H}$. As a result thereof, the potential of the first node $ND_1$ is not changed (maintains $V_{Ofs}$=0 volt), but the potential of the second node $ND_2$ is changed toward the potential obtained by subtracting the threshold voltage $V_{th}$ of the driving transistor $TR_D$ from the potential of the first node $ND_1$. That is to say, the potential of the second node $ND_2$ in a floating state increases. For the sake of explanatory convenience, let us say that the length of the period $TP(2)_2$ is sufficient to change the potential of the second node $ND_2$.

In the case that this period $TP(2)_2$ is sufficiently long, the potential difference between the gate electrode and the other source/drain region of the driving transistor $TR_D$ reaches $V_{th}$, and the driving transistor $TR_D$ goes to an off state. That is to say, the potential of the second node $ND_2$ in a floating state comes close to ($V_{Ofs}$−$V_{th}$=−3 volts), and finally, becomes ($V_{Ofs}$−$V_{th}$). Now, if the following Expression (2) is assured, in other words, if a potential is selected and determined so as to satisfy Expression (2), the light emitting unit ELP does not emit light.

$$(V_{Ofs}-V_{th})<(V_{th-EL}+V_{Cat}) \qquad (2)$$

With this period $TP(2)_2$, the potential of the second node $ND_2$ finally becomes ($V_{Ofs}$−$V_{th}$). That is to say, the potential of the second node $ND_2$ is determined depending on only the voltage $V_{Ofs}$ used for initializing the potentials of the threshold voltage $V_{th}$ of the driving transistor $TR_D$, and the gate electrode of the driving transistor $TR_D$, but is unrelated to the threshold voltage $V_{th-EL}$ of the light emitting unit ELP.

Period $TP(2)_3$ (See FIGS. 5 and 6D)

With the commencement of the period $TP(2)_3$, the writing transistor $TR_W$ is set to an off state by a signal from the scanning line SCL. Also, the voltage to be applied to the data line DTL is switched from the first node initializing voltage $V_{Ofs}$ to the video signal $V_{Sig\_m}$. With the threshold voltage cancellation processing, in the case that the driving transistor $TR_D$ has reached an off state, the potentials of the first node $ND_1$ and the second node $ND_2$ are not changed substantially. Note that, with the threshold voltage cancellation processing, in the case that the driving transistor $TR_D$ has not reached an off state, a bootstrap operation occurs at the period $TP(2)_3$, and the potentials of the first node $ND_1$ and the second node $ND_2$ somewhat increase.

Period $TP(2)_4$ (See FIGS. 5 and 6E)

The above process (c), i.e., the above writing processing is executed within this period. The writing transistor $TR_W$ is set to an on state by a signal from the scanning line SCL. Subsequently, the video signal $V_{Sig\_m}$ is applied from the data line DTL to the first node $ND_1$ via the writing transistor $TR_W$. As a result thereof, the potential of the first node $ND_1$ increases to $V_{Sig\_m}$. The driving transistor $TR_D$ is in an on state. Note that an arrangement may be made wherein at the period $TP(2)_3$ the on state of the writing transistor $TR_W$ is maintained in some cases. With this arrangement, the writing processing is started immediately after the voltage of the data line DTL is switched from the first node initializing voltage $V_{Ofs}$ to the video signal $V_{Sig\_m}$, at the period $TP(2)_3$.

Now, let us say that the capacitance of the capacitor unit $C_1$ is a value $c_1$, and the capacitance $C_{EL}$ of the light emitting unit ELP is a value $c_{EL}$, and the parasitic capacitance between the gate electrode and the other source/drain region of the driving transistor $TR_D$ is a value $c_{gs}$. When the potential of the gate electrode of the driving transistor $TR_D$ is changed from $V_{Ofs}$ to $V_{Sig\_m}$ ($>V_{Ofs}$), the potentials of both ends of the capacitor unit $C_1$ (the potential of the first node $ND_1$ and the second node $ND_2$) are changed as a general rule. That is to say, charge based on the change amount of the potential of the gate electrode of the driving transistor $TR_D$ is distributed to the capacitor unit $C_1$, the capacitance $C_{EL}$ of the light emitting unit ELP, and parasitic capacitance between the gate electrode and the other source/drain region of the driving transistor $TR_D$. Therefore, in the case that the value $c_{EL}$ is a sufficiently great value as compared to the values $c_1$ and $c_{gs}$, change in the potential of the other source/drain region (second node $ND_2$) of the driving transistor $TR_D$ based on the change amount ($V_{Sig\_m} - V_{Ofs}$) of the potential of the gate electrode of the driving transistor $TR_D$ is small. In general, the value $c_{EL}$ of the capacitance $C_{EL}$ of the light emitting unit ELP is greater than the value $c_1$ of the capacitance of the capacitor unit $C_1$, and the value $c_{gs}$ of the parasitic capacitance of the driving transistor $TR_D$. Therefore, with the above description, the potential change of the second node $ND_2$ that is caused due to the potential change of the first node $ND_1$ is not taken into consideration. Also, description will be made without considering the potential change of the second node $ND_2$ that is caused due to the potential change of the first node $ND_1$ unless particularly indispensable. This is true for the other embodiments. Note that the driving timing charts are illustrated without considering the potential change of the second node $ND_2$ that is caused due to the potential change of the first node $ND_1$.

With the above writing processing, while the driving voltage $V_{CC-H}$ from the power supply unit 100 is applied to one of the source/drains of the driving transistor $TR_D$, the video signal $V_{Sig\_m}$ is applied to the gate electrode of the driving transistor $TR_D$. Therefore, as shown in FIG. 5, the potential of the second node $ND_2$ increases at the period $TP(2)_4$. The increase amount ($\Delta V$ shown in FIG. 5) of this potential will be described later. If we say that the potential of the gate electrode (first node $ND_1$) of the driving transistor $TR_D$ is $V_g$, ant the potential of the other source/drain region (second node $ND_2$) of the driving transistor $TR_D$ is $V_s$, in the case that increase in the potential of the second node $ND_2$ is not considered, the value of $V_g$ and the value of $V_s$ are as follows. The potential difference between the first node $ND_1$ and the second node $ND_2$, i.e., the potential difference $V_{gs}$ between the gate electrode and the other source/drain serving as a source region of the driving transistor $TR_D$ can be represented with the following Expression (3).

$$V_g = V_{Sig\_m}$$

$$V_s \cong V_{Ofs} - V_{th}$$

$$V_{gs} \cong V_{Sig\_m} - (V_{Ofs} - V_{th}) \quad (3)$$

That is to say, $V_{gs}$ obtained at the writing processing as to the driving transistor $TR_D$ depends on only the video signal $V_{Sig\_m}$ used for controlling the brightness at the light emitting unit ELP, the threshold voltage $V_{th}$ of the driving transistor $TR_D$, and the voltage $V_{Ofs}$ used for initializing the potential of the gate electrode of the driving transistor $TR_D$, but is unrelated to the threshold voltage $V_{th-EL}$ of the light emitting unit ELP.

Next, description will be made regarding increase in the potential of the second node $ND_2$ at the period $TP(2)_4$. With the above driving method, the mobility correction processing is executed along with the writing processing, wherein the potential of the other source/drain region of the driving transistor $TR_D$ (i.e., the potential of the second node $ND_2$) is increased according to the property of the driving transistor $TR_D$ (e.g., the size of mobility $\mu$, etc.).

In the case that the driving transistor $TR_D$ is fabricated of a polysilicon thin-film transistor or the like, it is difficult to prevent irregularities between transistors regarding the mobility $\mu$. Therefore, even if the video signal $V_{Sig}$ having the same value is applied to the gate electrodes of the multiple driving transistors $TR_D$ having different mobility $\mu$, difference between the drain current $I_{ds}$ that flows into the driving transistor $TR_D$ having great mobility and the drain $I_{ds}$ that flows into the driving transistor $TR_D$ having small mobility $\mu$ is caused, in which case the uniformity of the screen of the organic EL display apparatus is compromised.

With the above driving method, while the driving voltage $V_{CC-H}$ from the power supply unit 100 is applied to one of the source/drains of the driving transistor $TR_D$, the video signal $V_{Sig\_m}$ is applied to the gate electrode of the driving transistor $TR_D$. Therefore, as shown in FIG. 5, the potential of the second node $ND_2$ increases at the period $TP(2)_4$. In the case that the value of the mobility $\mu$ of the driving transistor $TR_D$ is great, the increase amount $\Delta V$ (potential corrected value) of the potential (i.e., the potential of the second node $ND_2$) at the other source/drain region of the driving transistor $TR_D$ increases. Conversely, in the case that the value of the mobility $\mu$ of the driving transistor $TR_D$ is small, the increase amount $\Delta V$ (potential corrected value) of the potential at the other source/drain region of the driving transistor $TR_D$ decreases. Now, the potential difference $V_{gs}$ between the gate electrode, and the other source/drain region serving as a source region of the driving transistor $TR_D$ is expressed by rewriting Expression (3) as Expression (4).

$$V_{gs} \cong V_{Sig\_m} - (V_{Ofs} - V_{th}) - \Delta V \quad (4)$$

Note that a predetermined period of time used for executing the writing processing (the entire time $t_0$ of the period $TP(2)_4$) should be determined as a design value beforehand at the time of design of the organic EL display apparatus. Also, the entire time $t_0$ of the period $TP(2)_4$ is determined such that a potential ($V_{Ofs} - V_{th} + \Delta V$) at the other source/drain region of the driving transistor $TR_D$ at this time satisfies the following Expression (2'). Thus, the light emitting unit ELP does not emit light at the period $TP(2)_4$. Further, according to this mobility correction processing, correction of irregularities of a coefficient $k(\cong(\frac{1}{2}) \cdot (W/L) \cdot C_{ox})$ is also executed simultaneously.

$$(V_{Ofs} - V_{th} + \Delta V) < (V_{th-EL} + V_{Cat}) \quad (2')$$

Period $TP(2)_5$ (See FIGS. 5 and 6F)

According to the above operations, the threshold voltage cancellation processing, writing processing, and mobility correction processing have been completed. Subsequently, at this period $TP(2)_5$ driving of the light emitting unit ELP, which makes up the first half of the above process (e), is executed. Specifically, while maintaining a state in which the driving voltage $V_{CC-H}$ is applied from the power supply unit 100 to one of the source/drain regions of the driving transistor $TR_D$, the scanning line SCL is set to a low level based on the operation of the scanning circuit 101, the writing transistor $TR_W$ is set to an off state, and the first node $ND_1$, i.e., the gate electrode of the driving transistor $TR_D$ is set to a floating state. As a result of such settings, the potential of the second node $ND_2$ increases.

Now, as described above, the gate electrode of the driving transistor $TR_D$ is in a floating state, and moreover, there is the capacitor unit $C_1$, and accordingly, the same phenomenon as with a so-called bootstrap circuit occurs at the gate electrode of the driving transistor $TR_D$, and the potential of the first node $ND_1$ also increases. As a result thereof, the potential difference $V_{gs}$ between the gate electrode and the other source/drain region serving as a source region of the driving transistor $TR_D$ holds the value of Expression (4).

Also, the potential of the second node $ND_2$ increases and exceeds $(V_{th-EL}+V_{cat})$, and accordingly, the light emitting unit ELP starts to emit light. At this time, a current that flows into the light emitting unit ELP is the drain current $I_{ds}$ that flows from the drain region to the source region of the driving transistor $TR_D$, and accordingly, this current can be represented with Expression (1). Now, Expression (1) can be rewritten as the following Expression (5), from Expressions (1) and (4).

$$I_{ds}=k\cdot\mu\cdot(V_{Sig\_m}-V_{Ofs}-\Delta V)^2 \quad (5)$$

Therefore, for example, in the case that the $V_{Ofs}$ is set to 0 volt, the current $I_{ds}$ that flows into the light emitting unit ELP is proportional to the square of the value obtained by subtracting the value of the potential corrected value $\Delta V$ due to the mobility $\mu$ of the driving transistor $TR_D$ from the video signal $V_{Sig\_m}$ used for controlling the brightness of the light emitting unit ELP. In other words, the current $I_{ds}$ that flows into the light emitting unit ELP depends on neither the threshold voltage $V_{th-EL}$ of the light emitting unit ELP, nor the threshold voltage $V_{th}$ of the driving transistor $TR_D$. That is to say, the emitting amount (brightness) of the light emitting unit ELP is not influenced by the threshold voltage $V_{th-EL}$ of the light emitting unit ELP, and is not influenced by the threshold voltage $V_{th}$ of the driving transistor $TR_D$. The brightness of the (n, m)'th organic EL display element 10 is a value corresponding to such a current $I_{ds}$.

Moreover, the greater the mobility $\mu$ of the driving transistor $TR_D$ is, the greater the potential corrected value $\Delta V$ is, and accordingly, the value of the $V_{gs}$ of the left side of Expression (4) becomes small. Therefore, in Expression (5), even if the value of the mobility $\mu$ is great, the value of $(V_{Sig\_m}-V_{Ofs}-\Delta V)^2$ becomes small, and consequently, the drain current $I_{ds}$ can be corrected. That is to say, even with the driving transistors $TR_D$ having different mobility $\mu$, in the case that the value of the video signal $V_{Sig}$ is the same, the drain current $I_{ds}$ becomes generally the same, and consequently, the current $I_{ds}$ that flows into the light emitting unit ELP and controls the brightness of the light emitting unit ELP is uniformed. Thus, the irregularities of the brightness of the light emitting unit ELP due to the irregularities of the mobility $\mu$ (further, irregularities of k) can be corrected.

Subsequently, the emitting state of the light emitting unit ELP is continued until the (m+m'−1)'th horizontal scanning period. The termination of the (m+m'−1)'th horizontal scanning period is equivalent to the termination of the period $TP(2)_5$.

Period $TP(2)_6'$ (See FIGS. 5 and 7A)

Next, a process, which makes up a latter half of the above process (e), is executed wherein a reverse voltage is applied between the anode electrode and cathode electrode of the light emitting unit ELP.

According to the first embodiment, with the above process (e), the second node initializing voltage $V_{CC-L}$ is applied from the power supply unit 100 to the second node $ND_2$ via the driving transistor $TR_D$, thereby applying a reverse voltage between the anode electrode and cathode electrode of the light emitting unit ELP.

Specifically, while maintaining the off state of the writing transistor $TR_W$, the voltage supplied from the power supply unit 100 is switched from the voltage $V_{CC-H}$ to the voltage $V_{CC-L}$ at the commencement of the period $TP(2)_6'$ (in other words, the commencement of the (m+m')'th horizontal scanning period). As a result thereof, the potential of the second node $ND_2$ decreases to $V_{CC-L}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with the potential decrease of the second node $ND_2$.

Subsequently, the above non-emitting state is continued until the (m−1)'th horizontal scanning period of the next frame. This point of time is equivalent to immediately before the commencement of the period $TP(2)_{+1}$ shown in FIG. 5. Thus, after the light emitting unit ELP is set to an emitting state, the light emitting unit ELP is set to a non-emitting state, whereby afterimage blurring due to active matrix driving is reduced, and moving image quality can further be improved.

Subsequently, with the period $TP(2)_{+1}$ and thereafter, the same processes as the periods $TP(2)_1$ through $TP(2)_6'$ described above are repeated (see FIGS. 5 and 7B).

Figure 33A:
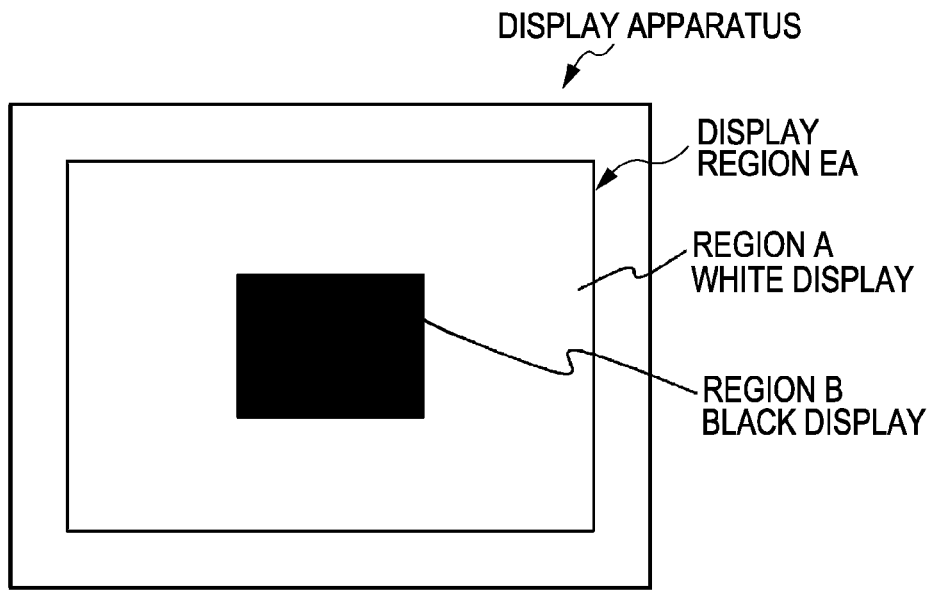
FIG. 33A is a schematic view for describing that the region A is displayed as white display, and the window-style region B is displayed as black display with a display region EA of the organic electroluminescent display apparatus.
Figure 33B:
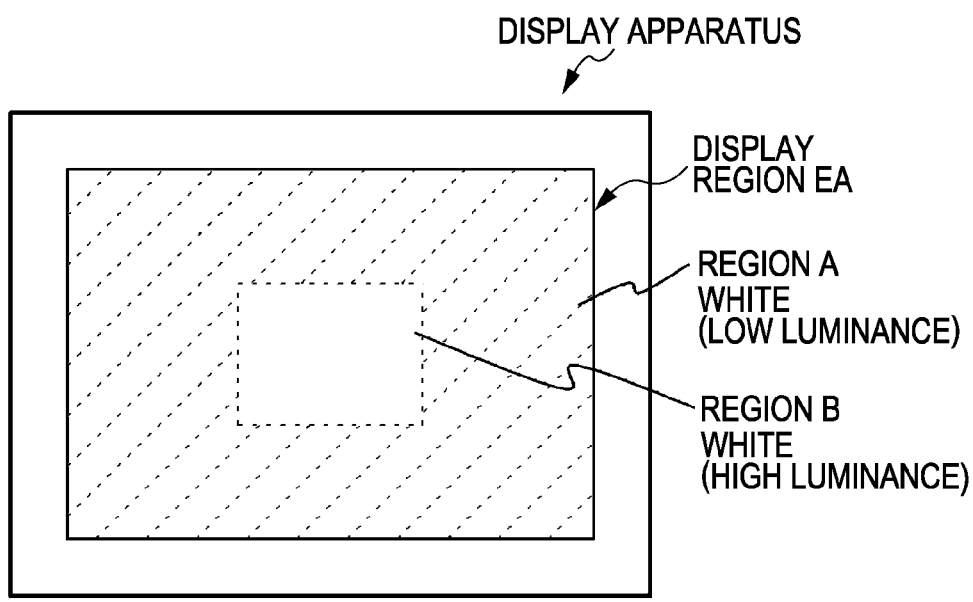
FIG. 33B is a schematic view for describing a phenomenon wherein the brightness of a portion corresponding to the region A becomes relatively low as to the brightness of a portion corresponding to the region B.

With the organic EL display apparatus which drives the light emitting unit ELP by the driving method according to the above reference example, for example, upon a certain pattern being displayed for a long time, brightness change according to the pattern thereof remains in some cases. As shown in FIG. 33A, with a display region EA of the organic EL display apparatus, long-time display is executed with a region A as white display, and a window-style region B as black display, which has been described earlier with regard to the background art. Subsequently, if the entire display region EA is set to white display, as shown in FIG. 33B, a phenomenon is recognized wherein the brightness of the portion corresponding to the region A becomes relatively low as to the brightness of the portion corresponding to the region B. As a result thereof, the display quality of the organic EL display apparatus deteriorates.

The inventor and others have drove the organic EL display apparatus in accordance with the driving timing chart shown in FIG. 5 to display the pattern in FIG. 3A on the organic EL display apparatus for a long time, and measured change in the voltage-current property of the light emitting unit ELP. Specifically, the inventor and others applied a DC voltage to both ends of the light emitting unit ELP of a certain emitting color (e.g., green) making up the pixels of the region A (white display portion) to change the value of voltage, and measured the voltage-current property. Similarly, the inventor and others applied a DC voltage to both ends of the light emitting unit ELP of a certain emitting color making up the pixels of the region B (black display portion) to change the value of voltage, and measured the voltage-current property. The measurement results are shown in FIG. 8A.

Consequently, it has been found that there is difference principally regarding the value of a reverse current between the light emitting unit ELP making up the region A (white display portion) and the light emitting unit ELP making up the region B (black display portion). Specifically, as shown in FIG. 8A, a tendency has been recognized wherein, with the light emitting unit ELP making up the region A (white display portion), the absolute value of the current value of a reverse current is great as compared to the light emitting unit ELP making up the region B (black display portion). The inventor and others examined the influence of the change of the property of a reverse current at the light emitting unit ELP on the potential of the second node $ND_2$ at the periods $TP(2)_2$ through TP(2)$_3$, and further, influence on the brightness of the light emitting unit ELP, as follows.

The operation of the period TP(2)$_2$ has been described with reference to FIG. 5, but with the above description, the reverse current of the light emitting unit ELP is not taken into consideration in particular. However, with the period TP(2)$_2$, a reverse voltage is applied to the light emitting unit ELP. This is true for the period TP(2)$_3$.

FIG. 8B is a schematic circuit diagram used for describing the potential change of the second node ND$_2$ at the period TP(2)$_2$, in the case that a reverse current that flows into the light emitting unit ELP is taken into consideration. FIG. 8C is a schematic circuit diagram used for describing the potential change of the second node ND$_2$ at the period TP(2)$_3$, in the case that a reverse current that flows into the light emitting unit ELP is taken into consideration.

As shown in FIG. 8B, with the period TP(2)$_2$, a relatively great reverse current flows into the light emitting unit ELP making up the region A (white display portion). Similarly, as shown in FIG. 8C, with the period TP(2)$_3$ as well, a relatively great reverse current flows into the light emitting unit ELP making up the region A (white display portion).

Figure 9:
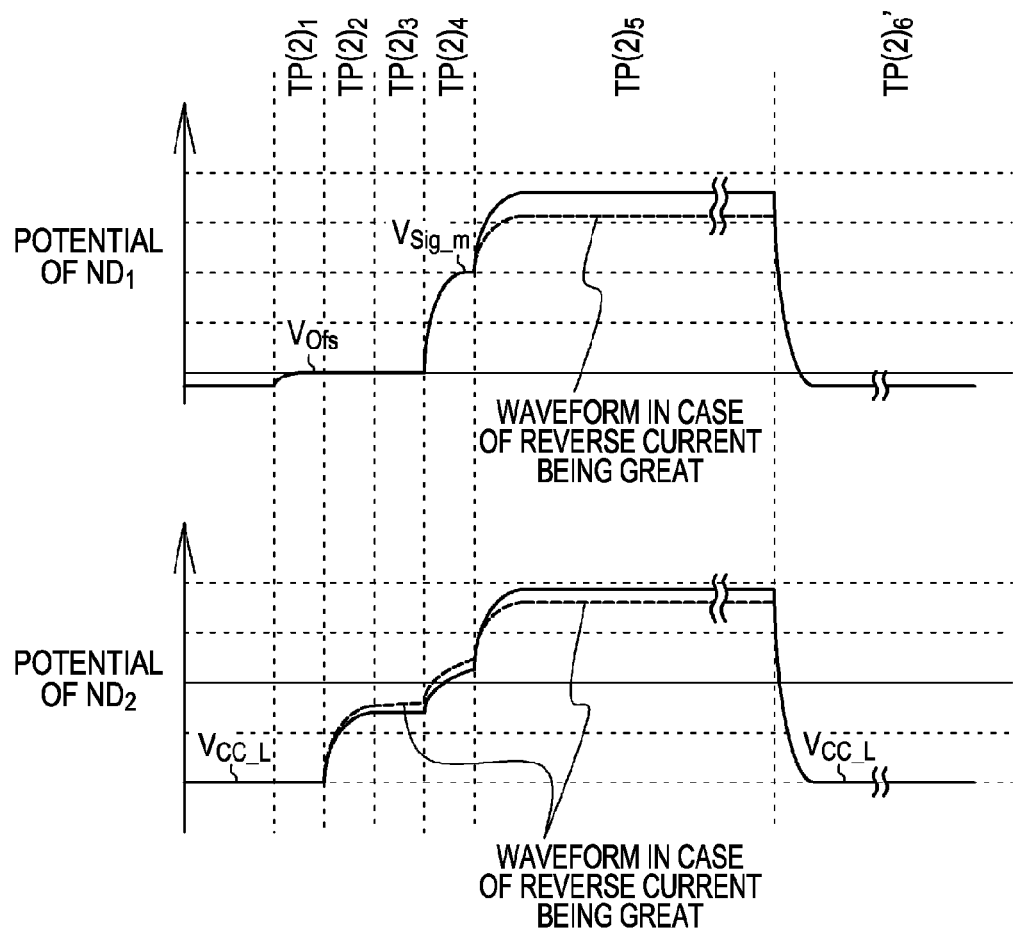
FIG. 9 is a schematic view illustrating the potential changes of the first and second nodes of the driving circuit when there is difference between the reverse currents of the organic electroluminescent light emitting unit.

FIG. 9 is a schematic view illustrating the potential change of the first node ND$_1$ and the second node ND$_2$ at the driving circuit 11 when there is difference regarding the reverse current of the light emitting unit ELP. When the reverse current of the light emitting unit ELP increases, the potential of the second node ND$_2$ further increases at the periods TP(2)$_2$ through TP(2)$_3$. Along therewith, the potential difference between the first node ND$_1$ and the second node ND$_2$ further decreases.

Therefore, upon the reverse current of the light emitting unit ELP increasing, at the period TP(2)$_5$ the current that flows into the driving transistor TR$_D$ decreases, the potential increase of the second node ND$_2$ is reduced, and the potential increase of the first node ND$_1$ due to the bootstrap operation is also reduced. Further, at the period TP(2)$_5$ the current that flows into the driving transistor TR$_D$ decreases, and accordingly, the brightness of the light emitting unit ELP also decreases. That is to say, the brightness of the light emitting unit ELP making up the region A (white display portion) decreases relatively as to the brightness of the light emitting unit ELP making up the region B (black display portion). Thus, the phenomenon shown in FIG. 33B readily occurs.

Therefore, the inventor and others have studied various types of driving methods whereby the level of the brightness difference shown in FIG. 33B can be reduced. As a result thereof, it has been found that the level of the brightness difference shown in FIG. 33B can be reduced by a driving method wherein there is provided an auxiliary driving process between the process (e) and the next process (a) wherein a forward voltage is applied between the anode electrode and cathode electrode of the light emitting unit ELP over a certain period, and a period from the termination of the auxiliary driving process to the termination of the next process (b) is set to one millisecond or less.

As described above, FIG. 4 is a schematic view of the driving timing chart of the light emitting unit ELP according to the first embodiment including the auxiliary driving process. With the first embodiment, the auxiliary driving process is executed between the process (e) and the next process (a), more specifically, at the period TP(2)$_7$ following the TP(2)$_6$. Let us say that a period from the termination of the auxiliary driving process to the termination of the next process (b), more specifically, a period T$_D$ from the termination of the period TP(2)$_7$ to the termination of the period TP(2)$_{+2}$ is 1 millisecond or less. Note that, though not shown in the drawing, the same auxiliary driving process as described above is executed even before the period TP(2)$_0$ shown in FIG. 4. The on/off state of each transistor and so forth at the periods TP(2)$_7$ through TP(2)$_{+2}$ shown in FIG. 4 are schematically illustrated in FIGS. 10A through 10D.

The operation at the periods TP(2)$_0$ through TP(2)$_5$ shown in FIG. 4 is the same operation at the periods TP(2)$_0$ through TP(2)$_5$ described with reference to FIG. 5, and accordingly, description thereof will be omitted. The operation at the period TP(2)$_6$' shown in FIG. 4 is the same operation at the period TP(2)$_6$' described with reference to FIG. 5 except that the terminations thereof differs, and accordingly description thereof will be omitted. The period TP(2)$_6$ shown in FIG. 4 is continued, for example, the horizontal scanning period of organic EL display elements 10 arrayed at the (m+m'+Δm')'th row, i.e., immediately before the (m+m'+Δm')'th horizontal scanning period. Here, "Δm" is determined with the design specification of the organic EL display apparatus. In the case that the value of (m+m'+Δm') exceeds M, the exceeding part of the horizontal scanning period is processed at the next display frame.

With the first embodiment, in a state in which the off state of the writing transistor TR$_W$ is maintained, at the commencement of the period TP(2)$_7$, i.e., at the commencement of the (m+m'+Δm')'th horizontal scanning period the voltage of the power supply unit 100 is switched from the voltage V$_{CC-L}$ to the voltage V$_{CC-H}$ and this state is maintained during the period TP(2)$_7$. Thus, a forward voltage is applied between the anode electrode and cathode electrode of the light emitting unit ELP over the period TP(2)$_7$. With the first embodiment, the length of the period TP(2)$_7$ is fixed to a predetermined length that is generally 3 milliseconds. This is true for other later-described embodiments.

The potential difference V$_{gs}$ between the gate electrode and the other source/drain region serving as a source region of the driving transistor TR$_D$ basically holds the value in Expression (4), and accordingly, as shown in FIG. 10A, the drain current I$_{ds}$ having the value shown in Expression (5) flows into the light emitting unit ELP. That is to say, with the first embodiment, the auxiliary driving process is a process wherein a current corresponding to the value of the potential difference between the first node ND$_1$ and the second node ND$_2$ flows into the light emitting unit ELP via the driving transistor TR$_D$ from the power supply unit 100, thereby driving the light emitting unit ELP.

Subsequently, in a state in which the off state of the writing transistor TR$_W$ is maintained, at the commencement of the period TP(2)$_8$, the voltage supplied from the power supply unit 100 is switched from the voltage V$_{CC-H}$ to the voltage V$_{CC-L}$. As a result thereof, the potential of the second node ND$_2$ decreases to V$_{CC-L}$, a reverse voltage is applied between the anode electrode and cathode electrode of the light emitting unit ELP, and the light emitting unit ELP goes to a non-emitting state. Also, the potential of the first node ND$_1$ (the gate electrode of the driving transistor TR$_D$) in a floating state also decreases along with the potential decrease of the second node ND$_2$.

Subsequently, the non-emitting state of the light emitting unit ELP is continued until the (m−1)'th horizontal scanning period of the next frame. This point in time is equivalent to immediately before the commencement of the TP(2)$_{+1}$ shown in FIG. 4.

Subsequently, with the period TP(2)$_{+1}$ and thereafter, the same processes as the periods TP(2)$_1$ through TP(2)$_8$ described above are repeated. Specifically, with the period TP(2)$_{+1}$, in the same way as with the TP(2)$_1$ described in FIG. 4, the process (a), i.e., the preprocessing is executed (see FIG.

10C). Also, with the period $TP(2)_{+2}$, in the same way as with the $TP(2)_2$ described in FIG. 4, the process (b), i.e., the threshold voltage cancellation processing is executed (see FIG. 10D).

Now, a period from the termination of the auxiliary driving process to the termination of the next process (b) is set so as to be 1 millisecond or less. Specifically, the periods $TP(2)_7$ and $TP(2)_8$ are set such that the period $T_D$ shown in FIG. 4 from the termination of the $TP(2)_7$ that is the termination of the auxiliary driving process to the commencement of the $TP(2)_{+2}$ that is the commencement of the next process (b) becomes 1 millisecond or less.

Figure 11:
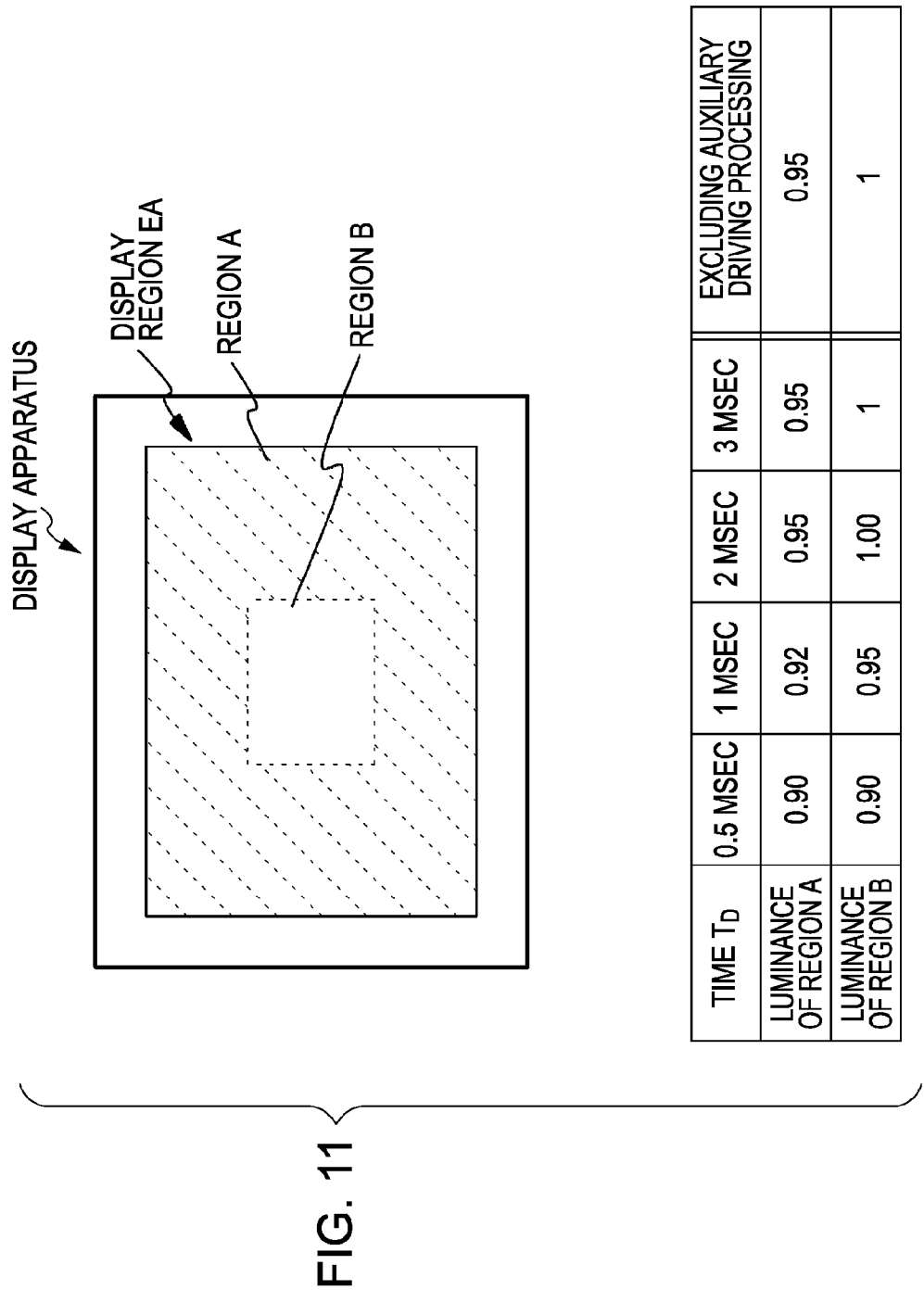
FIG. 11 is a schematic view for describing the brightness of the regions A and B when the organic electroluminescent display apparatus is driven in accordance with the driving timing chart shown in FIG. 5, the pattern in FIG. 33A is displayed on the organic electroluminescent display apparatus for a long time, following which the organic electroluminescent display apparatus is driven in accordance with the driving timing chart shown in FIGS. 4 and 5, and the organic electroluminescent display apparatus is set to all white display.

FIG. 11 is a schematic view for describing the brightness of the regions A and B when the organic EL display apparatus is driven in accordance with the driving timing chart shown in FIG. 5, the pattern in FIG. 33A is displayed on the organic EL display apparatus for a long time, and then the organic EL display apparatus is driven in accordance with the driving timing charts shown in FIGS. 4 and 5, and also the organic EL display apparatus is displayed with all white.

First, the organic EL display apparatus was driven in accordance with the timing chart shown in FIG. 5 wherein the auxiliary driving process is not executed, and also the organic EL display apparatus is displayed with all white. At this time, upon normalization being executed with the brightness of the region B as 1, the brightness of the region A was 0.95.

Next, the organic EL display apparatus was driven in accordance with the timing chart shown in FIG. 4, and is displayed with all white. Note that the light emitting unit ELP emits light even at the auxiliary driving process, and accordingly, the emitting period increases substantially, and brightness somewhat increases. When standardization was executed with the brightness of the region B at the time of setting the above period $T_D$ to 3 milliseconds as 1, the brightness of the region A was 0.95. The brightness of the region B at the time of setting the period $T_D$ to 2 milliseconds was 1.00, and the brightness of the region A was 0.95. The brightness of the region B at the time of setting the period $T_D$ to 1 millisecond was 0.95, and the brightness of the region A was 0.92. The brightness of the region B at the time of setting the period $T_D$ to 0.5 milliseconds was 0.90, and the brightness of the region A was 0.90.

In the case that the period $T_D$ was 2 through 3 milliseconds, no reduction effect regarding the level of the brightness difference of the regions A and B was confirmed. However, with the period $T_D$ at 1 millisecond, the level of the brightness difference of the regions A and B was somewhat reduced, and in the case that the period $T_D$ was 0.5 milliseconds, the brightness difference of the regions A and B was scarcely recognizable.

Figure 12:
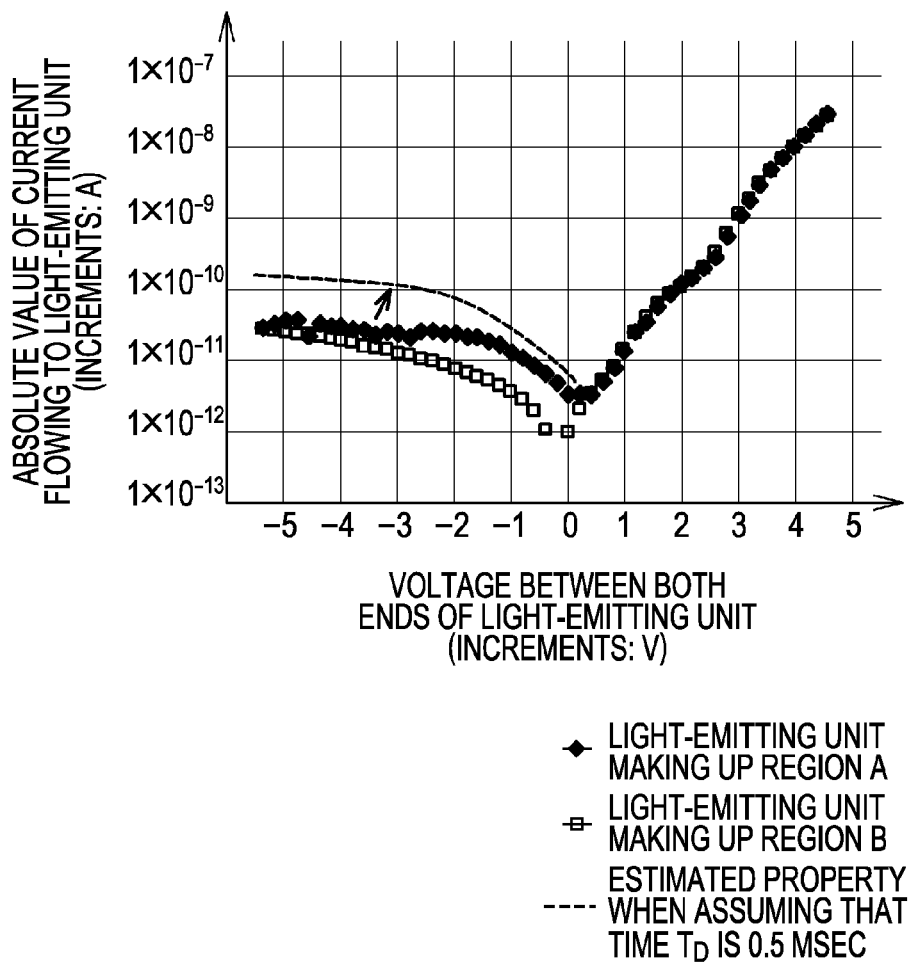
FIG. 12 is a schematic graph for describing the reverse current property the organic electroluminescent light emitting unit at the time of dynamic operation.

Thus, a tendency is recognized wherein the shorter the period $T_D$ is, the less the brightness of the overall organic EL display apparatus decreases, and the less the level of the brightness difference of the regions A and B is reduced. The details of the reason why such a tendency occurs are not clear, but we have deduced that the shorter the period $T_D$ is, the more the reverse current of the light emitting unit ELP increases at the periods $TP(2)_2$ and $TP(2)_3$. Also, we have deduced that the shorter the period $T_D$ is, the less the difference between the reverse current property of the light emitting unit ELP making up the region A (white display portion), and the reverse current property of the light emitting unit ELP making up the region B (black display portion) decreases. That is to say, when a DC voltage is applied to both ends of the light emitting unit ELP, and voltage-current property is measured by changing the value of the voltage, the property is still in FIG. 8A. However, with the reverse current property of the light emitting unit ELP at the time of dynamic operation, for example, when the period $T_D$ is set to 1 millisecond, as shown in a dashed line in FIG. 12, the light emitting unit ELP making up the region A (white display portion) and the light emitting unit ELP making up the region B (black display portion) are estimated to behave in the same way.

Description has been made so far regarding the driving method for the light emitting unit ELP according to the first embodiment. A modification of the first embodiment will be described below.

Figure 13:
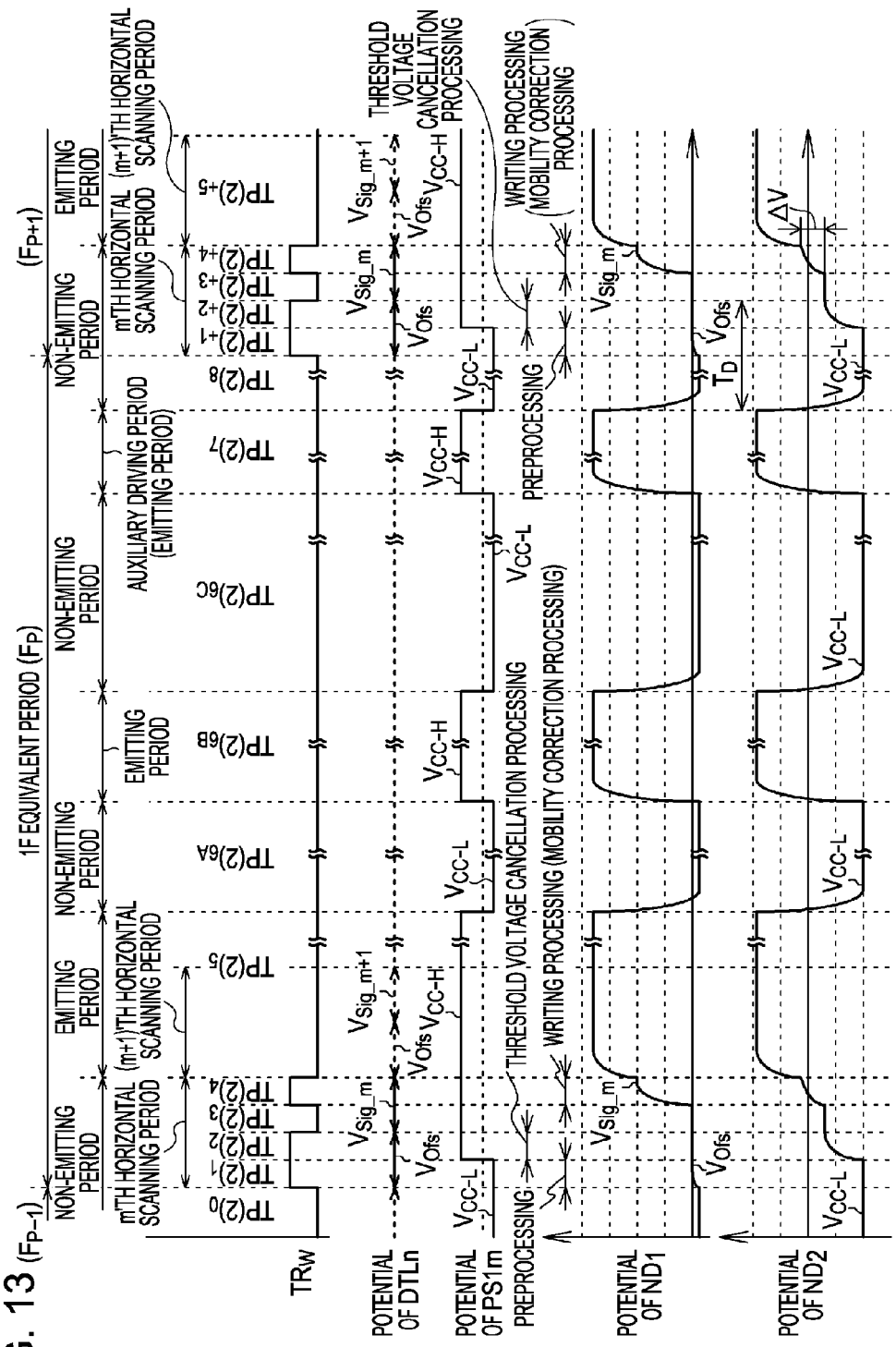
FIG. 13 is a schematic view of a driving timing chart of an organic electroluminescent light emitting unit according to a first modification.

FIG. 13 is a schematic view of the driving timing chart of the light emitting unit ELP according to a first modification. With the first modification, a series of processes are executed multiple times wherein after driving the light emitting unit ELP, a reverse voltage is applied between the anode electrode and cathode electrode of the light emitting unit ELP. FIG. 13 illustrates an example in the case that a series of processes are executed twice. That is to say, periods $TP(2)_5$ through $TP(2)_{6A}$ shown in FIG. 13 are equivalent to a series of processes at a first time, and periods $TP(2)_{6B}$ through $TP(2)_{6C}$ are equivalent to a series of processes at a second time. Thus, an image flicker displayed on the organic EL display apparatus can be further reduced. The operation of the driving circuit 11 at the periods $TP(2)_{6A}$ and $TP(2)_{6C}$ is basically the same operation as described with reference to the period $TP(2)_6$ in FIG. 5. Also, the operation of the period $TP(2)_{6B}$ is basically the same as described with reference to the period $TP(2)_7$ in FIG. 5.

Figure 14:
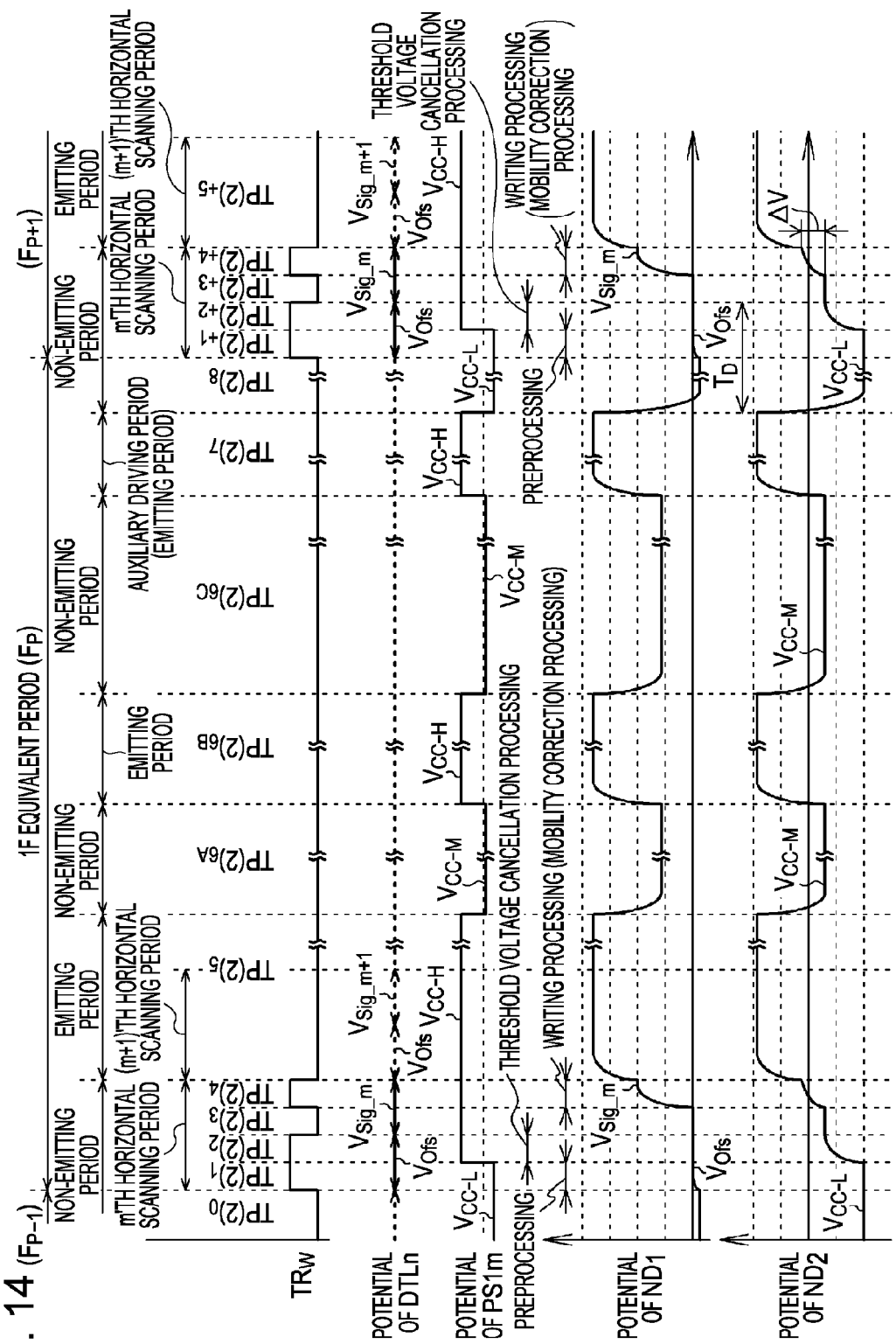
FIG. 14 is a schematic view of a driving timing chart of an organic electroluminescent light emitting unit according to a second modification.

FIG. 14 is a schematic view of the driving timing chart of the light emitting unit ELP according to a second modification. The second modification differs from the first modification in that the power supply unit 100 supplies two types of voltage as the second node initializing voltage. Specifically, in addition to the above voltage $V_{CC-L}$, an intermediate voltage $V_{CC-M}$ (e.g., −3 volts) is supplied as the second node initializing voltage. Subsequently, at the periods $TP(2)_{6A}$ and $TP(2)_{6C}$ the power supply unit 100 applies the intermediate voltage $V_{CC-M}$. For example, a problem occurs in that the less the potential of the second node $ND_2$ decreases at the period $TP(2)_{6A}$, the less the potential difference between the first node $ND_1$ and the second node $ND_2$ decreases due to influence of parasitic capacitance or the like, the less the brightness of the light emitting unit ELP decreases at the period $TP(2)_{6B}$. The intermediate voltage $V_{CC-M}$ is supplied, whereby such decrease in brightness can be reduced.

Figure 15:
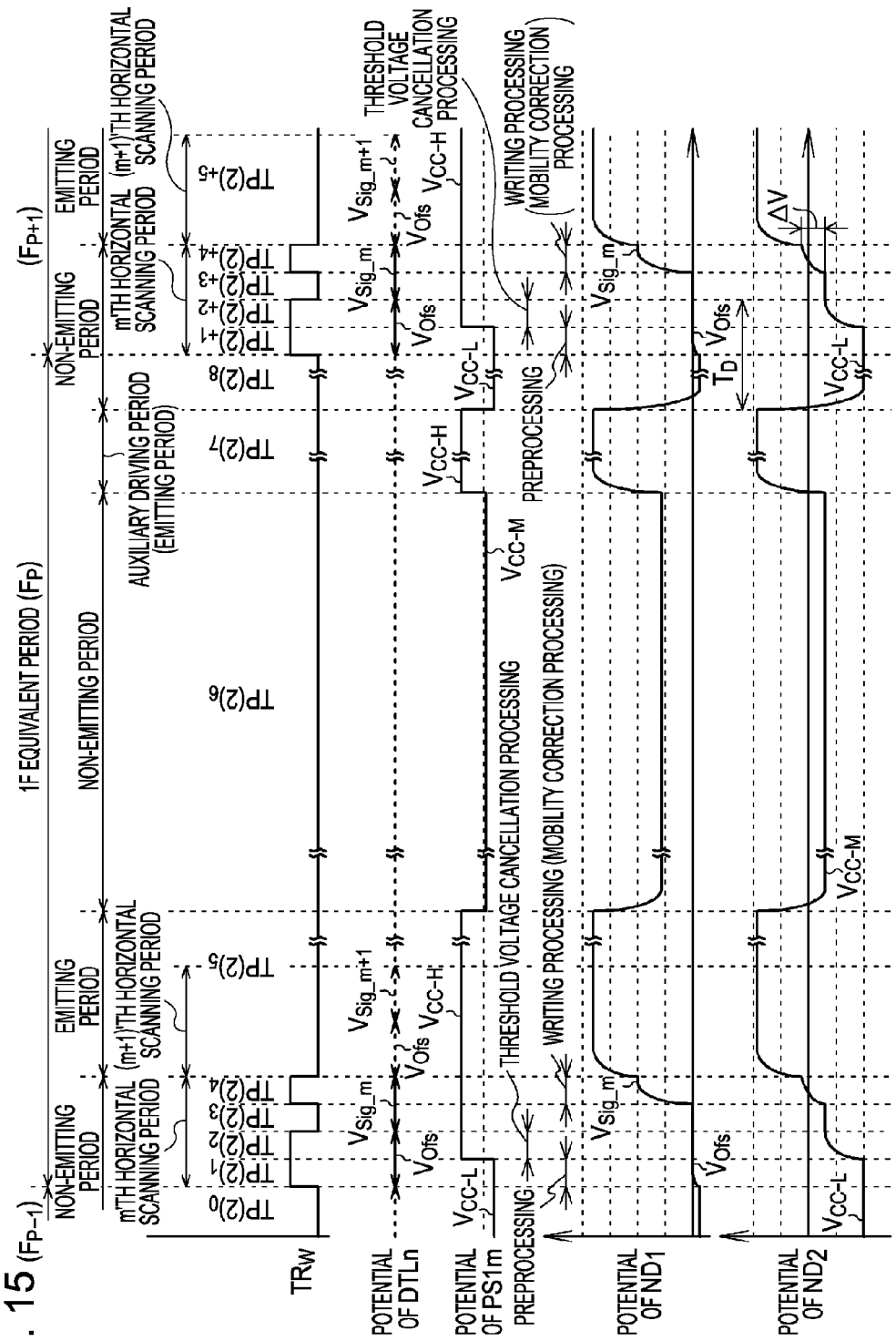
FIG. 15 is a schematic view of a driving timing chart of an organic electroluminescent light emitting unit according to a third modification.

Note that the arrangement shown in FIG. 15 (third modification) may be employed wherein the power supply unit 100 applies the intermediate voltage $V_{CC-M}$ at the period $TP(2)_6$ shown in FIG. 4. Further, an arrangement may be made wherein the power supply unit 100 applies the intermediate voltage $V_{CC-M}$ at the period $TP(2)_8$ shown in FIGS. 4, 13, 14, and 15, or an arrangement may be made wherein the period $TP(2)_8$ is omitted, and the preprocessing is executed immediately after the auxiliary driving process.

Second Embodiment

A second embodiment also relates to the driving method for the organic electroluminescent light emitting unit according to the embodiments of the present invention. With the second embodiment, the driving circuit 11 is configured of 3 transistors/1 capacitor unit (first 3Tr/1C driving circuit). The conceptual diagram of the organic EL display apparatus according to the second embodiment is shown in FIG. 16, and an equivalent circuit of the organic EL display element 10 including the driving circuit 11 is shown in FIG. 17.

First, the details of the driving circuit and the light emitting unit will be described. The first 3Tr/1C driving circuit also includes, in the same way as with the above 2Tr/1C driving circuit, two transistors of a writing transistor $TR_W$, and a driving transistor $TR_D$, and one capacitor unit $C_1$. The first 3Tr/1C driving circuit further includes a first transistor $TR_1$.

Driving Transistor $TR_D$

The configuration of the driving transistor $TR_D$ is the same as the configuration of the driving transistor $TR_D$ described with the first embodiment, and accordingly, detailed description will be omitted. Note that, with the first embodiment, the voltage $V_{CC\text{-}L}$ is applied from the power supply unit 100 to one of the source/drain regions of the driving transistor $TR_D$, thereby initializing the potential of the second node $ND_2$. On the other hand, with the second embodiment, as described later, the first transistor $TR_1$ is used to initialize the potential of the second node $ND_2$. Therefore, with the second embodiment, the voltage $V_{CC\text{-}L}$ does not have to be applied from the power supply unit 100 to initialize the potential of the second node $ND_2$. According to such a reason, with the second embodiment, the power supply unit 100 applies a fixed voltage $V_{CC}$.

Writing Transistor $TR_W$

The configuration of the writing transistor $TR_W$ is the same as the configuration of the writing transistor $TR_W$ described with the first embodiment, and accordingly, detailed description will be omitted. In the same way as with the first embodiment, the video signal (driving signal, brightness signal) $V_{Sig}$ used for controlling the brightness of the light emitting unit ELP via the data line DTL from a signal output circuit 102, and further, a first node initializing voltage $V_{Ofs}$ are supplied to one of the source/drain regions.

First Transistor $TR_1$

With the first transistor $TR_1$,
(C-1) the other source/drain region is connected to the second node $ND_2$,
(C-2) the second node initializing voltage $V_{SS}$ is applied to one of the source/drain regions, and
(C-3) the gate electrode is connected to a first transistor control line AZ1. The voltage $V_{SS}$ will be described later.

The on state/off state of the first transistor $TR_1$ is controlled by a signal from the first transistor control line AZ1. More specifically, the first transistor control line AZ1 is connected to the first transistor control circuit 103. Based on the operation of the first transistor control circuit 103, the first transistor control line AZ1 is changed to a low level or high level, and the first transistor $TR_1$ is set to an on state or off state.

Light Emitting Unit ELP

The configuration of the light emitting unit ELP is the same as the configuration of the light emitting unit ELP described with the first embodiment, and accordingly, detailed description thereof will be omitted.

Next, the driving method for the light emitting unit ELP according to the second embodiment will be described. With the following description, the values of the voltage $V_{CC}$, and the value of the voltage $V_{SS}$ are as follows, but these are explanatory values, and accordingly, the values are not restricted to these.

Figure 18:
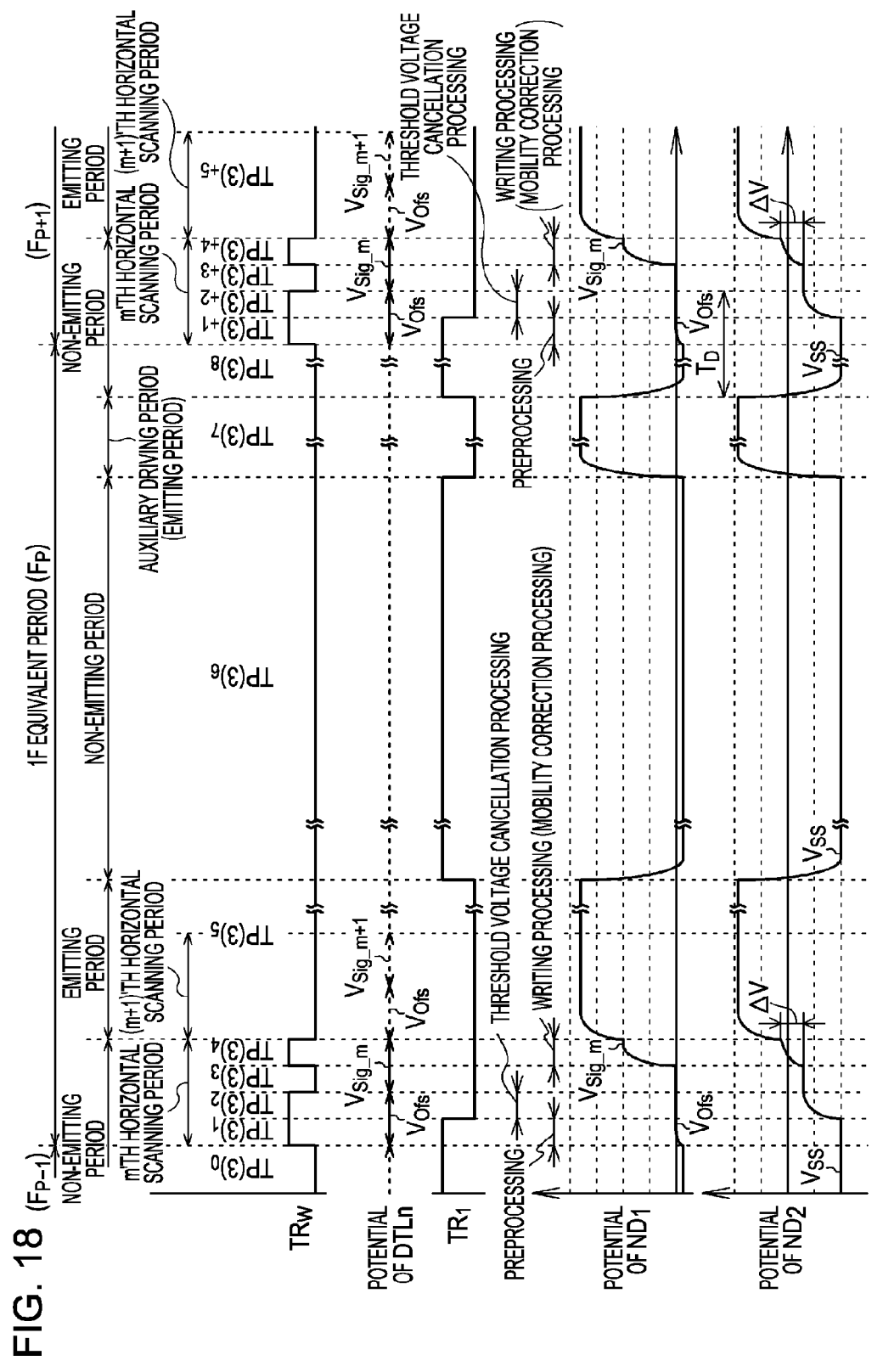

$V_{CC}$: a driving voltage used for supplying a current to the light emitting unit ELP . . . 20 volts $V_{SS}$: a second node initializing voltage used for initializing the potential of the second node $ND_2$ . . . −10 volts FIG. 18 schematically illustrates the driving timing chart of the light emitting unit ELP according to the driving method of the second embodiment including the auxiliary driving process. There are provided periods $TP(3)_7$ and $TP(3)_8$ between the termination of a period $TP(3)_6$ and the commencement of a period $TP(3)_{+1}$, which will be described later in detail. The above auxiliary driving process is executed at the period $TP(3)_7$. The on/off state and so forth of each transistor are schematically illustrated in FIGS. 19A through 19F, and FIGS. 20A through 20E.

The periods $TP(3)_0$ through $TP(3)_3$ shown in FIG. 18 are operation periods until immediately before the period $TP(3)_4$ where the writing processing is executed. With the periods $TP(3)_0$ through $TP(3)_3$, the (n, m)'th organic EL display element 10 is in a non-emitting state as a general rule. As shown in FIG. 18, in addition to the period $TP(3)_4$, the periods $TP(3)_1$ through $TP(3)_3$ are included in the m'th horizontal scanning period. Note that description will be made assuming that the commencement of the period $TP(3)_1$ and the termination of the $TP(3)_4$ are matched with the commencement and termination of the m'th horizontal scanning period respectively, for the sake of explanatory convenience.

Description will be made below regarding each period of the periods $TP(3)_0$ through $TP(3)_3$. Note that the length of each period of the periods $TP(3)_1$ through $TP(3)_3$ may be set according to the design of the organic EL display apparatus as appropriate.

Period $TP(3)_0$ (See FIG. 19A)

This period $TP(3)_0$ is, for example, operation from the previous display frame to the current display frame. That is to say, this period $TP(3)_0$ is a period from the termination of the auxiliary driving period of the previous display frame to the (m−1)'th horizontal scanning period of the current display frame. With this period $TP(3)_0$, the (n, m)'th organic EL display element 10 is in a non-emitting state. With this period $TP(3)_0$, the first transistor $TR_1$ is in an on state. The second node initializing voltage $V_{SS}$ is applied to the second node $ND_2$ via the first transistor $TR_1$ in an on state.

The voltage $V_{CC}$ is also applied to the second node $ND_2$ via the driving transistor $TR_D$. Therefore, the potential of the second node $ND_2$ is determined by the voltage $V_{SS}$, voltage $V_{CC}$, and the on-resistance value of the first transistor $TR_1$, and the on-resistance value of the driving transistor $TR_D$. Now, if we say that the on-resistance value of the first transistor $TR_1$ is sufficiently low, the potential of the second node $ND_2$ decreases to generally $V_{SS}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with the potential decrease of the second node $ND_2$. Description will be made below assuming that the potential of the second node $ND_2$ is $V_{SS}$ when the first transistor $TR_1$ is in an on state. Also, FIG. 18 is illustrated assuming that the potential of the second node $ND_2$ is $V_{SS}$ when the first transistor $TR_1$ is in an on state.

With the organic EL display apparatus according to the second embodiment as well, the first node initializing voltage $V_{Ofs}$ is applied from the signal output circuit 102 to the data line DTL at each horizontal scanning period, and subsequently, the video signal $V_{Sig}$ is applied thereto instead of the first node initializing voltage $V_{Ofs}$. The details are the same as described in the first embodiment, and accordingly, description thereof will be omitted.

Period $TP(3)_1$ (See FIG. 19B)

Subsequently, the m'th horizontal scanning period at the current display frame is started. With this period $TP(3)_1$, the above process (a), i.e., the above preprocessing is executed.

Unlike the first embodiment, according to the second embodiment, with the process (a), the second node initializing voltage $V_{SS}$ is applied to the second node $ND_2$ via the first transistor $TR_1$ which has been set to an on state by a signal from the first transistor control line AZ1. Note that, in the same way as with the first embodiment, with the process (a), the first node initializing voltage $V_{Ofs}$ is applied from the data line DTL to the first node $ND_1$ via the writing transistor $TR_W$ which has been set to an on state by a signal from the scanning line SCL.

Specifically, the on state of the first transistor $TR_1$ is maintained, and the scanning line SCL is set to a high level at the time of the commencement of the period $TP(3)_1$, thereby setting the writing transistor $TR_W$ to an on state. As a result thereof, the potential of the first node $ND_1$ becomes $V_{Ofs}$ (0 volt). The potential of the second node $ND_2$ holds $V_{SS}$ (−10 volts).

In the same way as described with the $TP(2)_1$ according to the first embodiment, the potential difference between the second node $ND_2$ and the cathode electrode provided to the light emitting unit ELP is −10 volts, and does not exceed the threshold voltage $V_{th-EL}$ of the light emitting unit ELP. Thus, the preprocessing has been completed wherein the potential of the first node $ND_1$ and the potential of the second node $ND_2$ are initialized.

Period $TP(3)_2$ (See FIG. 19C)

With this period $TP(3)_2$, the above process (b), i.e., the above threshold voltage cancellation processing is executed. That is to say, while maintaining the on state of the writing transistor $TR_W$, the first transistor $TR_1$ is changed from an on state to an off state. As described above, with the second embodiment, the fixed voltage $V_{CC}$ is applied to one of the source/drain regions of the driving transistor $TR_D$. As a result thereof, the potential of the first node $ND_1$ is not changed ($V_{Ofs}$=0 volt is maintained), but the potential of the second node $ND_2$ is changed toward the potential obtained by subtracting the threshold voltage $V_{th}$ of the driving transistor $TR_D$ from the potential of the first node $ND_1$. That is to say, the potential of the second node $ND_2$ in a floating state increases. For the sake of explanatory convenience, let us say that the length of the period $TP(3)_3$ is sufficient for changing the potential of the second node $ND_2$.

In the same way as described with the $TP(2)_2$ according to the first embodiment, the potential of the second node $ND_2$ in a floating state comes close to ($V_{Ofs}-V_{th}$=−3 volts), and finally becomes ($V_{Ofs}-V_{th}$). If the above Expression (2) is ensured, the light emitting unit ELP does not emit light. That is to say, the potential of the second node $ND_2$ is determined depending on only the threshold voltage $V_{th}$ of the driving transistor $TR_D$, and the voltage $V_{Ofs}$ used for initializing the potential of the gate electrode of the driving transistor $TR_D$, but is unrelated to the threshold voltage $V_{th-EL}$ of the light emitting unit ELP.

Period $TP(3)_3$ (See FIGS. 18 and 19D)

While maintaining the off state of the first transistor $TR_1$, the writing transistor $TR_W$ is set to an off state by a signal from the scanning line SCL at the commencement of the period $TP(3)_3$. Also, the voltage to be applied to the data line DTL is switched from the first node initializing voltage $V_{Ofs}$ to the video signal $V_{Sig\_m}$. The details of operation are the same as described with the period $TP(2)_3$ of the first embodiment, and accordingly, description thereof will be omitted.

Period $TP(3)_4$ (See FIGS. 18 and 19E)

The above process (c), i.e., the above writing processing is executed within this period. Specifically, while maintaining the off state of the first transistor $TR_1$, the writing transistor $TR_W$ is set to an on state by a signal from the scanning line SCL. Subsequently, the video signal $V_{Sig\_m}$ is applied from the data line DTL to the first node $ND_1$ via the writing transistor $TR_W$. As a result thereof, the potential of the first node $ND_1$ increases to $V_{Sig\_m}$. The details of operation are the same as the description of the period $TP(2)_4$ according to the first embodiment wherein the voltage $V_{CC-H}$ is read by the voltage $V_{CC}$, and accordingly, description thereof will be omitted. The potential difference $V_{gs}$ between the gate electrode and the other source/drain region serving as a source region of the driving transistor $TR_D$ is represented with the above Expression (4).

Period $TP(3)_5$ (See FIGS. 18 and 19F)

According to the above operations, the threshold voltage cancellation processing, writing processing, and mobility correction processing have been completed. Subsequently, with this period $TP(3)_5$, driving of the light emitting unit ELP making up the first half of the above process (e) is executed. Specifically, the off state of the first transistor $TR_1$ is held. Subsequently, while maintaining a state in which the voltage $V_{CC}$ is applied from the power supply unit 100 to one of the source/drain regions of the driving transistor $TR_D$, based on the operation of the scanning circuit 101, the scanning line SCL is set to a low level, the writing transistor $TR_W$ is set to an off state, and the first node $ND_1$, i.e., the gate electrode of the driving transistor $TR_D$ is set to a floating state. The details of operation are the same as the description of the period $TP(2)_5$ according to the first embodiment wherein the voltage $V_{CC-H}$ is read by the voltage $V_{CC}$, and accordingly, description thereof will be omitted. A drain current $I_{ds}$ that flows from the drain region to the source region of the driving transistor $TR_D$ can be represented with the above Expression (5).

Subsequently, the emitting state of the light emitting unit ELP is continued until the (m+m'-1)'th horizontal scanning period. The termination of the (m+m'-1)'th horizontal scanning period is equivalent to the termination of the period $TP(3)_5$.

Period $TP(3)_6$ (See FIGS. 18 and 20A)

Next, a process, which makes up the latter half of the above process (e), is executed wherein a reverse voltage is applied between the anode electrode and cathode electrode of the light emitting unit ELP.

According to the second embodiment, with the process (e), the second node initializing voltage $V_{SS}$ is applied to the second node $ND_2$ via the first transistor $TR_1$ which has been set to an on state by a signal from the first transistor control line AZ1, thereby applying a reverse voltage between the anode electrode and cathode electrode of the light emitting unit ELP.

Specifically, in a state in which the off state of the writing transistor $TR_W$ is held, the first transistor $TR_1$ is changed from an off state to an on state at the commencement of the period $TP(3)_6$ (in other words, the commencement of the (m+m')'th horizontal scanning period). Subsequently, the on state of the first transistor $TR_1$ is held until the termination of the period $TP(3)_6$. As a result thereof, the potential of the second node $ND_2$ decreases to $V_{SS}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with the potential decrease of the second node $ND_2$.

In the same way as described with the $TP(2)_6$ according to the first embodiment, the period $TP(3)_6$ is continued, for example, until immediately before the horizontal scanning period of each of the organic EL display elements 10 arrayed at the (m+m'+Δm')'th row, i.e., the (m+m'+Δm')'th horizontal scanning period. Here, "Δm" is determined by the design specification of the organic EL display apparatus. In the case that the value of (m+m'+Δm') exceeds M, the exceeding part of the horizontal scanning period is processed at the next display frame.

With the second embodiment, the auxiliary driving process is executed at the period $TP(3)_7$. Specifically, in a state in which the off state of the writing transistor $TR_W$ is held, the first transistor $TR_1$ is changed from an on state to an off state at the commencement of the period $TP(3)_7$, i.e., the commencement of the (m+m'+Δm')'th horizontal scanning period, and this state is maintained during the period $TP(3)_7$. Thus, a forward voltage is applied between the anode electrode and cathode electrode of the light emitting unit ELP over the period $TP(3)_7$. With the second embodiment as well, the length of the $TP(3)_7$ is fixed to a predetermined length that is generally 2 milliseconds.

In the same way as described with the $TP(2)_7$ according to the first embodiment, the potential difference $V_{gs}$ between the gate electrode and the other source/drain region serving as a source region of the driving transistor $TR_D$ is basically in a state in which the value of the above Expression (4) is held, and accordingly, as shown in FIG. 20B, the drain current $I_{ds}$ having the value shown in the above Expression (5) flows into the light emitting unit ELP. That is to say, with the second embodiment as well, the auxiliary driving process is a process wherein the current corresponding to the value of the potential difference between the first node $ND_1$ and the second node $ND_2$ flows into the light emitting unit ELP via the driving transistor $TR_D$ from the power supply unit 100, thereby driving the light emitting unit ELP.

Subsequently, in a state in which the off state of the writing transistor $TR_W$ is held, the first transistor $TR_1$ is changed from an off state to an on state at the commencement of the period $TP(3)_8$. As a result thereof, the potential of the second node $ND_2$ decreases to $V_{SS}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with the potential decrease of the second node $ND_2$ (see FIG. 20C).

Subsequently, with the period $TP(3)_{+1}$ and thereafter, the same processes as the periods $TP(3)_1$ through $TP(3)_8$ described above are repeated. For example, with the period $TP(3)_{+1}$, in the same way as with the $TP(3)_1$ described in FIG. 19B, the process (a), i.e., the preprocessing is executed (see FIG. 20D). Also, with the period $TP(3)_{+2}$, in the same way as with the $TP(3)_2$ described with reference to FIG. 19C, the process (b), i.e., the threshold voltage cancellation processing is executed (see FIG. 20E).

Now, a period from the termination of the auxiliary driving process to the termination of the next process (b) is set so as to be 1 millisecond or less. Specifically, the periods $TP(3)_7$ and $TP(3)_8$ are set such that the period $T_D$ shown in FIG. 18 from the termination of the $TP(3)_7$ that is the termination of the auxiliary driving process to the commencement of the $TP(3)_{+2}$ that is the commencement of the next process (b) becomes 1 millisecond or less.

The details of the advantage according to the second embodiment are the same as described with reference to FIG. 11 in the first embodiment, and accordingly, description thereof will be omitted.

Description has been made so far regarding the driving method for the light emitting unit ELP according to the second embodiment. As a modification of the second embodiment, like the first modification of the first embodiment, a series of processes may be executed multiple times wherein after driving the light emitting unit ELP, a reverse voltage is applied between the anode electrode and cathode electrode of the light emitting unit ELP. Alternatively, though the voltage applying method differs from the second and third modifications of the first embodiment, an arrangement may be made wherein two types of voltage are supplied as the second node initializing voltage to be applied via the first transistor.

Third Embodiment

The third embodiment also relates to the driving method of the organic electroluminescent light emitting unit according to the embodiments of the present invention. With the third embodiment, the driving circuit 11 is configured of a 3 transistors/1 capacitor unit (second 3Tr/1C driving circuit). A conceptual diagram of the third embodiment is shown in FIG. 21, and an equivalent circuit diagram of the organic EL display element 10 including the driving circuit 11 is shown in FIG. 22.

First, the details of the driving circuit and the light emitting unit will be described. The second 3Tr/1C driving circuit also includes, in the same way as the above 2Tr/1C driving circuit, two transistors of the writing transistor $TR_W$, and the driving transistor $TR_D$, and one capacitor unit $C_1$. The second 3Tr/1C driving circuit further includes a second transistor $TR_2$.

Driving Transistor $TR_D$

The configuration of the driving transistor $TR_D$ is the same as the configuration of the driving transistor $TR_D$ described in the first embodiment, and accordingly, detailed description thereof will be omitted. With the third embodiment, in the same way as with the first embodiment, the voltage $V_{CC-L}$ is applied to one of the source/drain regions of the driving transistor $TR_D$ from the power supply unit 100, thereby initializing the potential of the second node $ND_2$. Therefore, the voltage $V_{CC-H}$ and voltage $V_{CC-L}$ are supplied from the power supply unit 100.

Writing Transistor $TR_W$

The configuration of the writing transistor $TR_W$ is the same as the configuration of the writing transistor $TR_W$ described in the first embodiment, and accordingly, detailed description thereof will be omitted. Note that, with the first and second embodiments, the video signal $V_{Sig}$, and further the first node initializing voltage $V_{Ofs}$ are supplied to one of the source/drain regions from the signal output circuit 102 via the data line DTL. On the other hand, with the third embodiment, as described later, the second transistor $TR_2$ is used to initialize the potential of the first node $ND_1$. Therefore, with the third embodiment, the first node initializing voltage $V_{Ofs}$ does not have to be applied from the data line DTL. According to such a reason, with the third embodiment, only the video signal $V_{Sig}$ is applied to the data line DTL. With the third embodiment, the process (a) and the process (b), i.e., the preprocessing and the threshold voltage cancellation processing can be executed at a scanning period prior to the m'th horizontal scanning period.

Second Transistor $TR_2$

The driving circuit 11 further includes the second transistor $TR_2$, and with the second transistor $TR_2$, (D-1) the other source/drain region is connected to the first node $ND_1$, (D-2) the first node initializing voltage $V_{Ofs}$ is applied to one of the source/drain regions, and (D-3) the gate electrode is connected to a second transistor control line AZ2.

The on state/off state of the second transistor $TR_2$ is controlled by a signal from the second transistor control line AZ2. More specifically, the second transistor control line AZ2 is connected to the second transistor control circuit 104. Based on the operation of the second transistor control circuit 104, the second transistor control line AZ2 is changed to a low level or high level, and the second transistor $TR_2$ is set to an on state or off state.

Light Emitting Unit ELP

The configuration of the light emitting unit ELP is the same as the configuration of the light emitting unit ELP described with the first embodiment, and accordingly, detailed description thereof will be omitted.

Next, the driving method for the light emitting unit ELP according to the third embodiment will be described.

Figure 23:
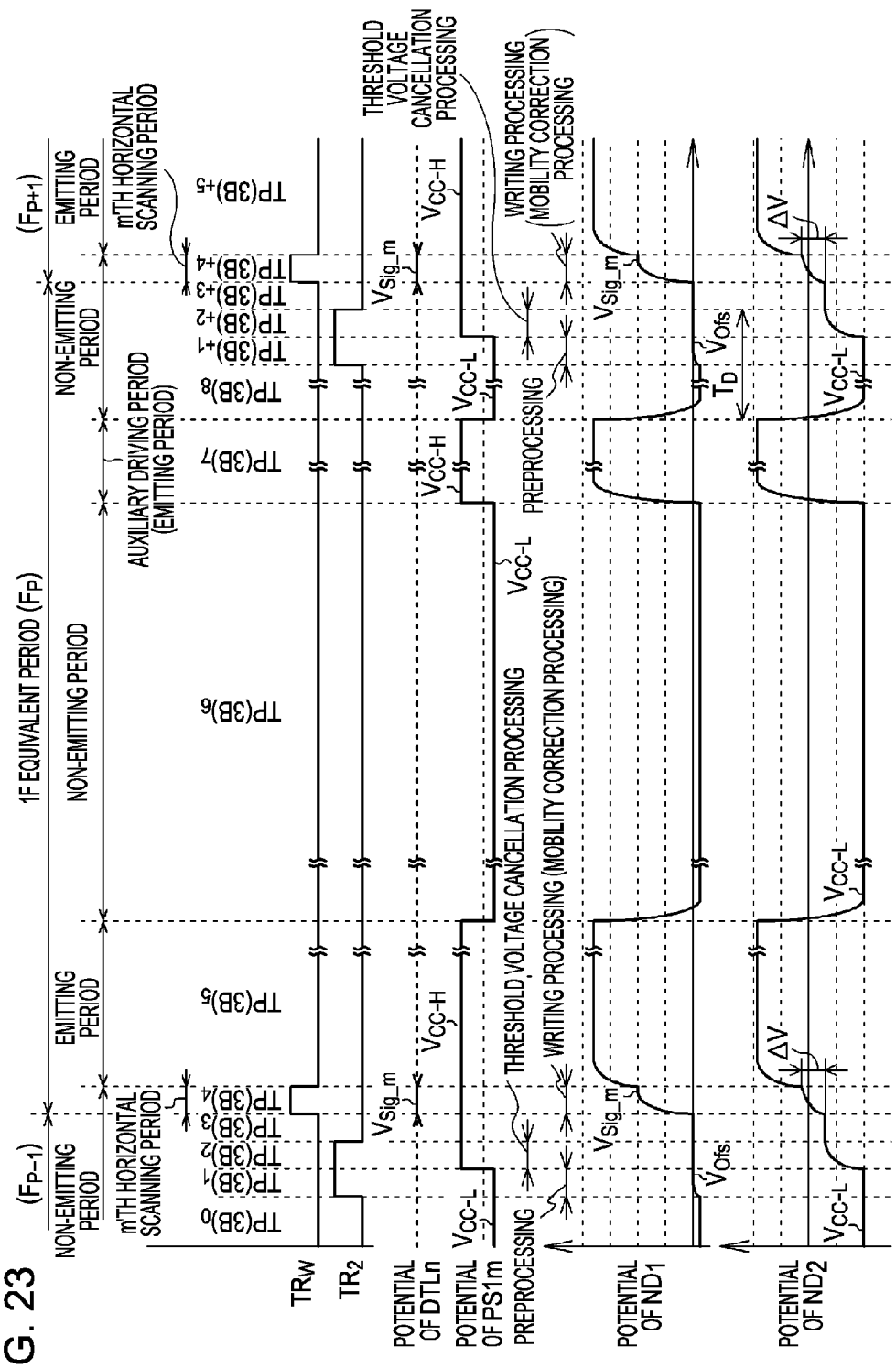
FIG. 23 is a schematic view of a driving timing chart of an organic electroluminescent light emitting unit according to the third embodiment.

FIG. 23 schematically illustrates the driving timing chart of the light emitting ELP according to the third embodiment including the auxiliary driving process. There are periods $TP(3B)_7$ and $TP(3B)_8$, between the termination of the period $TP(3B)_6$ and the commencement of the period $TP(3B)_{+1}$ shown in FIG. 23, which will be described later. The above auxiliary driving process is executed at the period $TP(3B)_7$. The on/off state of each transistor will be schematically illustrated in FIGS. 24A through 24F, and 25A through 25E.

The periods $TP(3B)_0$ through $TP(3B)_3$ shown in FIG. 23 are operation periods until immediately before the period $TP(3B)_4$ where the writing processing is executed. With the periods $TP(3B)_0$ through $TP(3B)_3$, the (n, m)'th organic EL display element 10 is in a non-emitting state as a general rule. Unlike the above first and second embodiments, the period $TP(3B)_1$ through $TP(3B)_3$ are executed until the termination of the (m−1)'th horizontal scanning period. The period $TP(3B)_4$ is included in the m'th horizontal scanning period. Note that description will be made assuming that the commencement of the period $TP(3B)_1$ and the termination of the $TP(3B)_4$ are matched with the commencement and termination of the m'th horizontal scanning period respectively, for the sake of explanatory convenience.

Description will be made below regarding each period of the periods $TP(3B)_0$ through $TP(3B)_3$. Note that the length of each period of the periods $TP(3B)_1$ through $TP(3B)_3$ may be set according to the design of the organic EL display apparatus as appropriate. Now, description will be made assuming that the length of each period of the periods $TP(3B)_1$, $TP(3B)_2$, and $TP(3B)_3$ is one horizontal scanning period, for the sake of explanatory convenience.

Period $TP(3B)_0$ (See FIGS. 23 and 24A)

This period $TP(3B)_0$ is, for example, operation from the previous display frame to the current display frame. That is to say, this period $TP(3B)_0$ is a period from the termination of the auxiliary driving period of the previous display frame to the (m−4)'th horizontal scanning period of the current display frame. The second transistor $TR_2$ is in an off state. With this period $TP(3B)_0$, the (n, m)'th organic EL display element 10 is in a non-emitting state.

With the period $TP(3B)_0$, the voltage supplied from the power supply unit 100 is switched from the voltage $V_{CC-H}$ to the voltage $V_{CC-L}$. As a result thereof, the potential of the second node $ND_2$ decreases to $V_{CC-L}$, a reverse voltage is applied between the anode electrode and cathode electrode of the light emitting unit ELP, and the light emitting unit ELP goes to a non-emitting state. Also, the potential of the first node $ND_1$ (the gate electrode of the driving transistor $TR_D$) in a floating state also decreases along with the potential decrease of the second node $ND_2$.

Period $TP(3B)_1$ (See FIGS. 23 and 24B)

Subsequently, the (m−3)'th horizontal scanning period at the current display frame is started. With this period $TP(3)_1$, the above process (a), i.e., the above preprocessing is executed.

Unlike the first embodiment, according to the third embodiment, with the process (a), the first node initializing voltage $V_{Ofs}$ is applied to the first node $ND_1$ via the second transistor $TR_2$ which has been set to an on state by a signal from the second transistor control line AZ2. Note that, in the same way as with the first embodiment, with the process (a), the second node initializing voltage $V_{CC-L}$ is applied from the power supply unit 100 to the second node $ND_2$ via the driving transistor $TR_D$.

Specifically, at the time of the commencement of the period $TP(3B)_1$ the second transistor $TR_2$ is changed from an off state to an on state. As a result thereof, the potential of the first node $ND_1$ becomes $V_{Ofs}$ (0 volt). The potential of the second node $ND_2$ holds $V_{SS}$ (−10 volts).

Period $TP(3B)_2$ (See FIGS. 23 and 24C)

Subsequently, the (m−2)'th horizontal scanning period at the current display frame is started. With this period $TP(3)_2$, the above process (b), i.e., the above threshold voltage cancellation processing is executed.

According to the third embodiment, with the process (b), a state is maintained wherein the first node initializing voltage $V_{Ofs}$ is applied to the first node $ND_1$ via the second transistor $TR_2$ which has been set to an on state by a signal from the second transistor control line AZ2, thereby holding the potential of the first node $ND_1$.

That is to say, in a state in which the on state of the second transistor $TR_1$ is maintained, the voltage supplied from the power supply unit 100 is switched from the voltage $V_{CC-L}$ to the voltage $V_{CC-H}$. As a result thereof, the potential of the first node $ND_1$ is not changed (maintains $V_{Ofs}$=0 volt), but the potential of the second node $ND_2$ is changed toward the potential obtained by subtracting the threshold voltage $V_{th}$ of the driving transistor $TR_D$ from the potential of the first node $ND_1$. That is to say, the potential of the second node $ND_2$ in a floating state increases. For the sake of explanatory convenience, let us say that the length of the period $TP(3B)_2$ is sufficient to change the potential of the second node $ND_2$.

In the same way as described with the $TP(2)_2$ according to the first embodiment, the potential of the second node $ND_2$ in a floating state comes close to ($V_{Ofs}-V_{th}$=−3 volts), and finally becomes ($V_{Ofs}-V_{th}$). If the above Expression (2) is ensured, the light emitting unit ELP does not emit light. That is to say, the potential of the second node $ND_2$ is determined depending on only the threshold voltage $V_{th}$ of the driving transistor $TR_D$, and the voltage $V_{Ofs}$ used for initializing the potential of the gate electrode of the driving transistor $TR_D$, but is unrelated to the threshold voltage $V_{th-EL}$ of the light emitting unit ELP.

Period $TP(3B)_3$ (See FIGS. 23 and 24D)

Subsequently, the (m−1)'th horizontal scanning period at the current display frame is started. With the commencement of this period $TP(3B)_3$, the second transistor $TR_2$ is set to an off state. If the driving transistor $TR_D$ has reached an off state with the threshold voltage cancellation processing, the potentials of the first node $ND_1$ and the second node $ND_2$ are not changed substantially.

Period $TP(3B)_4$ (See FIGS. 23 and 24E)

Subsequently, the m'th horizontal scanning period at the current display frame is started. After the voltage of the data line DTL is switched to the video signal $V_{Sig\_m}$, the writing transistor $TR_W$ is set to an on state by a signal from the scanning line SCL. As a result thereof, the potential of the first node $ND_1$ increases to $V_{Sig\_m}$. The driving transistor $TR_D$ is in an on state. The details of operation are the same as described with the period $TP(2)_4$ according to the first embodiment, and accordingly, description thereof will be omitted.

Period TP(3B)$_5$ (See FIGS. 23 and 24F)

According to the above operations, the threshold voltage cancellation processing, writing processing, and mobility correction processing have been completed. Subsequently, with this period, driving of the light emitting unit ELP making up the first half of the above process (e) is executed.

Specifically, the off state of the second transistor TR$_2$ is held. Subsequently, the same operation as described with the period TP(2)$_5$ according to the first embodiment is executed. The drain current I$_{ds}$ that flows from the drain region to the source region of the driving transistor TR$_D$ can be represented with the above Expression (5). The emitting state of the light emitting unit ELP continues until the (m+m'−1)'th horizontal scanning period. The termination of the (m+m'−1)'th horizontal scanning period is equivalent to the termination of the period TP(3B)$_6$.

Period TP(3B)$_6$ (See FIGS. 23 and 25A)

Next, a process, which makes up the latter half of the above process (e), is executed wherein a reverse voltage is applied between the anode electrode and cathode electrode of the light emitting unit ELP. Specifically, in a state in which the off state of the second transistor TR$_2$ and the off state of the writing transistor TR$_W$ are held, with the commencement of the period TP(3B)$_6$ (in other words, the commencement of the (m+m')'th horizontal scanning period), the voltage supplied from the power supply unit 100 is switched from the voltage V$_{CC-H}$ to the voltage V$_{CC-L}$. As a result thereof, the potential of the second node ND$_2$ decreases to V$_{CC-L}$, a reverse voltage is applied between the anode electrode and cathode electrode of the light emitting unit ELP, and the light emitting unit ELP goes to a non-emitting state. Also, the potential of the first node ND$_1$ (the gate electrode of the driving transistor TR$_D$) in a floating state also decreases along with the potential decrease of the second node ND$_2$.

In the same way as described with the TP(2)$_6$ according to the first embodiment, the period TP(3B)$_6$ is continued, for example, until immediately before the horizontal scanning period of each of the organic EL display elements 10 arrayed at the (m+m'+Δm')'th row, i.e., the (m+m'+Δm')'th horizontal scanning period. Here, "Δm" is determined by the design specification of the organic EL display apparatus. In the case that the value of (m+m'+Δm') exceeds M, the exceeding part of the horizontal scanning period is processed at the next display frame.

With the third embodiment, the auxiliary driving process is executed at the period TP(3B)$_7$. Specifically, in a state in which the off state of the second transistor TR$_2$ and the off state of the writing transistor TR$_W$ are held, with the commencement of the TP(3B)$_7$, i.e., the commencement of the (m+m'+Δm')'th horizontal scanning period, the voltage of the power supply unit 100 is switched from the voltage V$_{CC-L}$ to the voltage V$_{CC-H}$, and this state is maintained during the period TP(3B)$_7$. Thus, a forward voltage is applied between the anode electrode and cathode electrode of the light emitting unit ELP over the period TP(3B)$_7$. With the third embodiment as well, the length of the TP(3B)$_7$ is fixed to a predetermined length that is generally 2 milliseconds.

In the same way as described with the TP(2)$_7$ according to the first embodiment, the potential difference V$_{gs}$ between the gate electrode and the other source/drain region serving as a source region of the driving transistor TR$_D$ is basically in a state in which the value of the above Expression (4) is held, and accordingly, as shown in FIG. 25B, the drain current I$_{ds}$ having the value shown in the above Expression (5) flows into the light emitting unit ELP. That is to say, with the third embodiment as well, the auxiliary driving process is a process wherein the current corresponding to the value of the potential difference between the first node ND$_1$ and the second node ND$_2$ flows into the light emitting unit ELP via the driving transistor TR$_D$ from the power supply unit 100, thereby driving the light emitting unit ELP.

Subsequently, in a state in which the off state of the second transistor TR$_2$ and the off state of the writing transistor TR$_W$ are held, with the commencement of the period TP(3B)$_8$, the voltage of the power supply unit 100 is switched from the voltage V$_{CC-H}$ to the voltage V$_{CC-L}$. As a result thereof, the potential of the second node ND$_2$ decreases to V$_{CC-L}$, a reverse voltage is applied between the anode electrode and cathode electrode of the light emitting unit ELP, and the light emitting unit ELP goes to a non-emitting state. Also, the potential of the first node ND$_1$ (the gate electrode of the driving transistor TR$_D$) in a floating state also decreases along with the potential decrease of the second node ND$_2$ (see FIG. 25C).

Subsequently, with the period TP(3B)$_{+1}$ and thereafter, the same processes as the periods TP(3B)$_1$ through TP(3B)$_8$ described above are repeated. That is to say, with the period TP(3B)$_{+1}$, in the same way as with the TP(3B)$_1$ described in FIG. 24B, the process (a), i.e., the preprocessing is executed (see FIG. 25D). Also, with the period TP(3B)$_{+2}$, in the same way as with the TP(3B)$_2$ described with reference to FIG. 24C, the process (b), i.e., the threshold voltage cancellation processing is executed (see FIG. 25E).

Now, a period from the termination of the auxiliary driving process to the termination of the next process (b) is set so as to be 1 millisecond or less. Specifically, the periods TP(3B)$_7$ and TP(3B)$_8$ are set such that the period T$_D$ shown in FIG. 23 from the termination of the TP(3B)$_7$ that is the termination of the auxiliary driving process to the commencement of the TP(3B)$_{+2}$ that is the commencement of the next process (b) becomes 1 millisecond or less.

The details of the advantage according to the third embodiment are the same as described with reference to FIG. 11 in the first embodiment, and accordingly, description thereof will be omitted.

Description has been made so far regarding the driving method for the light emitting unit ELP according to the third embodiment. As a modification of the third embodiment, like the first modification of the first embodiment, a series of processes may be executed multiple times wherein after driving the light emitting unit ELP, a reverse voltage is applied between the anode electrode and cathode electrode of the light emitting unit ELP. Alternatively, similar to the second and third modifications of the first embodiment, an arrangement may be made wherein two types of voltage are supplied as the second node initializing voltage.

Fourth Embodiment

A fourth embodiment also relates to the driving method for the organic electroluminescent light emitting unit according to the embodiments of the present invention. With the fourth embodiment, the driving circuit 11 is configured of 4 transistors/1 capacitor unit (4Tr/1C driving circuit). The conceptual diagram of the organic EL display apparatus according to the fourth embodiment is shown in FIG. 26, and an equivalent circuit of the organic EL display element 10 including the driving circuit 11 is shown in FIG. 27.

First, the details of the driving circuit and the light emitting unit will be described. The 4Tr/1C driving circuit also includes, in the same way as with the above 2Tr/1C driving circuit, two transistors of a writing transistor TR$_W$, and a driving transistor $TR_D$, and one capacitor unit $C_1$. The 4Tr/1C driving circuit further includes a first transistor $TR_1$ and a second transistor $TR_2$.

The fourth embodiment is a modification of the third embodiment. With the third embodiment, in the same way as with the first embodiment, the second node initializing voltage $V_{CC-L}$ is applied from the power supply unit 100 to the second node $ND_2$. On the other hand, with the fourth embodiment, the second node initializing voltage $V_{SS}$ is applied to the second node $ND_2$ via the first transistor $TR_1$ described in the second embodiment.

Driving Transistor $TR_D$

The configuration of the driving transistor $TR_D$ is the same as the configuration of the driving transistor $TR_D$ described in the first embodiment, and accordingly, detailed description thereof will be omitted. Note that, in the same way as with the second embodiment, the power supply unit 100 applies the fixed voltage $V_{CC}$.

Writing Transistor $TR_W$

The configuration of the writing transistor $TR_W$ is the same as the configuration of the writing transistor $TR_W$ described in the first embodiment, and accordingly, detailed description thereof will be omitted. Note that, in the same way as with the third embodiment, only the video signal $V_{Sig}$ is supplied to the data line DTL. With the fourth embodiment as well, the process (a) or (b), i.e., the preprocessing or threshold voltage cancellation processing can be executed at a scanning period prior to the m'th horizontal scanning period.

First Transistor $TR_1$

The configuration of the first transistor $TR_1$ is the same as the configuration of the first transistor $TR_1$ described in the second embodiment, and accordingly, description thereof will be omitted.

Second Transistor $TR_2$

The configuration of the second transistor $TR_2$ is the same as the configuration of the second transistor $TR_2$ described in the third embodiment, and accordingly, description thereof will be omitted.

Light Emitting Unit ELP

The configuration of the light emitting unit ELP is the same as the configuration of the light emitting unit ELP described in the first embodiment, and accordingly, description thereof will be omitted.

Figure 28:
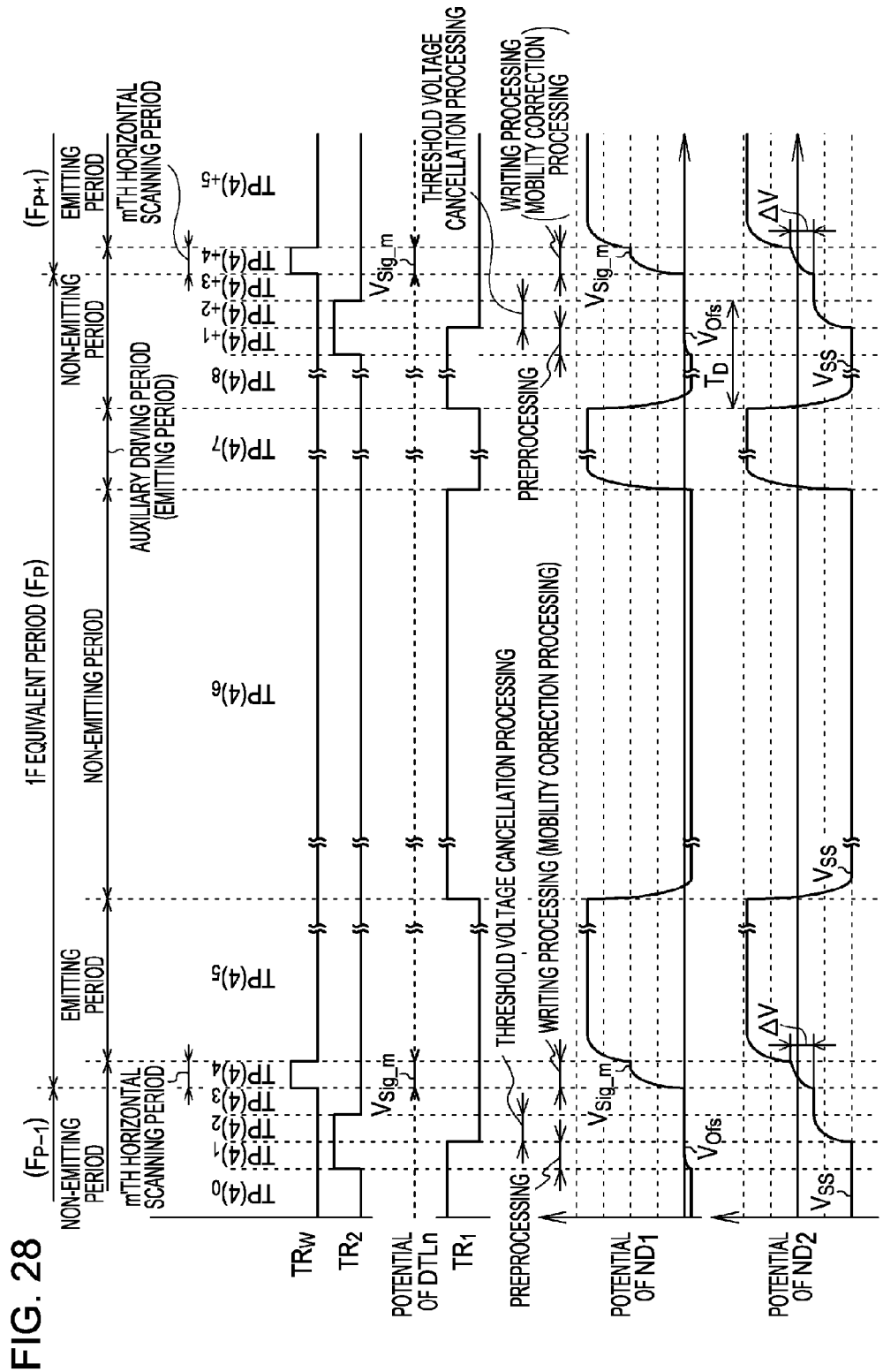
FIG. 28 is a schematic view of a driving timing chart of an organic electroluminescent light emitting unit according to the fourth embodiment.

Next, the driving method for the light emitting unit ELP according to the fourth embodiment will be described. FIG. 28 schematically illustrates the driving timing of the light emitting unit ELP according to the fourth embodiment including the auxiliary driving process. The on/off state and so forth of each of the transistors will be shown in FIGS. 29A through 29F, and 30A through 30E. Each period of the periods $TP(4)_0$ through $TP(4)_{+5}$ shown in FIG. 28 is equivalent to each period of the periods $TP(3B)_0$ through $TP(3B)_{+5}$ shown in FIG. 23 referenced in the third embodiment.

As can be clearly understood from FIGS. 28 and 23, with the operation according to the fourth embodiment, the first transistor $TR_1$ is set to an on state corresponding to a period wherein the voltage $V_{CC-L}$ is applied from the power supply unit 100 in the third embodiment, and the first transistor $TR_1$ is set to an off state corresponding to a period wherein the voltage $V_{CC-L}$ is applied from the power supply unit 100. Except for the above different points, the operation according to the fourth embodiment is equivalent to the operation of the third embodiment of which the reading is changed to the fourth embodiment as appropriate, and accordingly, description thereof will be omitted.

The embodiments of the present invention have been described so far based on the preferred embodiments, but is not restricted to these embodiments. The arrangement or configuration of each type of component making up the organic EL display apparatus, organic EL display element, and driving circuit, and the processes of the driving method for the light emitting unit, which have been described with the embodiments, are examples, and can be changed as appropriate.

Figure 31:
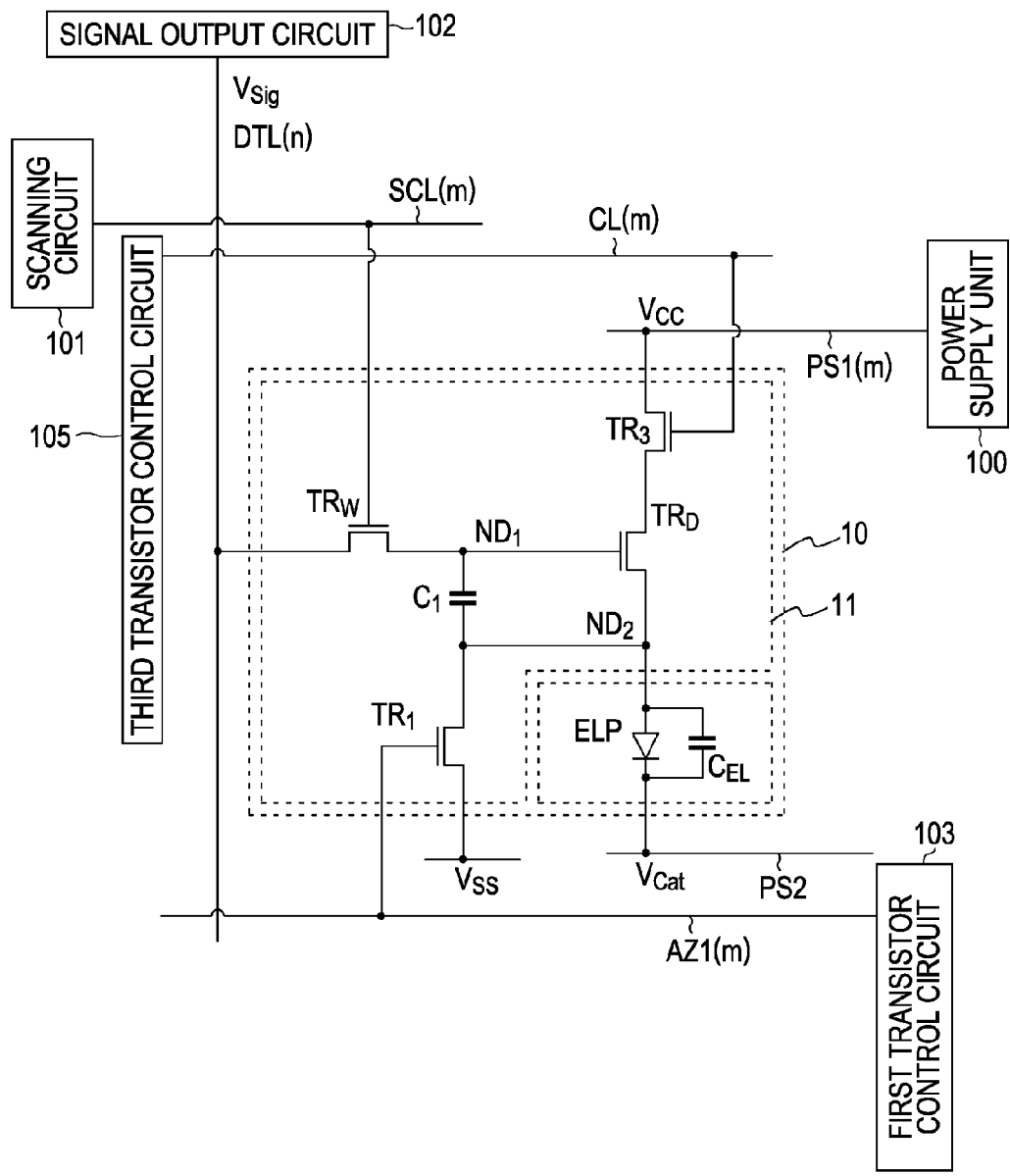
FIG. 31 is an equivalent circuit diagram of a driving circuit further including a first transistor and a third transistor.

According to the second embodiment, for example, with the period $TP(3)_0$, the voltage $V_{CC}$ is applied from the power supply unit 100 to the second node $ND_2$ via the driving transistor $TR_D$, and the voltage $V_{SS}$ is applied thereto via the first transistor $TR_1$. Therefore, a current flows from the power supply unit 100 via the first transistor $TR_1$, and consumption power increases. In order to avoid this, for example, as shown in FIG. 31, the power supply unit 100 is connected to one of the source/drain regions of the driving transistor $TR_D$ via the third transistor $TR_3$. The gate electrode of the third transistor $TR_3$ is connected to the control line CL, and one end of the control line CL is connected to the third transistor control circuit 105. Thus, an arrangement may be made wherein the third transistor $TR_3$ is set to an off state as appropriate based on a signal from the third transistor control circuit 105 at the period $TP(3)_0$ or the like.

Figure 32:
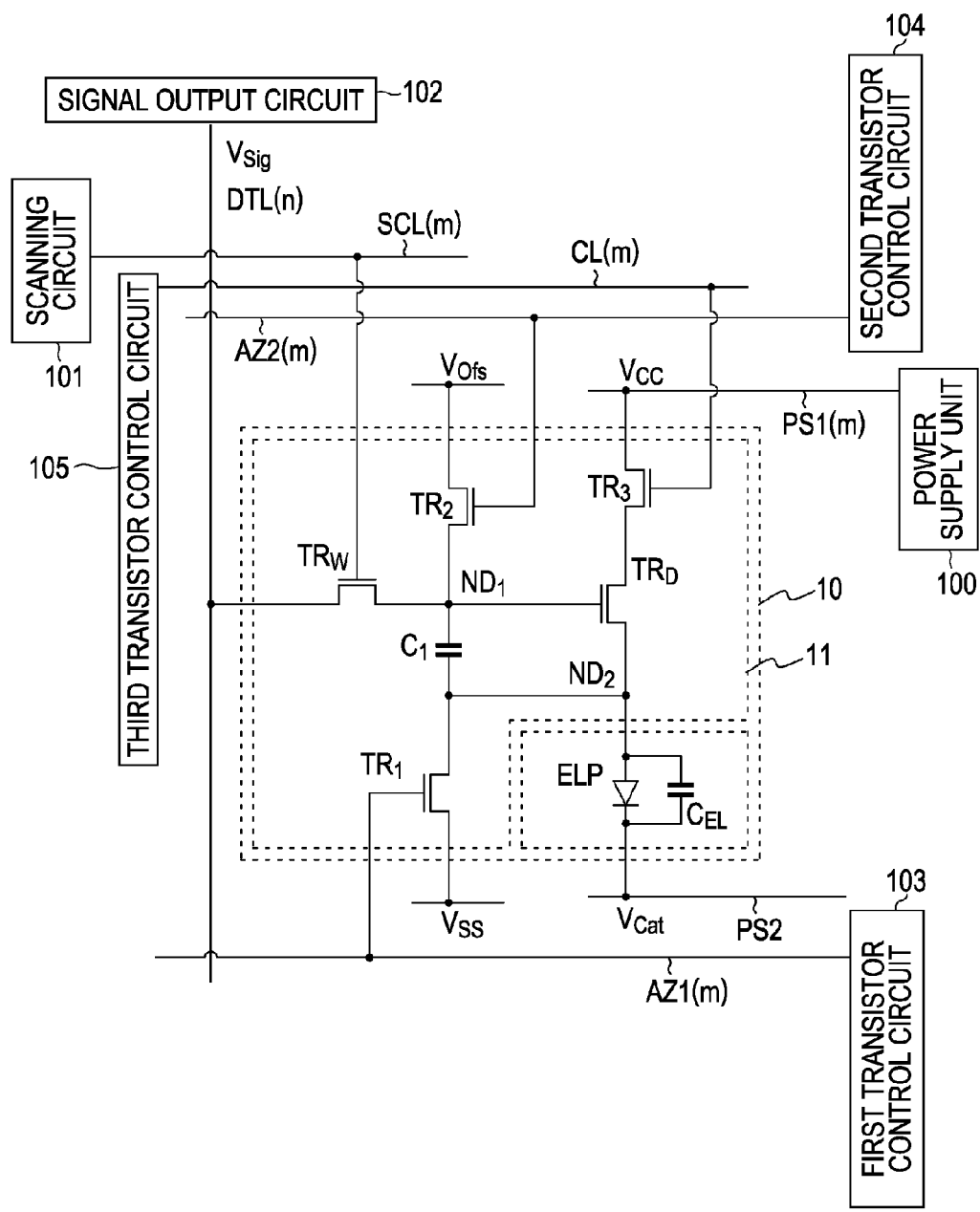
FIG. 32 is an equivalent circuit diagram of a driving circuit further including a first transistor, a second transistor, and a third transistor.

Also, with the fourth embodiment as well, the same phenomenon as described above occurs. Therefore, as shown in FIG. 32, an arrangement may be made wherein the power supply unit 100 is connected to one of the source/drain regions of the driving transistor $TR_D$ via the third transistor $TR_3$, and the third transistor $TR_3$ is set to an off state as appropriate.

The present application contains subject matter related to that disclosed in Japanese Priority Patent Application JP 2008-286233 filed in the Japan Patent Office on Nov. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting unit driving apparatus comprising:
    a writing transistor,
    a driving transistor, and
    a capacitor unit,
    wherein,
        said driving transistor has a configuration in which one of a source region and a drain region thereof is connected to a switched power supply unit, the other one of the source region and the drain region of the driving transistor is connected a second node to which are also connected an anode electrode of an organic electroluminescent light emitting unit and an electrode of said capacitor unit, a cathode electrode of the organic electroluminescent light emitting unit being connected to a power supply line configured to maintain the cathode electrode at a constant potential,
        the gate electrode of the driving transistor is connected to a first node to which are also connected the other one of the source region and the drain region of said writing transistor and the other electrode of said capacitor unit,
        after: (i) a current according to the value of potential difference between the first node and the second node is supplied to the organic electroluminescent light emitting unit from the switched power supply unit to drive the organic electroluminescent light emitting unit, and (ii) a reverse voltage is applied between the anode electrode and the cathode electrode of said organic electroluminescent light emitting unit, the driving transistor executes an auxiliary driving process to apply a forward voltage between the anode electrode and the cathode electrode of said organic electroluminescent light emitting unit over a first period when the writing transistor is in an off state and the switched power supply unit is switched from a low potential to a high potential, the driving transistor executes a threshold voltage cancellation process in which a potential of said second node is changed toward a potential obtained by subtracting a threshold voltage of said driving transistor from a potential of said first node in a state in which the potential of said first node is maintained, and a second period between termination of said auxiliary driving process and termination of the threshold voltage cancellation process is suppressed to 1 millisecond or less, the second period comprising at least a third period for executing preprocessing via a process (a) during said second period when the writing transistor is in an on state, wherein the potential of said first node and the potential of said second node are initialized such that the potential difference between said first node and said second node exceeds the threshold voltage of said driving transistor, and also the potential difference between said second node and a cathode electrode provided to said organic electroluminescent light emitting unit does not exceed the threshold voltage of said organic electroluminescent light emitting unit.

2. The light emitting unit driving apparatus according to claim 1, wherein:

said driving transistor is driven by a driving signal, the driving signal comprising a first emitting period, a non-luminescent period, and a second emitting period; and said first emitting period is longer than said second emitting period.

3. The light emitting unit driving apparatus according to claim 2, wherein the level of said driving signal of said non-luminescent period is intermediate potential.

4. An organic electroluminescent light emitting unit driving method using a driving circuit, said driving circuit including (a) a writing transistor, (b) a driving transistor, and (c) a capacitor unit, said driving transistor having a configuration in which (1) one of the source/drain regions is connected to a switched power supply unit, (2) the other source/drain region is connected to a second node to which are connected an anode electrode provided to an organic electroluminescent light emitting unit and one of the electrodes of said capacitor unit, a cathode electrode of the organic electroluminescent light emitting unit being connected to a power supply line configured to maintain the cathode electrode at a constant potential, and (3) the gate electrode is connected to a first node to which are also connected the other source/drain of said writing transistor and the other electrode of said capacitor unit, said writing transistor having a configuration in which (1) one of the source/drain regions is connected to a data line, and (2) the gate electrode is connected to a scanning line, said driving method comprising:

executing preprocessing via a process (a), wherein the potential of said first node, and the potential of said second node are initialized such that the potential difference between said first node and said second node exceeds the threshold voltage of said driving transistor, and also the potential difference between said second node and a cathode electrode provided to said organic electroluminescent light emitting unit does not exceed the threshold voltage of said organic electroluminescent light emitting unit;

executing threshold voltage cancellation processing via a process (b), wherein the potential of said second node is changed toward a potential obtained by subtracting the threshold voltage of said driving transistor from the potential of said first node in a state in which the potential of said first node is maintained;

executing writing processing via a process (c), wherein a video signal is applied to said first node from said data line via said writing transistor which has been set to an on state by a signal from said scanning line;

setting said first node to a floating state, via a process (d), by setting said writing transistor to an off state based on a signal from said scanning line; and executing a series of processes at least once, via a process (e), wherein, after a current according to the value of potential difference between said first node and said second node is applied to said organic electroluminescent light emitting unit from said switched power supply unit via said driving transistor to drive said organic electroluminescent light emitting unit, a reverse voltage is applied between the anode electrode and the cathode electrode of said organic electroluminescent light emitting unit;

wherein, a series of processes from said processes (a) through (c) are executed repeatedly, and there is further provided an auxiliary driving process between said processes (e) and (a) to apply a forward voltage between the anode electrode and the cathode electrode of said organic electroluminescent light emitting unit over a first period when the writing transistor is in an off state and the switched power supply unit is switched from a low potential to a high potential, and a second period between the termination of said auxiliary driving process and the termination of the next process (b) is suppressed to 1 millisecond or less, the second period comprising at least a third period for executing preprocessing via the process (a) during said second period when the writing transistor is in an on state.

5. The organic electroluminescent light emitting unit driving method according to claim 4, wherein the second period between the termination of said auxiliary driving process and the termination of the next process (b) is suppressed to 0.5 milliseconds or less.

6. The organic electroluminescent light emitting unit driving method according to claim 4, wherein, with said process (a), a first node initializing voltage is applied to said first node from said data line via said writing transistor which has been set to the on state by a signal from said scanning line.

7. The organic electroluminescent light emitting unit driving method according to claim 6, wherein, with said process (b), the potential of said first node is held by maintaining a state in which said first node initializing voltage is applied to said first node from said data line via said writing transistor which has been set to the on state by a signal from said scanning line.

8. The organic electroluminescent light emitting unit driving method according to claim 4, wherein, with said process (a), a second node initializing voltage is applied to said second node from said switched power supply unit via said driving transistor.

9. The organic electroluminescent light emitting unit driving method according to claim 8, wherein, with said process (e), said second node initializing voltage is applied to said second node from said switched power supply unit via said driving transistor, thereby applying the reverse voltage between the anode electrode and the cathode electrode of said organic electroluminescent light emitting unit.

10. The organic electroluminescent light emitting unit driving method according to claim 4, wherein, with said process (b), a voltage that is higher than a voltage obtained by subtracting the threshold voltage of said driving transistor from the potential of said first node is applied to one of the source/drain regions of said driving transistor from said switched power supply unit, thereby changing said second node toward a potential obtained by subtracting the threshold voltage of said driving transistor from the potential of said first node.

* * * * *